United States Patent
Cole

(10) Patent No.: US 10,821,539 B2
(45) Date of Patent: Nov. 3, 2020

(54) SYSTEM AND METHOD FOR PENDANT COMPONENT FOR A WELDING SYSTEM

(71) Applicant: LINCOLN GLOBAL, INC., Santa Fe Springs, CA (US)

(72) Inventor: Stephen R. Cole, Chula Vista, CA (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 448 days.

(21) Appl. No.: 15/892,533

(22) Filed: Feb. 9, 2018

(65) Prior Publication Data
US 2018/0178305 A1    Jun. 28, 2018

Related U.S. Application Data

(63) Continuation of application No. 14/296,528, filed on Jun. 5, 2014, now abandoned.

(60) Provisional application No. 61/903,155, filed on Nov. 12, 2013.

(51) Int. Cl.
   *B23K 9/10*     (2006.01)
   *B23K 9/028*     (2006.01)

(52) U.S. Cl.
CPC .......... *B23K 9/1087* (2013.01); *B23K 9/0286* (2013.01)

(58) Field of Classification Search
CPC ... B23K 9/1087; B23K 9/0286; G05B 19/237
USPC ............ 219/60 R, 60.2, 61, 68, 130.1, 60 A; 318/568.22
See application file for complete search history.

(56) References Cited

U.S. PATENT DOCUMENTS

| 475,781 A | * | 5/1892 | Lloyd | D06F 53/00 |
| | | | | 24/131 R |
| 1,331,018 A | * | 2/1920 | Luthy | H01M 2/18 |
| | | | | 429/143 |
| 3,306,116 A | * | 2/1967 | Ross | B23K 9/30 |
| | | | | 74/55 |
| 3,621,177 A | | 11/1971 | Freeman | |
| 4,095,077 A | * | 6/1978 | Schneider | B23K 9/10 |
| | | | | 219/61 |
| 4,144,992 A | * | 3/1979 | Omae | B23K 9/0286 |
| | | | | 219/125.11 |
| 4,375,026 A | * | 2/1983 | Kearney | B23K 9/10 |
| | | | | 219/130.01 |

(Continued)

FOREIGN PATENT DOCUMENTS

| EP | 1445055 | 1/2004 |
| WO | 9300196 | 1/1993 |
| WO | 2006097626 | 9/2006 |

OTHER PUBLICATIONS

PCT/IB2014/002263—Intl. Search Report and Written Opinion of the Intl. Searching Authority dated Apr. 22, 2015.

*Primary Examiner* — Jimmy Chou
(74) *Attorney, Agent, or Firm* — Tucker Ellis LLP

(57) ABSTRACT

The invention described herein generally pertains to a system and method related to controlling a welding system having a tractor welder engaged with a track by utilizing a pendant component that is configured to receive an input from a user and displaying data via a graphical display. The pendant component includes one or more inputs that correspond to data displayed, wherein the one or more inputs include a first toggle switch and a second toggle switch, an encoder knob, a first set of buttons and a second set of buttons.

19 Claims, 30 Drawing Sheets

(56) References Cited

U.S. PATENT DOCUMENTS

| | | | | |
|---|---|---|---|---|
| 4,396,976 A * | 8/1983 | Hyatt | B60R 16/0373 | 700/1 |
| 4,538,233 A * | 8/1985 | Resnick | G05B 19/41 | 318/568.1 |
| 4,645,902 A * | 2/1987 | Hayakawa | B23K 9/0953 | 219/125.11 |
| 4,943,701 A | 7/1990 | Nakajima | | |
| 4,988,201 A * | 1/1991 | Sugitani | B23K 9/0956 | 219/124.34 |
| 5,053,976 A * | 10/1991 | Nose | B25J 9/1607 | 700/251 |
| 5,148,000 A * | 9/1992 | Tews | B23K 9/1087 | 219/125.11 |
| 5,243,266 A * | 9/1993 | Kasagami | B25J 9/1682 | 318/568.1 |
| 5,278,390 A * | 1/1994 | Blankenship | B23K 9/0953 | 219/130.5 |
| 5,406,050 A * | 4/1995 | Macomber | B23K 9/1068 | 219/130.1 |
| 5,410,126 A * | 4/1995 | Miller | B23K 9/1043 | 219/130.1 |
| 5,676,857 A * | 10/1997 | Parker | B23K 9/0286 | 219/61 |
| 5,798,627 A * | 8/1998 | Gilliland | B25J 9/1671 | 318/568.13 |
| 5,834,916 A | 11/1998 | Shimogama | | |
| 5,932,123 A * | 8/1999 | Marhofer | B23K 9/12 | 219/130.01 |
| 5,954,089 A * | 9/1999 | Seymour | F16K 31/0675 | 137/487.5 |
| 5,981,906 A * | 11/1999 | Parker | B23K 9/0286 | 219/137 PS |
| 6,096,994 A * | 8/2000 | Handa | B23K 9/1062 | 219/130.5 |
| 6,107,601 A * | 8/2000 | Shimogama | B23K 9/1037 | 219/130.01 |
| 6,167,328 A * | 12/2000 | Takaoka | B25J 9/1671 | 318/568.1 |
| 6,297,472 B1 * | 10/2001 | Bong | B23K 9/0203 | 219/125.12 |
| 6,317,646 B1 * | 11/2001 | de Caussin | G05B 19/40937 | 700/173 |
| 6,492,618 B1 * | 12/2002 | Flood | B23K 9/0286 | 219/125.11 |
| 6,609,033 B1 * | 8/2003 | Kawai | B23K 11/252 | 219/109 |
| 6,622,058 B1 * | 9/2003 | Picard | B23K 10/00 | 219/121.55 |
| 6,772,040 B1 * | 8/2004 | Picard | B23K 10/006 | 219/121.11 |
| 6,853,878 B2 * | 2/2005 | Hirayama | B23K 9/126 | 219/124.33 |
| 6,853,881 B2 * | 2/2005 | Watanabe | B25J 9/1671 | 219/121.63 |
| 6,930,280 B2 * | 8/2005 | Zauner | B23K 9/0953 | 219/130.5 |
| 6,984,805 B2 * | 1/2006 | Shimogama | B23K 9/0953 | 219/124.34 |
| 7,028,882 B2 * | 4/2006 | Kislovsky | B23K 9/126 | 219/59.1 |
| 7,164,971 B2 * | 1/2007 | Ferla | B25J 13/06 | 700/247 |
| 7,170,032 B2 * | 1/2007 | Flood | B23K 9/167 | 219/137 R |
| 7,177,724 B2 * | 2/2007 | Cantello | B25J 13/06 | 700/247 |
| 7,185,774 B2 * | 3/2007 | Colgate | B66C 17/00 | 212/270 |
| 7,220,941 B2 * | 5/2007 | Niedereder | B23K 9/0953 | 219/130.5 |
| 7,245,990 B2 * | 7/2007 | Watanabe | B25J 13/003 | 318/568.1 |
| 7,291,808 B2 * | 11/2007 | Burgstaller | B23K 9/1087 | 219/130.01 |
| 7,355,145 B2 * | 4/2008 | Ikeda | B23K 9/0953 | 219/125.1 |
| 7,424,341 B2 * | 9/2008 | Watanabe | G06T 1/0014 | 318/568.1 |
| 7,430,457 B2 * | 9/2008 | Watanabe | B25J 9/1656 | 318/568.11 |
| 7,515,993 B2 * | 4/2009 | Tanaka | B25J 9/1658 | 700/264 |
| 7,720,573 B2 * | 5/2010 | Yamada | B25J 19/023 | 700/245 |
| 8,330,077 B2 * | 12/2012 | Rappl | B23K 9/1006 | 219/130.1 |
| 8,487,213 B2 * | 7/2013 | Asai | B23K 9/0953 | 219/124.1 |
| 8,812,159 B2 * | 8/2014 | Maehara | B25J 9/1676 | 318/568.11 |
| 8,847,115 B2 * | 9/2014 | Casner | B23K 9/0953 | 219/130.5 |
| 8,849,680 B2 * | 9/2014 | Wright | B25J 9/1689 | 705/2 |
| 8,851,896 B2 * | 10/2014 | Wallace | G09B 5/00 | 434/234 |
| 8,916,791 B2 * | 12/2014 | Gatlin | B23K 9/0286 | 219/60 A |
| 10,315,310 B2 * | 6/2019 | Hida | B25J 9/161 | |
| 10,672,294 B2 * | 6/2020 | Albrecht | G09B 5/02 | |
| 2001/0025836 A1 * | 10/2001 | Shimogama | B23K 9/1062 | 219/125.1 |
| 2001/0045809 A1 * | 11/2001 | Mukai | B25J 13/06 | 318/568.22 |
| 2003/0040840 A1 * | 2/2003 | Hirayama | B23K 9/126 | 700/245 |
| 2003/0062352 A1 * | 4/2003 | Kislovsky | B23K 9/0953 | 219/130.21 |
| 2004/0068335 A1 * | 4/2004 | Ferla | G05B 19/425 | 700/86 |
| 2004/0260426 A1 * | 12/2004 | Johannessen | B25J 19/06 | 700/245 |
| 2005/0045608 A1 * | 3/2005 | Sykes | B23K 9/1062 | 219/130.5 |
| 2005/0109735 A1 * | 5/2005 | Flood | B23K 9/324 | 219/75 |
| 2006/0213887 A1 * | 9/2006 | Kaufman | B23K 9/32 | 219/130.1 |
| 2007/0262065 A1 * | 11/2007 | Peters | B23K 9/32 | 219/130.5 |
| 2008/0061047 A1 * | 3/2008 | Borowy | B23K 9/32 | 219/130.1 |
| 2008/0149607 A1 * | 6/2008 | Albrecht | B23K 9/1087 | 219/130.1 |
| 2008/0149608 A1 * | 6/2008 | Albrecht | B23K 9/123 | 219/130.1 |
| 2008/0243306 A1 * | 10/2008 | Koike | B23K 9/1272 | 700/250 |
| 2009/0039064 A1 * | 2/2009 | Enyedy | B23K 9/1006 | 219/132 |
| 2009/0107969 A1 * | 4/2009 | Asai | B23K 9/0953 | 219/124.1 |
| 2009/0152251 A1 * | 6/2009 | Dantinne | B23K 9/0953 | 219/125.1 |
| 2010/0286826 A1 * | 11/2010 | Tsusaka | B25J 9/1633 | 700/254 |
| 2011/0049116 A1 * | 3/2011 | Rappl | B23K 9/1006 | 219/132 |
| 2011/0073569 A1 * | 3/2011 | Rappl | B23K 9/1006 | 219/73.2 |
| 2012/0080417 A1 * | 4/2012 | Oberzaucher | B23K 9/32 | 219/136 |
| 2012/0241429 A1 * | 9/2012 | Knoener | B23K 9/32 | 219/130.01 |
| 2012/0255938 A1 * | 10/2012 | Oe | B23K 26/082 | 219/124.22 |
| 2012/0298643 A1 * | 11/2012 | Lambert | B23K 9/0956 | 219/130.21 |

(56) References Cited

U.S. PATENT DOCUMENTS

| | | | |
|---|---|---|---|
| 2013/0001209 A1* | 1/2013 | Hirota | B23K 9/1062 |
| | | | 219/130.01 |
| 2013/0043220 A1* | 2/2013 | Henderson | B23K 9/1087 |
| | | | 219/74 |
| 2013/0092672 A1* | 4/2013 | Peters | B23K 9/0953 |
| | | | 219/130.31 |
| 2013/0092673 A1* | 4/2013 | Lambert | B23K 9/124 |
| | | | 219/137.71 |
| 2013/0327748 A1* | 12/2013 | Salsich | B23K 9/1087 |
| | | | 219/130.21 |
| 2013/0345868 A1* | 12/2013 | One | B23K 9/095 |
| | | | 700/252 |
| 2014/0069899 A1* | 3/2014 | Mehn | B23K 9/0953 |
| | | | 219/130.01 |
| 2015/0129581 A1* | 5/2015 | Cole | B23K 9/1087 |
| | | | 219/60 A |
| 2015/0266125 A1* | 9/2015 | Enyedy | G05G 1/30 |
| | | | 219/136 |
| 2016/0089784 A1* | 3/2016 | Koike | G05B 19/41815 |
| | | | 700/250 |
| 2020/0023455 A1* | 1/2020 | Smith | H02J 7/00 |

\* cited by examiner

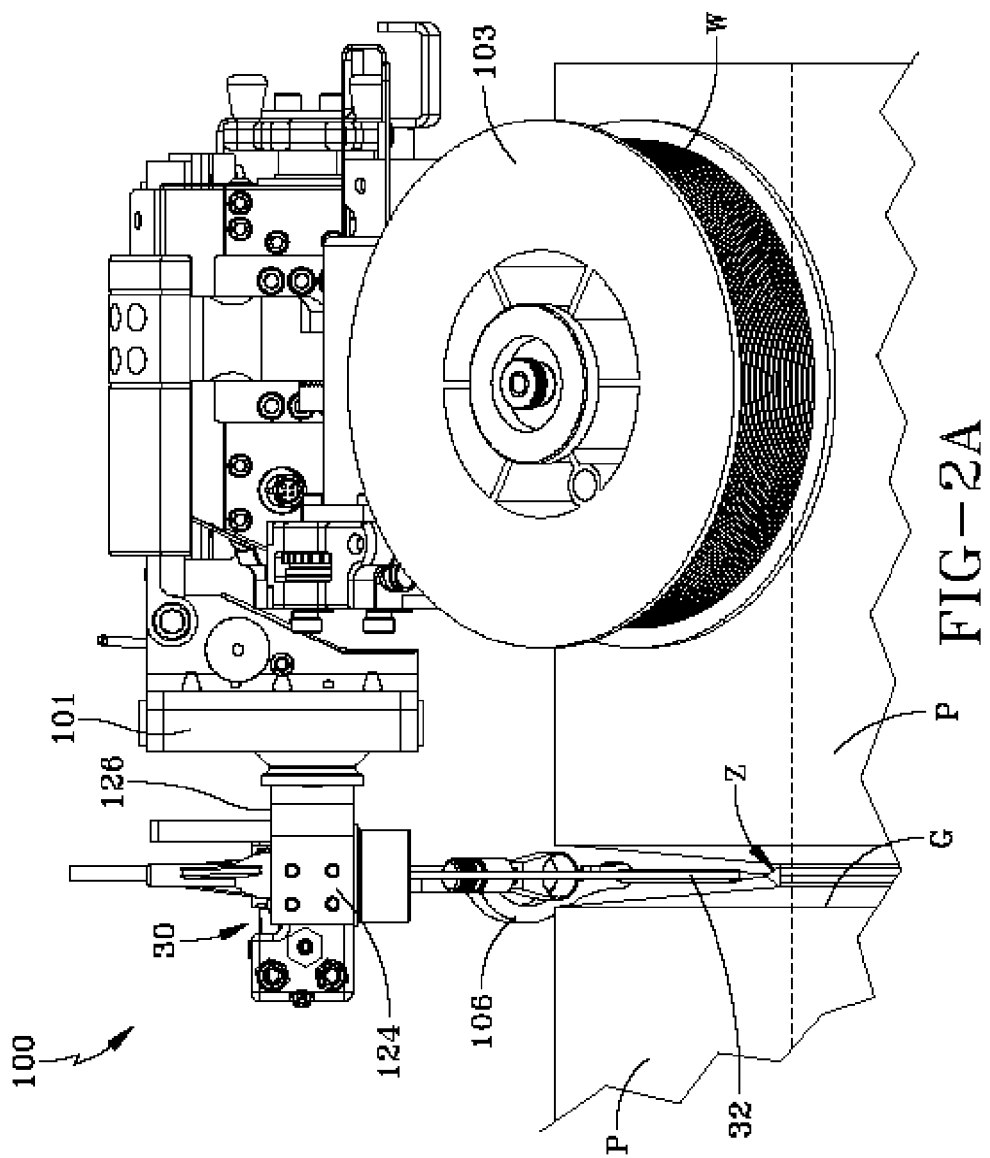

ered to render a graphic to display at least one screen; an
SYSTEM AND METHOD FOR PENDANT COMPONENT FOR A WELDING SYSTEM

PRIORITY

This application is a continuation of and claims priority to U.S. patent application Ser. No. 14/296,528, filed Jun. 5, 2014. Application Ser. No. 14/296,528 is a non-provisional of and claims the benefit of priority to U.S. Provisional Application Ser. No. 61/903,155, filed Nov. 12, 2013, and entitled "SYSTEM AND METHOD FOR PENDANT COMPONENT FOR A WELDING SYSTEM." The entireties of the aforementioned applications are incorporated herein by reference.

TECHNICAL FIELD

In general, the present invention relates to a pendant component that controls a welding system. More particularly, the present invention relates to a pendant component that provides intuitive and accessible user inputs for controlling a welding system, and in particular, a tractor welder on a track system.

BACKGROUND OF THE INVENTION

Welding systems reside at the core of the modern industrial age. From massive automobile assembly operations to automated manufacturing environments, these systems facilitate joining in ever more complicated manufacturing operations. Hot wire welding processes a wire or electrode being heated (e.g., via current) and received by a puddle created by a main heat source (e.g., plasma arc, tungsten inert gas (TIG) welding, metal inert gas (MIG) welding, flux core, among others). The hot wire welding process includes the resistance heating of the wire up to or near a melting point of such wire. In hot wire welding processes, the formation of an arc is avoided since an arc condition disrupts or overheats the puddle. A wire heated near or close to the melting point of the wire without arcing events is received by the puddle with little or no disruption. In order to prevent a formation of an arc, a welding parameter related to the workpiece can be detected. The welding parameter can indicate an arc condition in which the hot wire welding process can be adjusted.

Additionally, welding may involve raising, cladding, building up, filling, hard facing, overlaying, joining, and other welding applications. When confronted with a workpiece having a curved surface, an orbital welding process may be used to rotate the welding head to apply a weld to the curved surface. The most common examples, where orbital welding is used, is the welding of pipe. Pipe welding may include thin wall application where the welding head is rotated about the other surface two piece ends being joined together, alternatively, pipe welding may include deep groove geometries where the welding electrode extends into a grove formed between the two pipes being joined to lay down successive beads of weld material to fill the groove and join the thick walled pipes. Orbital welding systems may include a welding head that is mounted on a guide track or a fixture that clamps or is otherwise supported on the workpiece and rotated to supply a weld. Orbital welding often involves limited visibility of a welding zone with lead cameras and/or trailing cameras.

Welding systems can include numerous controls that can be adjusted by a user during a welding operation. For instance, conventional welding systems can include up to sixteen (16) buttons, inputs, and switches that require years of experience to comprehend and use efficiently. Often, a change in one adjustment can lead to a change in another adjustment in order to maintain consistency.

Orbital welding systems and non-orbital welding systems can be compromised by the number of adjustments a user can implement and what is needed is an improved device control such welding system in a more efficient manner.

SUMMARY OF THE INVENTION

In accordance with an embodiment of the present invention, a hand-held device is provided. The device includes a processor coupled to a memory, the processor configured to execute the following computer-executable components stored in the memory: a display component that is configured to render a graphic to display at least one screen; an input component that is configured to receive an input associated with the graphic; and an output component that is configured to communicate a first electronic signal to a welding system based on the input, wherein the electronic signal controls a portion of the welding system. The input component can include a first toggle switch that is configured to receive an input for navigation on the at least one screen; a second toggle switch that is configured to receive an input for selection of a value for one or more parameters displayed on the at least one screen; an encoder knob that is configured to receive at least one of a rotational input to control a motion for a torch to move to and from a track and a depressing input to move the torch to a center position; a first set of inputs that are configured to allow selection based on the at least one screen; and a second set of inputs that are configured to allow selection of one or more parameters, wherein the second toggle switch provides selection for a value of the parameter selected. The device can further include a power source that is configured to generate a portion of electrical power for consumption by at least one of the processor, the memory, the display component, the input component, or the output component. Further, the first toggle switch can be configured to receive an input for a value change of one or more parameters displayed on the at least one screen, wherein the value change is for a parameter that is selected by default, pre-defined, pre-programmed, and the like.

In an embodiment, a device (also referred to as a pendant component) is provided that is in electrical communication with an orbital welding system that includes: a welding torch detachably coupled to a track affixed adjacently to a pipe, wherein the welding torch includes an electrode to perform a welding operation to deposit a layer of material onto the pipe and the welding operation is on an inner diameter of the pipe or an outer diameter of the pipe; and a welding power source that creates an arc between the electrode and the workpiece. The device further includes a processor coupled to a memory, the processor configured to execute the following computer-executable components stored in the memory: a display component that is configured to render a graphic to display at least one screen; an input component that is configured to receive an input associated with the graphic; and an output component that is configured to communicate an electronic signal to the orbital welding system based on the input, wherein the electronic signal controls a portion of the welding system. The input component further includes the following: a first toggle switch that is configured to receive an input for navigation on the at least one screen; a second toggle switch that is configured to receive an input for selection of a value for one or more parameters displayed on the at least one screen; an encoder knob that is configured to receive at least one of a rotational input to control a motion for a torch to move to and from a track and a depressing input to move the torch to a center position; a first set of inputs that are configured to allow selection based on the at least one screen; and a second set of inputs that are configured to allow selection of one or more parameters, wherein the second toggle switch provides selection for a value of the parameter selected. The device can further include a power source that is configured to generate a portion of electrical power for consumption by at least one of the processor, the memory, the display component, the input component, or the output component. Further, the first toggle switch can be configured to receive an input for a value change of one or more parameters displayed on the at least one screen, wherein the value change is for a parameter that is selected by default, pre-defined, pre-programmed, and the like.

In an embodiment, an orbital welding system is provided that includes a welding torch detachably coupled to a track affixed adjacently to a pipe, wherein the welding torch includes an electrode to perform a welding operation to deposit a layer of material onto the pipe and the welding operation is on an inner diameter of the pipe or an outer diameter of the pipe; and a welding power source that creates an arc between the electrode and the workpiece. The system can further comprise a pendant component that includes: a processor coupled to a memory, the processor configured to execute the following computer-executable components stored in the memory: a display component that is configured to render a graphic to display at least one screen; an input component that is configured to receive an input associated with the graphic; and an output component that is configured to communicate an electronic signal to the orbital welding system based on the input, wherein the electronic signal controls a portion of the welding system. The input component further includes the following: a first toggle switch that is configured to receive an input for navigation on the at least one screen; a second toggle switch that is configured to receive an input for selection of a value for one or more parameters displayed on the at least one screen; an encoder knob that is configured to receive at least one of a rotational input to control a motion for a torch to move to and from a track and a depressing input to move the torch to a center position; a first set of inputs that are configured to allow selection based on the at least one screen; and a second set of inputs that are configured to allow selection of one or more parameters, wherein the second toggle switch provides selection for a value of the parameter selected. Further, the first toggle switch can be configured to receive an input for a value change of one or more parameters displayed on the at least one screen, wherein the value change is for a parameter that is selected by default, pre-defined, pre-programmed, and the like.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 2A illustrates a side view of an orbital welding system;

DETAILED DESCRIPTION OF THE INVENTION

Figure 1:
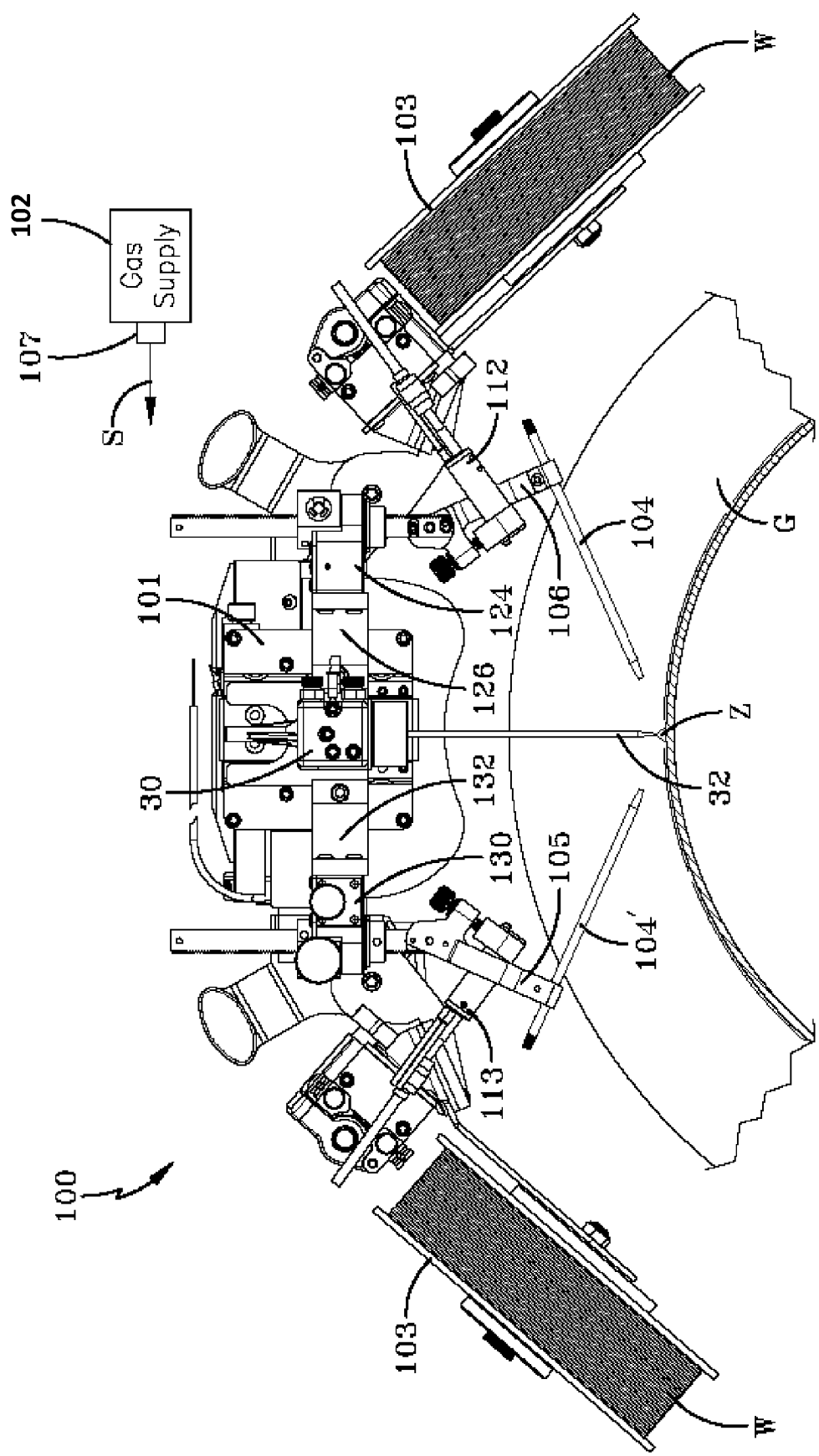
FIG. 1 illustrates a front view of an orbital welding system.
Figure 2B:
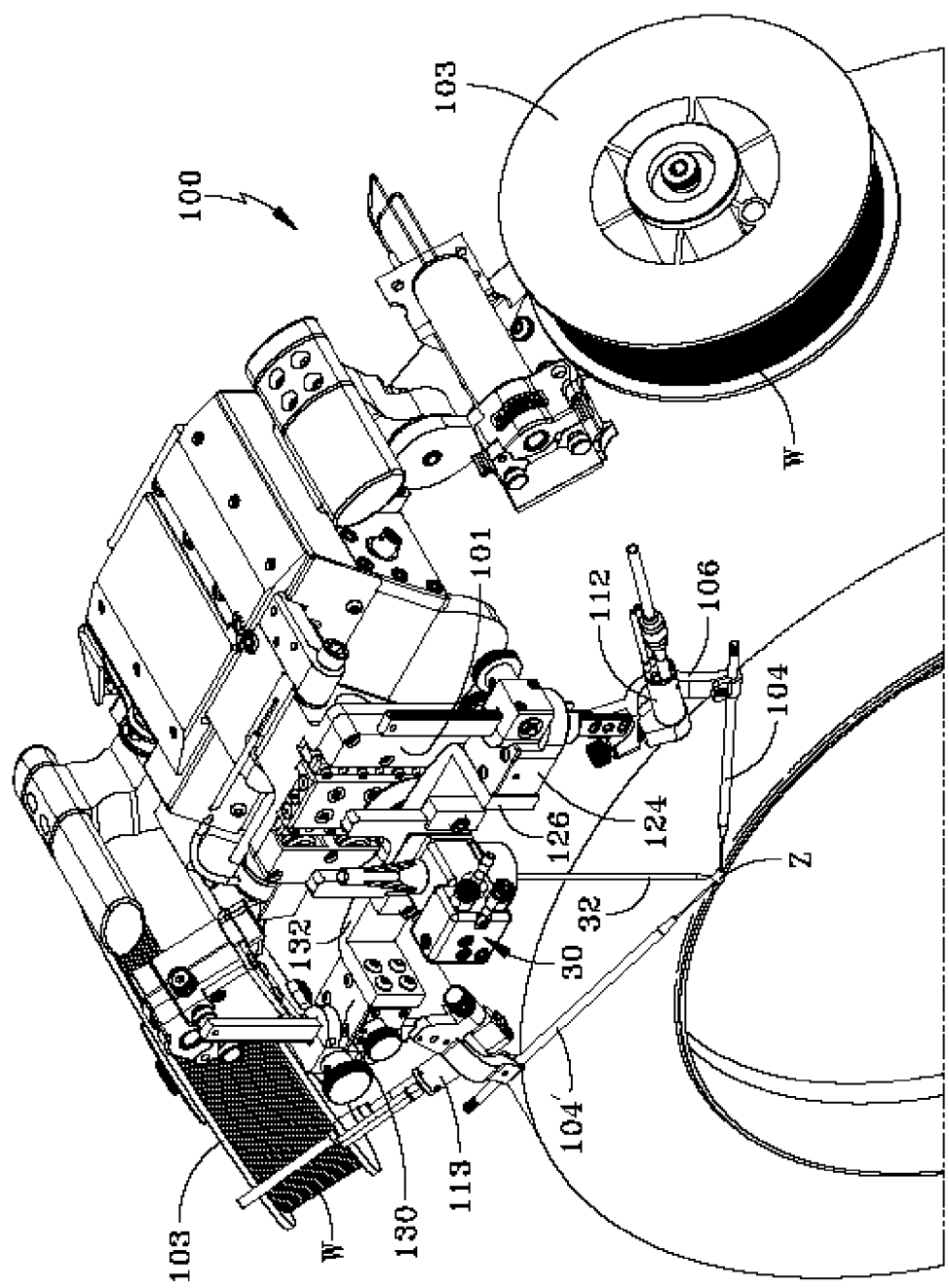
FIG. 2B illustrates a perspective view of an orbital welding system.

Embodiments of the invention relate to methods and systems that relate to controlling a welding system having a tractor welder engaged with a track by utilizing a pendant component that is configured to receive an input from a user and displaying data via a graphical display. The pendant component includes one or more inputs that correspond to data displayed, wherein the one or more inputs include a first toggle switch and a second toggle switch, an encoder knob, a first set of buttons and a second set of buttons. The first toggle switch and the second toggle switch control navigation and value selection for a parameter. The encoder knob is a dedicated control for torch head movement in relation to a track and further includes a centering feature based on a depression of the encoder knob. The first set of buttons and the second set of buttons can be respectively used for selection based on the displayed data and parameter adjustment selection.

"Welding" or "weld" as used herein including any other formatives of these words will refer to depositing of molten material through the operation of an electric arc including but not limited to submerged arc, GTAW, GMAW, MAG, MIG, TIG welding, or any electric arc used with a welding system.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-4 illustrate a welding system that is used with an automated or semi-automated welding system. One illustrative example of a welding system is orbital welding, which is often used for the joining of tubes or pipes of various types of materials. For example, a Tungsten Inert Gas (TIG) or Gas Tungsten Arc Welding (GTAW) welding torch may be used to orbit around the pipes to be welded together by an automated mechanical system. FIGS. 1-28 illustrate an example embodiment of orbital welding system 100 (also referred to as welder, system, welding system, and/or welder system) as used in an orbital welding environment. Orbital welding system 100 includes a welding tractor (not shown) that travels around the pipes or tubes, a welding power source (not shown) and controller (not shown), and a pendant (not shown) providing operator control. It is to be appreciated that the subject innovation can be used with any orbital or non-orbital welding system. Moreover, the subject innovation can be used with any welding operation that includes an arc and a hot wire that is liquefied to deposit welding material onto a workpiece.

System 100 (as seen in FIGS. 1-28) is generally used in deep groove welding. In the example shown, welding system 100 includes an orbital TIG welder having a welder body or chassis 101, which may be attached to the work piece or supported on a track. Welder 100 includes a welding torch, generally indicated at 30, having a welding electrode 32 for depositing weld material to form a weld joint at welding zone Z. Electrode 32 is an extended electrode having an electrode length suitable for the groove G being welded. Extended electrode 32 may have any length suitable for a given deep groove weld, including lengths greater than 10 millimeters. As depicted in the example shown, electrode length may be greater than 100 millimeters. The particular example shown has a length of about 120 millimeters. This example is not limiting as electrodes having greater or lesser lengths may be used depending on the depth of the groove G.

Welding torch 30 is connected to a shield gas supply 102, that provides an inert gas, such as Argon gas, to welding torch 30. Welding gas supply 102 may include a container, such as a cylinder, that stores shield gas S under pressure, and delivery of shield gas S, via appropriate tubing or other conduits, may be controlled by a regulator or other controller 107. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welder may include a wire feeder connected to a supply of welding wire, such as a spool 103 that provides wire W to one or more wire guides 104', 104. In the example shown, a pair of extended wire guides 104', 104 are provided and fed by independent spools 103 located on either side of chassis 101. The extended wire guides 104', 104 are supported on first camera device 113 and wire guide system 105 (also referred to as first mount system 105) and second camera device 112 and wire guide system 106 (also referred to as second mount system 106) respectively that are each laterally outward of electrode 32 and above the workpiece or pipe P. It is to be appreciated that the support for the extended wire guides 104', 104 can be chosen with sound engineering judgment without departing from the intended scope of coverage of the embodiments of the subject invention.

The orbital welding system can include wire guides 104', 104 can include a position device that provides automated or semi-automated motion, wherein the motion can be in any direction within a 3-dimensional environment in proximity to an arc created within welding zone Z. For instance, the wire guides 104', 104 can extend inward and downward toward electrode 32 and welding zone Z. The example welder is supported on a track and drive by a tractor drive around pipe (also referred to as workpiece W) with wire guides 104', 104 being located in lead and lag positions relative to welding electrode 32. In an embodiment, first mount system 105 is coupled to height adjustment device 130 that allows adjustment of first mount system 105 toward welding zone Z or away welding zone Z. It is to be appreciated that the adjustment toward welding zone Z or away welding zone Z can be automated or semi-automated. Further, the adjustment can be to a side of the welding zone Z or to an opposite side of the welding zone Z (e.g., a left motion, a right motion, etc.). Height adjustment device 130 is further coupled to support member 132 that is coupled to a portion of chassis 101 of welder system 100. Similarly, second mount system 106 is coupled to height adjustment device 124 that allows adjustment of second mount system 106 toward welding zone Z or away welding zone Z. It is to be appreciated that the adjustment toward welding zone Z or away from welding zone Z can be automated or semi-automated. Further, the adjustment can be to a side of the welding zone Z or to an opposite side of the welding zone Z (e.g., a left motion, a right motion, etc.). Height adjustment device 124 is further coupled to support member 126 that is coupled to a portion of chassis 101 of welder system 100.

First mount system 105 supports camera device 113 and wire guide 104', wherein both camera device 113 and wire guide 104' are positioned to aim on or toward welding zone Z. Similarly, second mount system 106 supports camera device 112 and wire guide 104, wherein both camera device 112 and wire guide 104 are positioned to aim on or toward welding zone Z. It is to be appreciated that system 100 includes camera device 112 and camera device 113 but such devices are solely for illustrating various embodiments and are not to be considered limiting on the subject innovation. It is to be appreciated that camera device 113 and wire guide 104' move together (or independently) with welder system 100 which enables supply of welding wire consistently at welding zone Z and/or where wire is fed from wire guide 104'. It is to be appreciated that camera device 112 and wire guide 104 can move together (or independently) with welder system 100, which enables supply of welding wire consistently at welding zone Z and/or where wire is fed from wire guide 104' and ultimately from wire feeder (wire supply or spool 103).

Figure 3A:
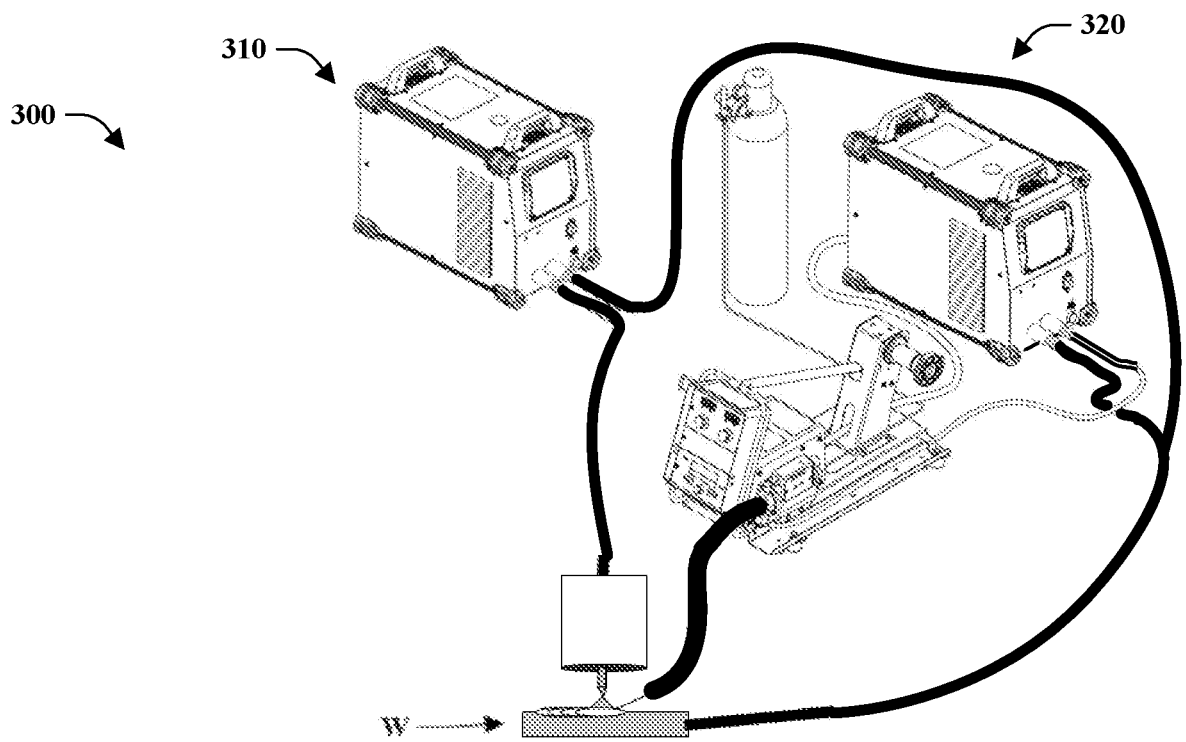
FIG. 3A is a diagram illustrating portion of a hot wire welding system.
Figure 3B:
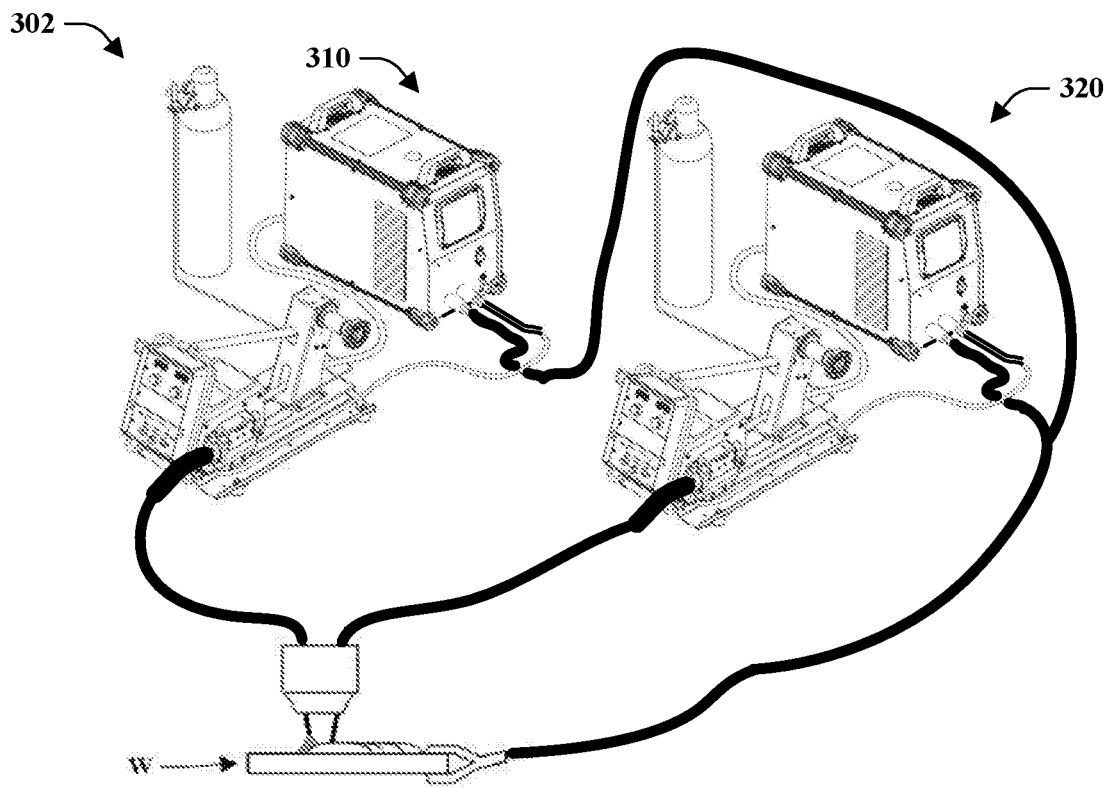
FIG. 3B is a diagram illustrating portion of a hot wire welding system.

FIGS. 3A and 3B illustrate diagrams of a hot wire welding system 300 and a hot wire welding system 302 in accordance with the subject innovation. For instance, hot wire welding system 300 can be a TIG welding system and hot wire welding system 302 can be a MIG welding system. As discussed above, it is to be appreciated and understood that any suitable hot wire welder system can be implemented with the subject innovation and such systems in FIGS. 1-38 are not to be limiting on the scope of the subject claims. System 300 includes a first power supply 310 that provides a first heat source to create an arc between an electrode (e.g., a non-consumable electrode for instance) and a workpiece W, wherein a puddle is created by the electrode. System 300 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W.

System 302 includes a first power supply 310 that provides a first heat source to create an arc between an electrode (e.g., a non-consumable electrode for instance) and a workpiece W, wherein a puddle is created by the electrode. System 302 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W. It is to be appreciated that welding systems 100, 300 and 302 can be chosen and used with sound engineering judgment without departing from the intended scope of coverage of the embodiments of the subject invention.

It is to be appreciated that systems 300 and 302 can be a hot wire TIG welder system or a hot wire tandem welder system. The subject innovation can relate to an arc that is created by any suitable wire processes, wherein such wire processes can include non-consumable electrode processes.

FIGS. 4, 8-11, and 32 illustrate a device 402, and in particular, pendant component 402 that can be utilized to communicate and/or receive data with welding system 404, wherein welding system 404 can be a suitable welding environment such as, but not limited to orbital welding system (e.g., orbital welding system 100), a welding system (e.g., welding system 300, 302), and the like. Device 402 can be a hand-held device that is used to control a tractor welder that is affixed to a track as well as receive data communications from such tractor welder. Device 402 is illustrates as a hand-held device that can include physical indentations or curvature to fit to a user's hand. Moreover, as discussed below, device 402 includes a streamlined set of inputs to control welding system 404, whereas conventional techniques include a plurality of inputs for each control. In other words, device 402 (also referred to as pendant component 402) reduces inputs by eliminating an input for each parameter that can be controlled.

Figure 4:
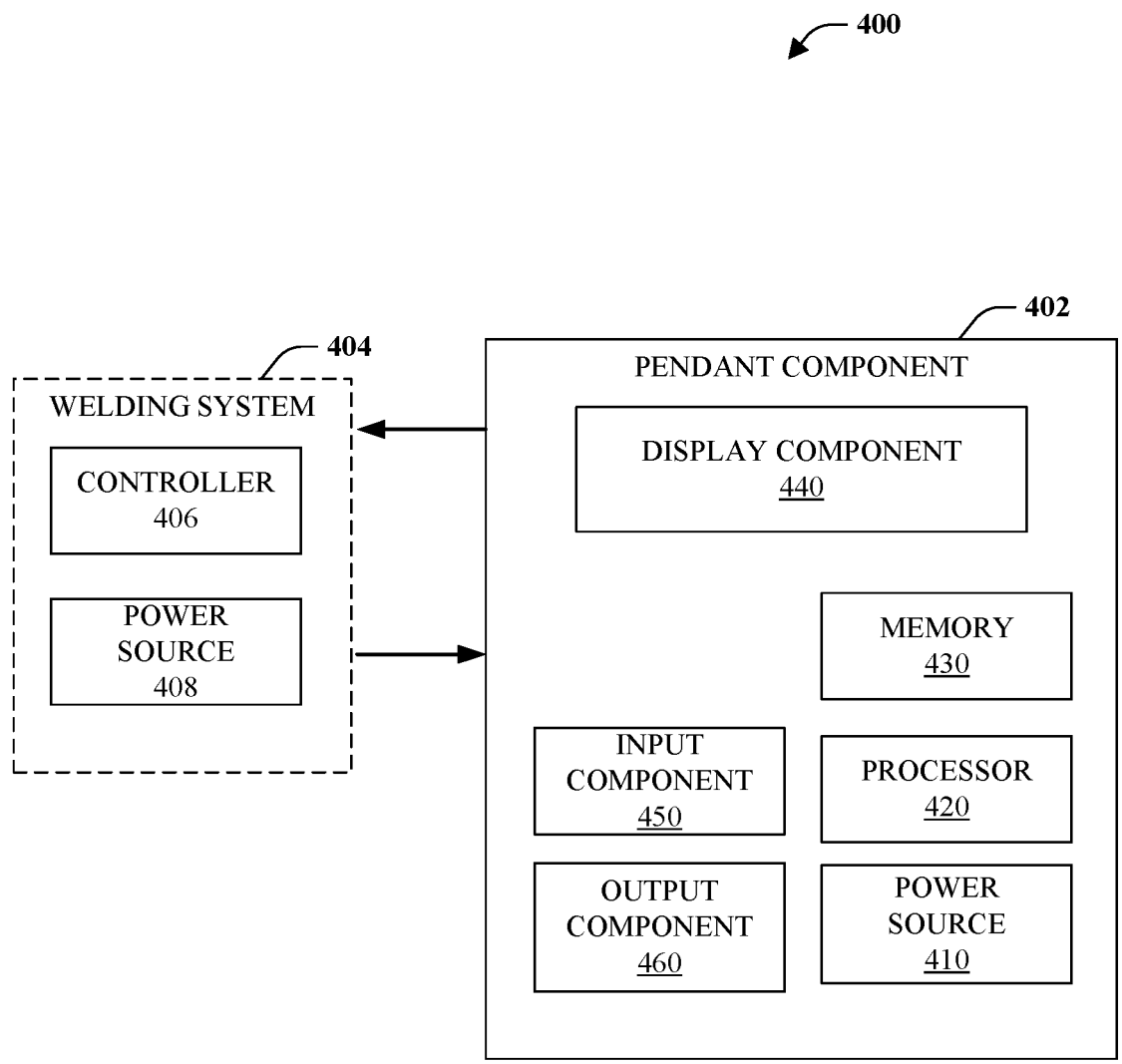
FIG. 4 is a diagram illustrating a system that includes a device that provides user interaction with a welding system.

FIG. 4 illustrates system 400 that includes a device (also referred to as pendant component 402) that communicates with welding system 404. Pendant component 402 can be configured to transmit and/or receive data between a user or an operation and a portion of welding system 404. In an embodiment, pendant component 402 can transmit data to controller 406 and power source 408 to manage a welding operation performed by the welding system 404. Yet, it is to be appreciated that pendant component 402 can receive data associated with the welding system 404 as well as transmit data to control welding system 404. In particular, pendant component 402 is a separate component from welding system 404, wherein connectivity therebetween is at least electrical signals associated with power and/or control via wired, wireless, or a combination thereof. By way of example and not limitation, a welding parameter value can be set by a user via pendant component 402 in which at least one of controller 406 or power source 408 performs the welding parameter at the user setting. Moreover in such example, pendant component 402 can display the welding parameter with real time feedback to display the value of the welding parameter.

Generally, the welding parameter can be, but is not limited to being, a welding parameter that affects arc current level for the welding operation. Yet, it is to be appreciated that the welding parameter can be, but is not limited to being, an arc voltage, a travel speed of a tractor welder that performs the welding operation, a wire feed speed, an arc current level, a height of torch, a distance between workpiece W and torch, an oscillation width of electrode, a temperature of welding wire, a temperature of electrode, a type of material of workpiece W, a frequency of oscillation of electrode, a polarity of the arc current, a polarity of the current for welding wire, a parameter that affects an arc current of the welding operation, a type of electrode, a gauge of wire, a material of wire, oscillation dwell, left oscillation dwell, right oscillation dwell, any and all variation of advanced process controls (e.g., move controls, pulse-frequency, ramp rates, background level ratios, etc.), and the like.

Pendant component 402 includes at least power source 410 that supplies a portion of power to one or more components utilized by the pendant component 402 such as, but not limited to, processor 420, memory 430, input component 450, output component 460, communication component 802, authentication component 804, media component 806, GPS component 808, motion detection component 810, safety component 812, log component 816, or data store 818. In an embodiment, power source 410 is a battery, an external power source, a DC power source, an AC power source, or a combination thereof. It is to be appreciated that power source 410 can be an external power source such as a power cord that connects to a power supply such as, but not limited to, a power grid, a generator, an outlet, and the like. In another embodiment, power source 410 can be a rechargeable battery that includes a charging station (not shown) in which the charging stations supplies power to charge the rechargeable battery. In such embodiment, pendant component 402 can include one or more notifications (not shown) that illustrate a battery level is low or a charge is requested.

Pendant component 402 can include input component 450 that is configured to receive an input from at least one of a user, an operator, a machine, a computing device, among others. Input component 450 can be, but is not limited to being, a button, a switch, a toggle switch, a knob, an encoder knob, a touchpad, a joystick, a touch screen, a mouse, a mouse button, a keyboard, a keypad, a microphone, a camera, a video camera, a motion sensor, and the like. In general, input component 450 can receive an input from a user or an operator to control a portion of welding system 404. For instance, the input can be, but is not limited to being, a button activation, a switch activation, a voice command, a motion, a gesture, a hand gesture, an eye movement, a sound, a touch screen input, and the like. The input received via input component 450 can be a value or a setting for a welding parameter for welding system 404. In another embodiment, input component 450 can receive selections from a user or an operator to determine a welding mode, a welding setting, a configuration of a welding component, among others (as discussed in more detail below).

Output component 460 can further be included with pendant component 402, wherein output component 460 can transmit the input received via input component 450 to welding system 404. For instance, a welding parameter can be set to a value via input component 450 and communicated to welding system 404 via output component 450. Moreover, output component 460 can receive data from welding system 404 for display via display component 440. For instance, data related to one or more parameters of the welding operation performed by welding system 404 can be communicated to output component 460 for display via display component 440. It is to be appreciated that output component 460 can communicate with welding system 404 with a wireless signal, a wired signal, or a combination thereof. Further, display component 440 can render a portion of a graphic for display and can include a speaker for audio. For instance, display component 440 can illustrate graphics related to settings, welding parameters, welding modes, positions of a tractor welder, user settings, types of welding, and the like. Display component 440 can include a video graphics engine and a display, wherein the display can be, but is not limited to, a screen, a CRT, an LCD, a plasma screen, a dot matrix screen, a monitor, etc. In an embodiment, display component 440 is external to pendant component 402 and a wired or wireless connection is used to render graphics for display. For instance, pendant component 402 can include a port (e.g., video port, graphics port, HDMI, VGA, serial, S-Video, USB, component, etc.) to connect to an external device for display of data. For instance, pendant component 402 can connect to a tablet for display of data via a wired or wireless connection. It is to be appreciated that pendant component 402 can utilize an internal display and/or external display and such examples are not limiting on the subject innovation.

Figure 5:
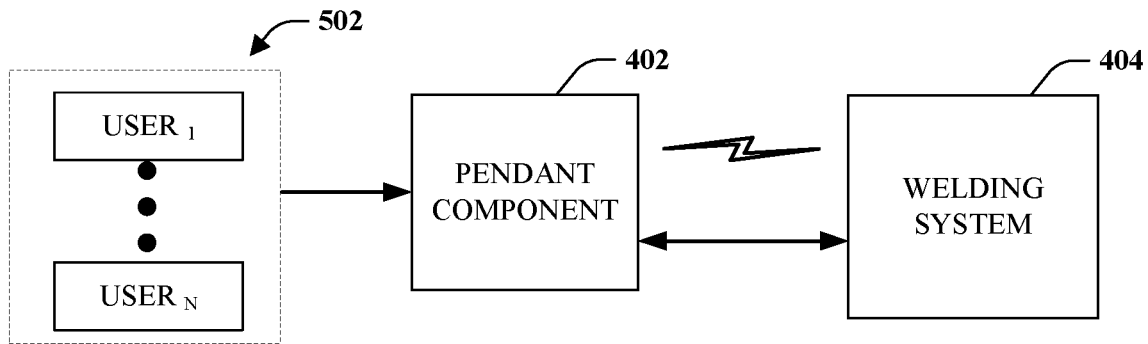
FIG. 5 is a diagram illustrating a device utilized by a plurality of users to interact with a welding system.
Figure 6:
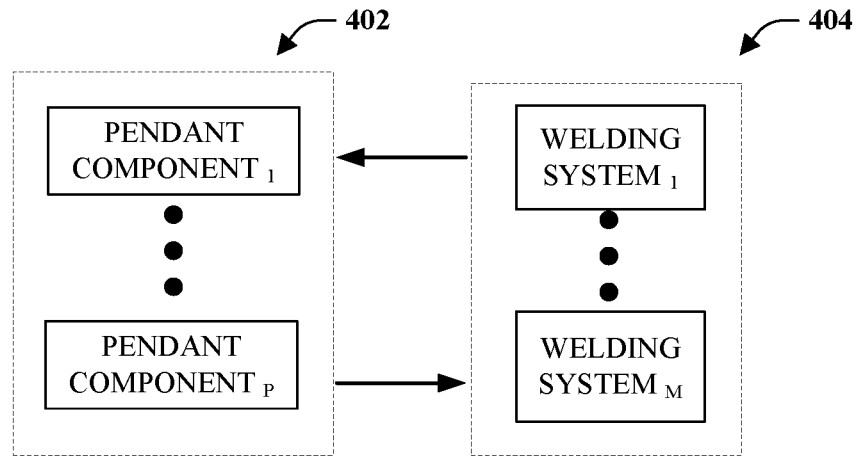
FIG. 6 is a diagram illustrating a plurality of devices utilized to interact with a plurality of welding systems.
Figure 7:
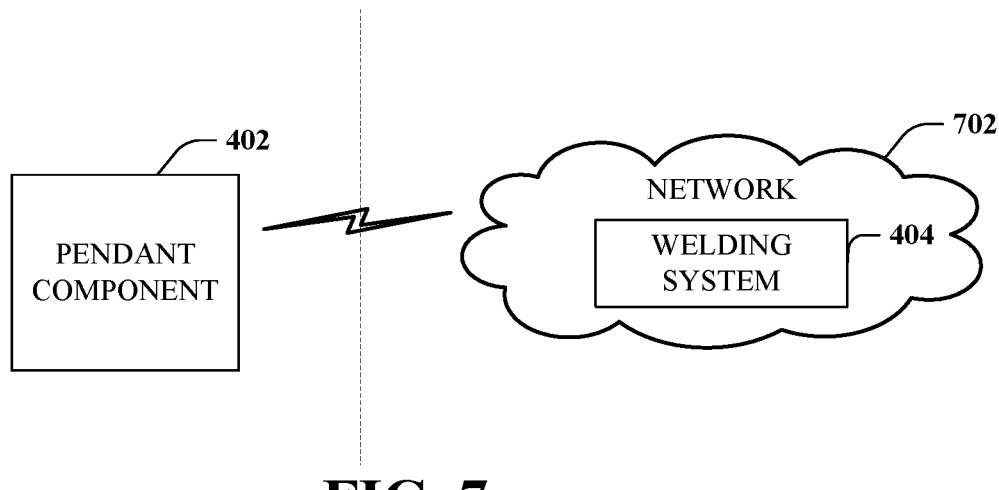
FIG. 7 is a diagram illustrating a device communicating with a welding system over at least one of a network or a subnetwork.
Figure 8:
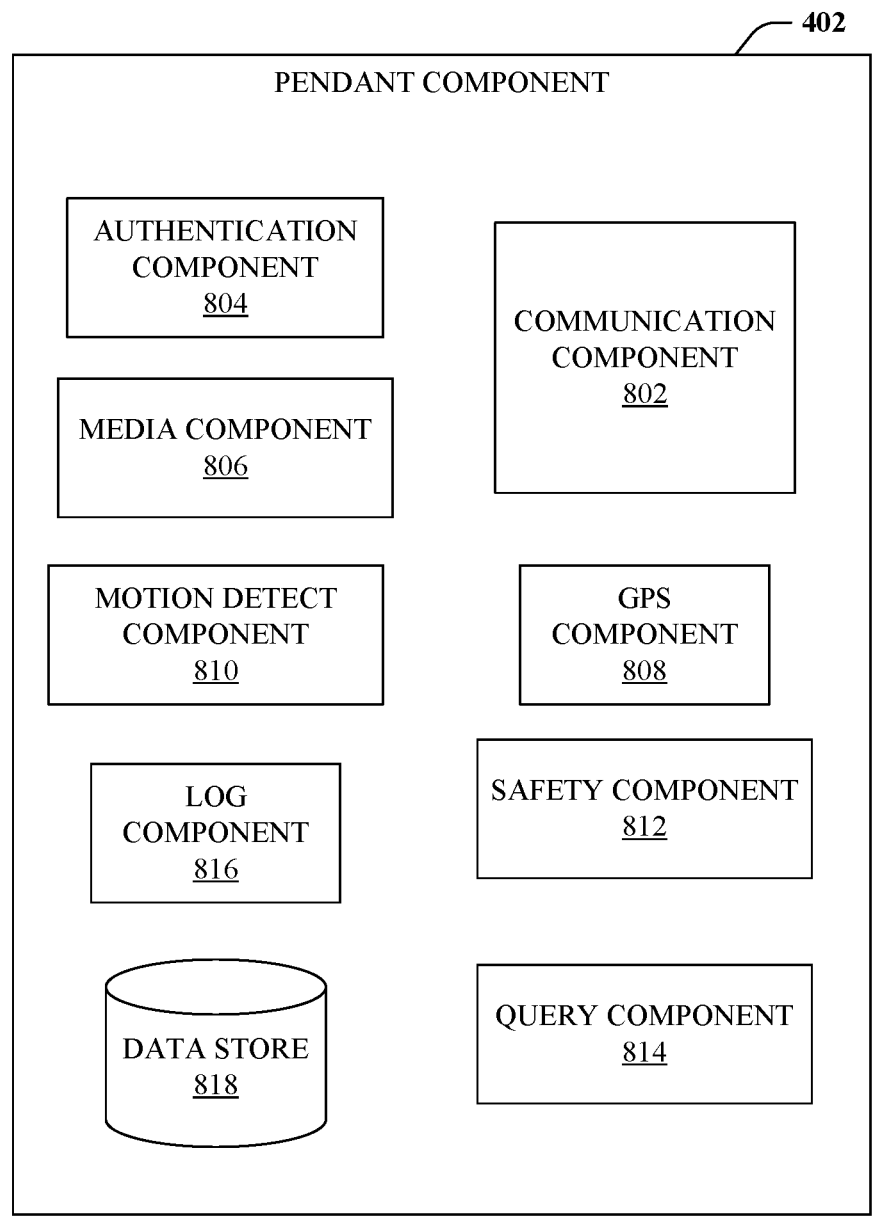
FIG. 8 is a diagram of an embodiment of a device to interact with a welding system.

Turning to FIGS. 5-7, various configurations for pendant component 402 and welding system 404 are illustrated. It is to be appreciated that the following examples are for illustrative purposes only and are not to be limiting on the subject innovation. FIG. 5 illustrates a plurality of users 502 that can interact with pendant component 402 to control a portion of welding system 404 and/or receive data from welding system 404. For instance, there can be any suitable number of users 502 such as, $user_1$ to $user_N$, where N is a positive integer. For instance, a welding environment can include one or more welding cells in which welding operations are performed, wherein a welding cell can include a welder tractor on a track that utilizes a pendant component. As various users or operators work in the welding cell, each user can share the pendant component. In this particular example, each operator or user can be authenticated via a log in (discussed in more detail below). As illustrated, it is to be appreciated that pendant component 402 can transmit and/or receive data to and from welding system 404 via wired connection, a wireless connection, and/or a combination thereof.

Turning to FIG. 6, a configuration for a plurality of pendant components 402 that control a plurality of welding systems 404 is illustrated. In this example, one or more pendant components 402 can control one or more welding systems 404. In an embodiment, there can be a plurality of pendant components such as pendant $component_1$ to $pendant_P$ component, where P is a positive integer. In general, there can be any suitable ratio between pendant components 402 and welding systems 404 such as X:Y, where X and Y are respective positive integers. For instance, there can be a ratio of one-to-one, two-to-five, or one-to-two between pendant components and welding systems. In another example, a first pendant can be associated with a first welding system based on a characteristic. In such example, the characteristic can be a type of welding system, a skill of the operator, a type of weld, a type of workpiece, a years of experience, a type of employee (e.g., administrator, foreman, an operator, etc.), and the like. It is to be appreciated that a plurality of characteristics can be used between pendant components and welding systems. In another example, a first pendant component can be used with two or more welding systems 404. Based on use of authentication and logging into pendant component (discussed in more detail in relation to authentication component 804), one or more users can use a single pendant component to control two or more welding systems.

FIG. 7 illustrates pendant component 402 that communicates between networks and/or sub-networks to interact with welding system 404. In an embodiment, pendant component 402 and welding system 404 can be hosted by a first network, wherein pendant component 402 hosted by a first subnetwork of the first network communicates (e.g., receives and/or transmits data) with welding system 404 hosted by a second subnetwork of the first network. In another embodiment, pendant component 402 can be hosted by a first network and welding system 404 can be hosted by a second network, wherein the interaction between the first network and the second network is via the Internet and exchange of data packets based on Internet Protocol addresses for pendant component 402 and welding system 404 or a component of welding system 404. It is to be appreciated that the first network, the second network, the first subnetwork, the second subnetwork, and the like can be, but are not limited to being, LAN, WAN, Wi-Fi network, Ethernet Network, cellular network (e.g., 3G, 4G, LTE, etc.), a cloud-based network, a remote network, among others.

Referring back to FIGS. 4, 8-11, and 32, pendant component 402 can include communication component 802 that is configured to manage data communications associated with input component 450 and/or output component 460. For instance, communication component 802 can be any suitable connector or port for use with pendant component 402 or welding system 404. In an embodiment, communication component 802 can facilitate connecting external devices for data communication with pendant component 402. In such embodiment, the communication component can be a Universal Serial Bus (USB) port, a Controller Area Network (CAN) bus, a wireless communication transmitter, a wireless communication receiver, a 12-volt charger port, a 9-volt charger port, a micro USB port, a mini USB port, a micro-A USB port, a micro-B USB port, a mini-A USB port, a mini-B USB port, a type A USB port, a type B USB port, a serial bus, an Ethernet port, video port, graphics port, HDMI, VGA, serial, S-Video, component, a data port, an infrared port, and the like.

Pendant component 402 can further include an authentication component 804 that provides user authentication. Authentication component 804 can employ a logging in for a user or operator based on one or more credentials received. By way of example and not limitation, authentication component 804 can sign into pendant component 402 with at least one of a username and password, a voice recognition, a facial recognition, a touch screen input, touch screen pattern entry, security question, at least one number (e.g., employee number, badge number, PIN, etc.), at least one letter or symbol, a biometric data (e.g., thumbprint, inductance, fingerprint, handprint, a resistance, etc.), a keycard, wireless transmission of data (e.g., NFC, RFID, Bluetooth, etc.), a transmission of data between a device (e.g., smartphone, tablet, laptop, USB flash drive, USB pen drive, etc.) and authentication component 804, a suitable exchange of data from a user to authentication component that identifies said user, and the like.

Pendant component 402 can provide a user-specific user interface based on the logging in provided by authentication component 804. Moreover, authentication component 804 can provide component-based access for pendant component 402. In component-based access, a component described herein can be accessible or not accessible based on credentials or level of access of the user. In particular, full access to a user log may only be accessible to an administrator (e.g., access to log component 816), while log component 816 still logs data for each user regardless of level. For instance, authentication component 804 can associate a user authentication with a particular user interface that includes a level of data access. For example, each level can afford access to settings related to interaction with welding system 404. In an embodiment, a first level can be an administrative level and a second level can be an operator level. The administrative level can include features related to defining welding operations (e.g., values for parameters, type of welds, setup, etc.) for an operator(s) to use, whereas the operator level allows controls to perform a defined welding operation with welding system 404 using pendant component 402. In an embodiment, pendant component 402 can utilize a plurality of levels for users, operators, administrators, foreman, and the like. In an embodiment, each user can include a level of access. The level of access by a user can be defined by an administrator for each user during setup of pendant component 402.

At startup of pendant component 402, authentication component 804 can utilize a log in screen that displays available user interfaces based on a corresponding level of access. As will be discussed below, the amount of access for each user can be defined in various manners and the example of administrator and operator (e.g., two-level) is not to be limiting on the subject innovation.

In particular, level of access can be dynamic and tied to any user-defined criteria such as, but not limited to, skill level, years of experience, and the like. In an embodiment, pendant component 402 can include a test component (not shown) that allows a user to perform a test that, if passed, allows the user to have additional access to user interfaces with pendant component 402. In such embodiment, the test is tied to particular settings for a welding operation that can assist in identifying a skill level of the user. Moreover, the test can be monitored (e.g., real time, in-person by a supervisor, captured by video or images, etc.) and upon approval, additional access to user interfaces can be granted to the user.

Pendant component 402 can further include media component 806 that is configured to capture at least one of a portion of a video, an image, or a sound. Media component 806 can capture a portion of media based on activation to capture a portion of activity while pendant component 402 is being used. In an embodiment, a button can be activated by the user (via input component 450) which triggers a recording or a capture of an image. Media component 806 can be utilized to monitor quality, record operator progress, report complications, among others.

GPS component 808 (also referred to as Global Positioning System component 808) can identify a geographic location of pendant component 402. For instance, in an environment where pendant components are specific to each user, the GPS component 808 can be used to verify the user is at an appropriate welding cell at an appropriate time. In another embodiment, the GPS component 808 can facilitate locating a lost pendant component. In still another embodiment, GPS component 808 can be used to direct a user or operator to a particular material or workpiece for a welding operation to be performed at a specific welding system.

Pendant component 402 can include safety component 812 that provides automatic shutdown of welding system 404 based on a detected parameter. For instance, the parameter can be associated with motion detect component 810. Based on a motion of pendant component 402, safety component 812 can control a welding operation performed with welding system 404. For instance, if motion is detected that suggests a dropping of pendant component 402, safety component 812 can de-activate welding system 404. In another example, a sensor can be placed on pendant component 402 that corresponds to a user hands holding pendant component 402. In such example, if the sensor does not detect the user hands, welding system 404 can be terminated, paused, or unable to be activated. Safety component 812 provides a layer of security based on one or more sensors or collected data so that welding system 404 is not active while an operator or user does not have pendant component in his or her control (e.g., being held, within reach, etc.). In another example, safety component 812 can be a kill switch that terminates and stops a welding operation being performed with the welding system 404.

In an embodiment, pendant component 402 can further include at least one of log component 816, query component 814, and data store 818. For instance, log component 816 can track and/or record data related to authentication, user access, activity after authentication, welding operations, controls activated, user queries, among others. For instance, log component 816 can track information such as, but not limited to, date of use, duration of time for use of pendant component 402, type of welding program used during use, settings changed or updated by user, check point information, weld score information, welding sequence data, and the like. Moreover, log component 816 can track various user data in connection with use of pendant component 402. In such a case, the log component 816 can track which particular user utilized a particular user interface at a specific date and/or time. In an embodiment, a power source can log data in which pendant component 402 can interact for checkpoint monitoring (e.g., checkpoint component discussed below), production monitoring, weld score (weld score component discussed below), and the like.

Moreover, pendant component 402 can include query component 814 that allows the querying of such data stored and/or logged. In other words, query component 814 can allow a user to search most any data associated with pendant component 402 and/or welding system 404. In an embodiment, query component 814 can receive a user query via input component 450 and query component 814 can evaluate data stored in data store 818 and/or collected by log component 816 to identify a search result for the user query. For instance, a user can query a welding parameter setting used with a particular welding operation and query component 816 can provide a search result based on a stored welding parameter. In another example, a query can relate to a user authentication on a particular date and a search result can be provided.

Pendant component 402 further includes data store 818 that can include any suitable data related to authentication component 804, communication component 802, media component 806, GPS component 808, motion detect component 810, safety component 812, query component 814, log component 816, and the like. For example, data store 818 can include, but not limited to including, authentication data, GPS data, media captured, motion detected data, welding sequences, welding parameters, historic data, and the like. A "data store" or "memory" can be, for example, either volatile memory or nonvolatile memory, or can include both volatile and nonvolatile memory. The data store of the subject systems and methods is intended to comprise, without being limited to, these and other suitable types of memory. In addition, the data store can be a server, a database, a hard drive, a flash drive, a pen drive, an external hard drive, a portable hard drive, a cloud-based storage, a solid-state drive, and the like.

Figure 9:
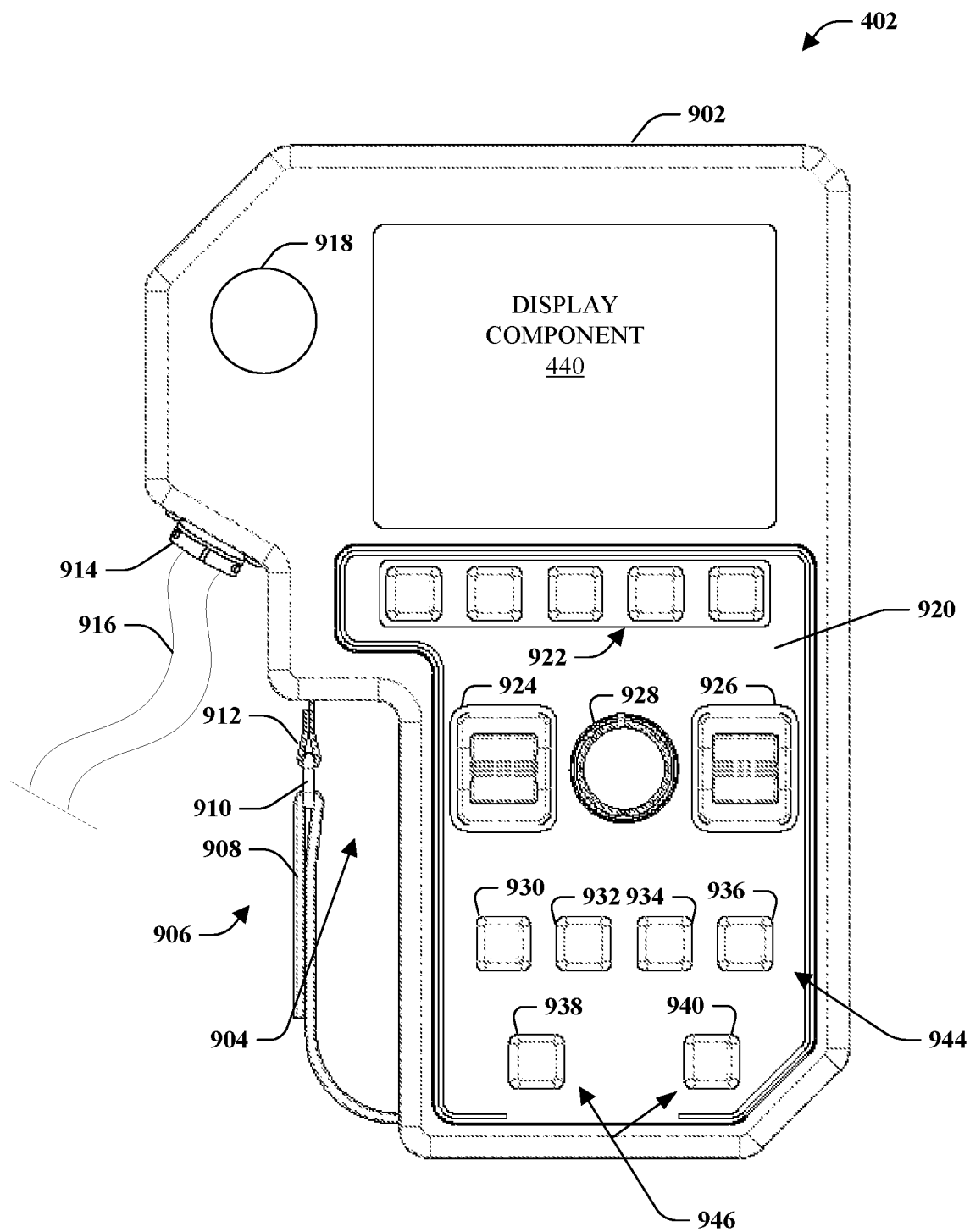
FIG. 9 is a diagram of a front view of an embodiment of a device used to interact with a welding system.
Figure 10:
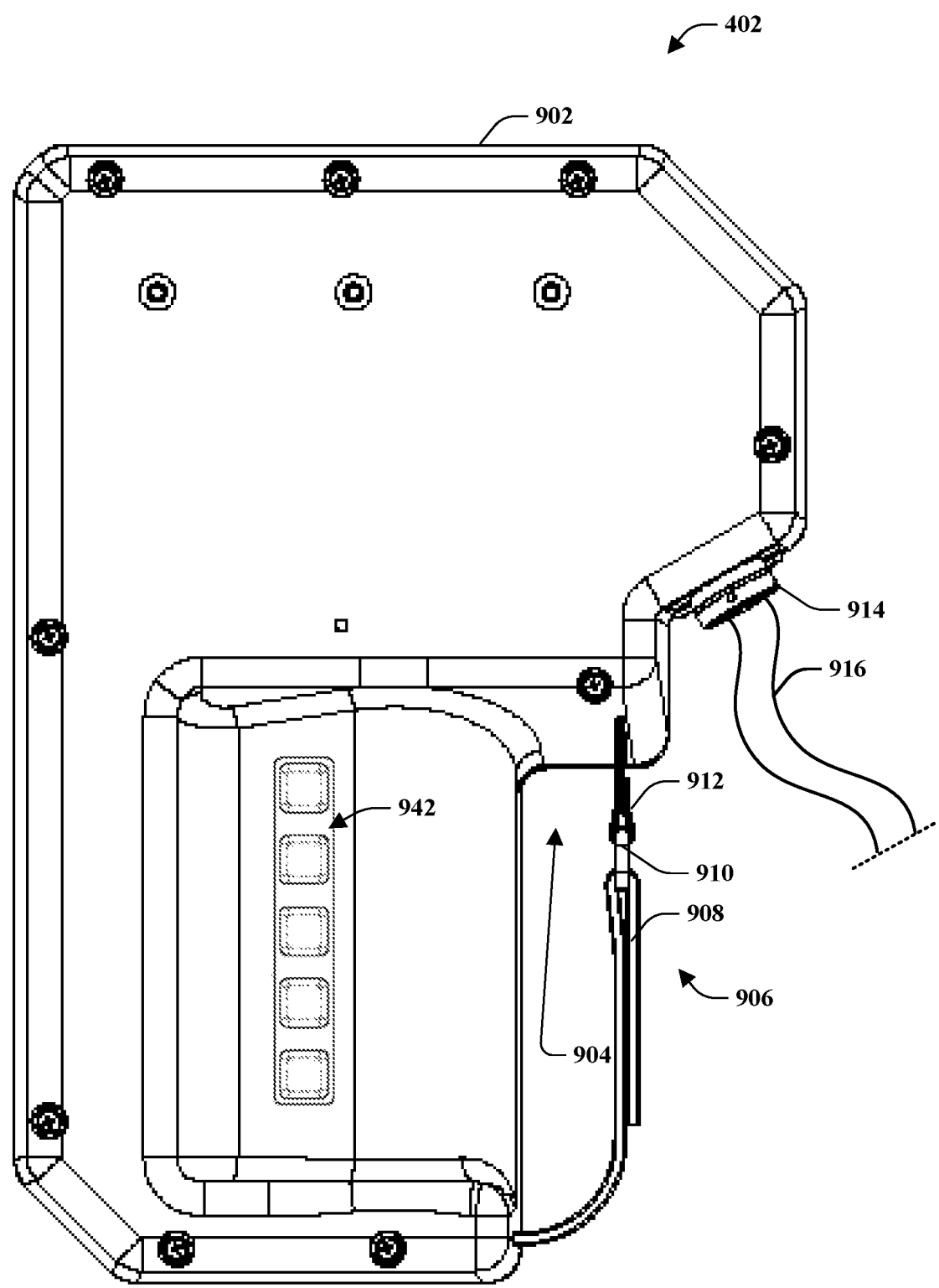
FIG. 10 is a diagram of a rear view of an embodiment of a device used to interact with a welding system.
Figure 32:
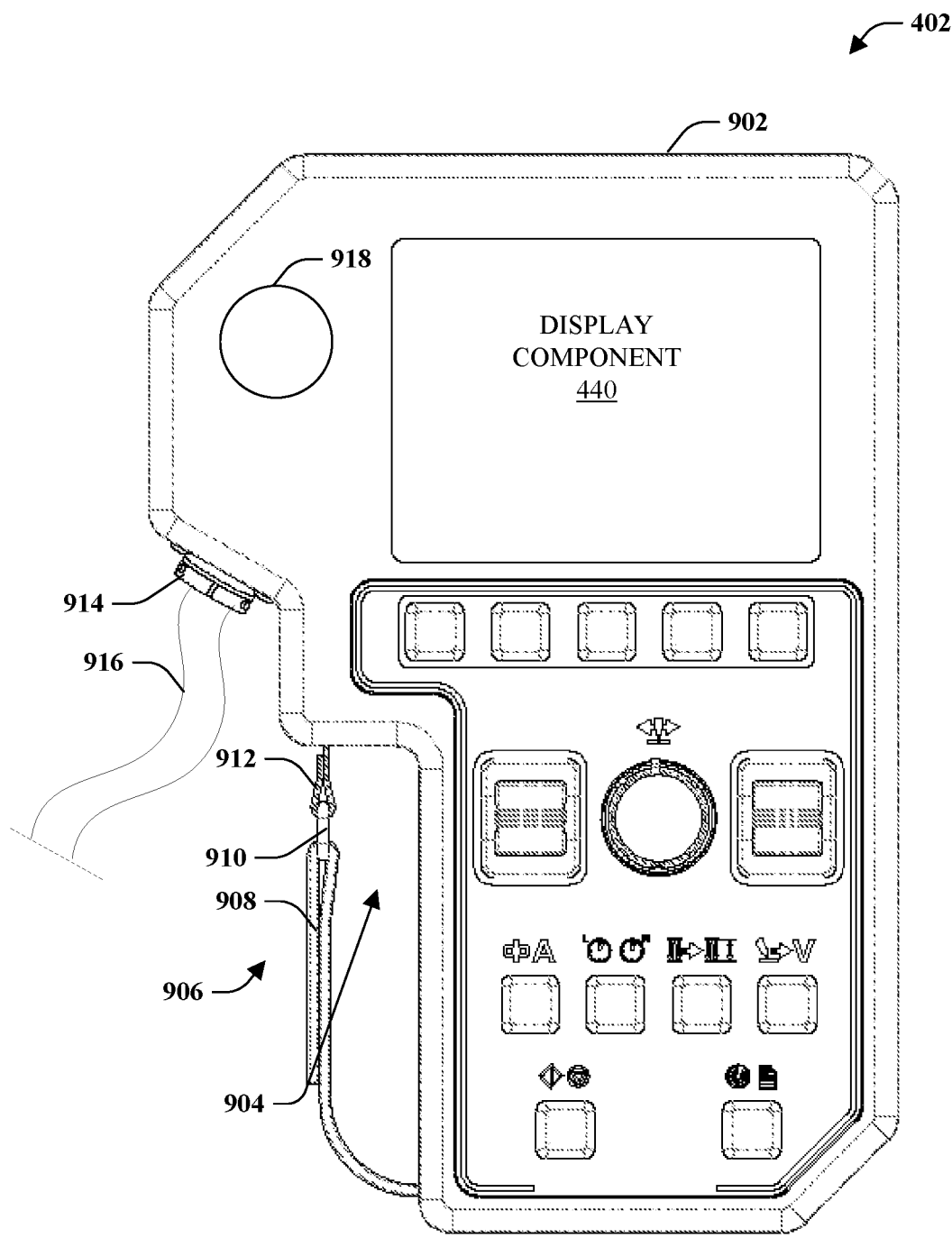
FIG. 32 is a diagram of an embodiment of a device to interact with a welding system.

Turning to FIGS. 9, 10, and 32, embodiments of pendant component 402 are illustrated. In a first embodiment, pendant component 402 is illustrated in FIGS. 9 and 10 with a front view and rear view respectively. Pendant component 402 can include casing 902 having a front opposite of a back, a first side opposite a second side, a top side, a bottom side, and a thickness that separates the front and the back, wherein casing 902 houses at least one of processor 420, memory 430, display component 440, input component 450, or output component 460. Indentation region 904 can be at least one of the first side or the second side of which connector component 914 resides. It is to be appreciated that casing 902 can be a material such as, but not limited to, a plastic, a polymer, a metal, an alloy, an aluminum, a high-temperature resistant material, and the like. One of sound engineering judgment can select various material compositions of casing 902 without departing from the scope of the subject innovation and such variations are intended to be included within the scope of this disclosure.

Casing 902 can be constructed with a shape to fit into one or more hands such that a curvature or indentation for comfort as well as maintaining a firm handle on device 402. As discussed, indentation region 904 can be straight (as depicted), curved, or formed to fit a palm or one or more fingers. It is to be appreciated that indentation region 904 can be on either the first side or the second side or a both the first side and the second side. In an embodiment, indentation region 904 can include four curved regions to individually fit a hand that is wrapped around casing 902 when a user is gripping device 402. In another embodiment, a rounded edge is provided with the indentation region 904 for additional comfort to fit a palm or a hand that is gripping casing 902.

Connector component 914 is illustrated as being a wired connection with wire or cable 916 that provides electrical connections for power and/or data communication. In another embodiment, connector component 914 is a wireless component that transmits data wirelessly between pendant component 402 and welding system 404. Connector component 914 can be on at least one of the first side or the second side. Strap member 906 can connect to at least one of the first side or the second side of which connector component 914 resides. Strap member 906 can include an adjustable strap 908, adjustment clip 910, and anchor 912. Connector component 914 can counter-balance a weight of wire 916 to connector component 914 to facilitate carrying pendant component 402.

Device 402 (e.g., pendant component 402) can include display component 440 that renders a portion of a graphic for display. Moreover, display component 440 can include a speaker (not shown) to output audio to a user. Display component 440, as discussed above, can include video graphics card, display, electronics, connectors, and the like to present visual data to users. In particular, display component 440 can include a lens on an exterior to protect a screen of display component 440, wherein the lens can be a protective covering to prevent scratching, breaking or other damage to display component 440. For instance, the lens can be a protective covering, a plastic lens, a replaceable lens, and the like. For instance, the lens can be a durable, scratch resistance material that is placed directly onto display component 440 that allows for protection but can also be replaced to maintain a clear and unobstructed view of display component 440.

Device 402 or pendant component 402 can include input 918 that is a shutdown activation. In an embodiment, input 918 can be a button that provides a termination of a welding operation that is being performed. In other words, when a welding operation is being controlled and/or performed by using pendant component 402, input 918 can be activated by a user to shutdown the welding operation. The shutdown can be based on a safety concern, a performance issue (e.g., misaligned, incorrect setting, incorrect parameter value, etc.).

Device 402 can include faceplate 920 that can be interchangeable and/or replaceable, wherein faceplate 920 includes one or more graphics, icons, logos, text, numbers, and the like to convey to a user what a function for one or more inputs. In an embodiment, a firmware or update of software for pendant component 402 can be provided which assigns or re-assigned an input to a different functionality in which an additional faceplate 920 with graphics, icons, etc. to match functionality for one or more inputs.

A first set of inputs 922 is illustrated on the front side of device 402. First set of inputs 922 are configured to allow selection based on the at least one screen shown on display component 440. For instance, first set of inputs 922 can have one or more buttons that align below display component 440. In an embodiment, there can be five (5) buttons. It is to be appreciated that any suitable number of buttons can be utilized with first set of inputs 922 as well as inputs need not be buttons. For instance, first set of inputs 922 can be considered a portion of input component 450. Based on a screen displayed, each button can correspond to a selection on such screen. As an example, screen shots are illustrated in FIGS. 14-31. In an embodiment, a button can correspond to an icon on the screen and activation of such button is a selection of such icon and corresponding functionality. For instance, a button can be "exit" with an icon, wherein depressing such button will exit that screen. In another instance, a button can activate a selection corresponding to the screen such as "enter" illustrated as an icon.

Device 402 and/or pendant component 402 can include first toggle switch 924 that controls navigation between selections displayed on display component 440. First toggle switch 924 is configured to receive an input for navigation on the at least one screen.

Pendant component 402 can further include second toggle switch 926 that is configured to receive an input for selection of a value for one or more parameters displayed on the at least one screen.

First toggle switch 924 can control navigation between selections displayed on display component 440 as well as increase or decrease of a selected welding parameter via second set of inputs 944. Further, first toggle switch 924 can be configured to receive an input for a value change of one or more parameters displayed on the at least one screen, wherein the value change is for a parameter that is selected by default, pre-defined, pre-programmed, and the like. Additionally, second toggle switch 926 can control a selection of a value for one or more parameters displayed on display component 440. In an embodiment, first toggle switch 924 is aligned with a displayed graphic on display component 440, wherein the alignment illustrates first toggle switch 924 adjusts the displayed graphic which is representative of a selected welding parameter. In an embodiment, second toggle switch 926 is aligned with a displayed graphic on display component 440, wherein the alignment illustrates second toggle switch 926 adjusts the displayed graphic which is representative of a selected welding parameter. In an embodiment, a first graphic can be displayed on a first side of display component 440 and a second graphic can be displayed on a second side of display component 440, wherein first toggle switch 924 is on the side of the first graphic and aligned there under and second toggle switch 926 is on the side of the second graphic and aligned there under. The alignment is reflective of which toggle switch adjusts a first welding parameter that is represented by the first graphic or a second welding parameter that is represented by the second graphic. For example, a first icon/graphic (e.g., color change, text, number, etc.) can represent the first toggle switch 924 (indicated by an image associated with the first toggle switch 924) and a second icon/graphic can represent the second toggle switch 926 (indicated by a second image associated with the second toggle switch 926). In a particular example, a graphic "L" can be indicated on the display for one of a selected welding parameter pair and a graphic "R" can be indicated on the display for the other of a selected welding parameter pair, wherein the first toggle switch 924 (physically located on the left side of the pendant component 402) adjusts the one of the selected welding pair having the "L" and the second toggle switch 926 (physically located on the right side of the pendant component 402) adjusts the other of the selected welding pair having the "R."

Second set of inputs 944 are configured to allow selection of one or more parameters, wherein first toggle switch 924 and second toggle switch 926 provides selection for a value of the parameter selected. In an embodiment, there can be four (4) buttons such as first button 930, second button 932, third button 934, and fourth button 936. It is to be appreciated that any suitable number of buttons can be utilized with second set of inputs 944 as well as inputs need not be buttons. For instance, second set of inputs 944 can be considered a portion of input component 450 and can be any suitable inputs. In another embodiment, second set of inputs 944 can include eight (8) buttons for selection to adjust a welding parameter, wherein each button is dedicated to eight (8) welding parameters. In another embodiment, second set of inputs 944 can include eight (8) buttons in which each button corresponds to two welding parameters, wherein adjustment of each of the two welding parameters is managed by first toggle switch 924 and second toggle switch 926 respectively. In an embodiment, second set of inputs 944 can be depressed for a duration of time which can navigate to a jog mode and the depressed second set of inputs 944 can select what motions can be jogged.

Second set of inputs 944 can be tied to an adjustment of a single welding parameter. In another embodiment, second set of inputs 944 can each correspond to two welding parameters to adjust in which the two welding parameters have a relationship. For instance, FIG. 32 illustrates an embodiment of paired welding parameters for each button in second set of inputs 944. By way of example and not limitation, the pairings for each button can be as follows: wire feed speed and arc current; left dwell and right dwell; oscillation speed and oscillation width; and travel speed of tractor welder and arc voltage. It is to be appreciated that each paired welding parameter can be related to one another such that a change in one of the paired welding parameter will affect the other paired welding parameter. In other words, second set of inputs 944 are inputs that, when activated, can initiate a display screen that shows which welding parameter can be adjusted using an input (e.g., first toggle switch 924, second toggle switch 926, etc.). For instance, the display can illustrate an icon representative of the welding parameter(s) that is selected for adjustment with first toggle switch 926 or second toggle switch 928. It is to be appreciated that any suitable pairings can be associated to each button of second set of inputs 944 and the above example is not to be limiting on the subject innovation.

In an embodiment, first toggle switch 924 and/or second toggle switch 926 can receive two respective inputs, wherein the first input is a motion toward the top side of pendant component 402 and the second input is a motion toward the bottom side of pendant component 402. It is to be appreciated that any suitable input can be utilized for first toggle switch 924 and second toggle switch 926 and a toggle switch is solely for example. For instance, first toggle switch 924 can be a two button configuration to allow receipt of two inputs.

Pendant component 402 can further include encoder knob 928 that is configured to receive at least one of a rotational input to control a motion for a torch to move to and from a track and a depressing input to move the torch to a center position. Encoder knob 928 can be located between first toggle switch 924 and second toggle switch 926. Encoder knob 928 can be any suitable input that can receive a rotational (e.g., clockwise and/or counter-clockwise) input as well as an additional input, wherein the additional input can receive a depressed input (e.g., a motion toward the rear side of casing 902).

Third set of inputs 946 can include first input 938 and second input 940. First input 938 can control a start and/or stop of a welding cycle associated with welding system 404. Second input 940 can control sector selection and program selection (discussed in more detail below).

In an embodiment, a setting can be implemented (via settings component 1108 discussed below) that allows for an accelerated increment or decrement for adjustment based on a duration of activation of the input. In particular, a parameter can be adjusted with a first rate of increment or decrement when an input is activated and upon a set duration of time, a second rate of increment or decrement can be used to adjust the parameter, wherein the first rate is less than the second rate. By way of example and not limitation, an input can increase or decrease a value by 1 unit. Upon activating the input for a set time, e.g., 2 seconds, the increase or decrease can go from 1 unit to 5 units. This allows for a more rapid adjustment from one established value to another value when the values are far apart in value.

In an embodiment, a color-coded scheme can be associated with one or more inputs to correspond to a graphic or icon on display component 440. For instance, first toggle switch 924 can be outlined or colored with a first color and second toggle switch 926 can be outlined or colored with a second color. The first color can be used with a first graphic or icon displayed on display component 440 and the second color can be used with a second graphic or icon displayed on display component 440 to illustrate that activation of the first toggle switch 924 corresponds to the first graphic having the first color and second toggle switch 928 corresponds to the second graphic having the second color. It is to be appreciated that a color-coded scheme can be employed for each screen in which an input is used to interact with an icon or graphic. In a particular embodiment, a first color is associated with first toggle switch 924 and a second color is associated with second toggle switch 926, wherein based on the screen displayed or parameters available for adjustment, an icon is color coded to one of the first toggle switch 924 or the second toggle switch 926 and the matched color adjusts the matched icon or graphic (icon or graphic is representative of a parameter).

FIG. 10 illustrates a rear view of device 402 and/or pendant component 402. As discussed, the rear side of casing 902 can include one or more inputs 942. It is to be appreciated that the one or more inputs 942 can be additional inputs, a set of the first inputs, a set of the second inputs, the first toggle switch, the second toggle switch, the encoder knob, a set of the third inputs, or a combination thereof. Although five (5) inputs are illustrated it is to be appreciated that any suitable number of inputs can be placed or located on a rear side of casing 902 of device 402. For instance, one or more inputs 942 can be located to align with one or more fingers of a user that is gripping or holding device 402. As illustrated, one or more inputs 942 can be aligned with fingers wrapped around device 402. However, one or more inputs 942 can be any suitable configuration (e.g., horizontally aligned, matched to fingertips, combination of horizontal and vertical inputs, etc.). It is to be appreciated that the one or more inputs 942 can be in addition to second set of inputs 944. In another embodiment, the one or more inputs 942 can have the same or similar functionality of one or more of the second set of inputs 944 functionality.

Figure 11:
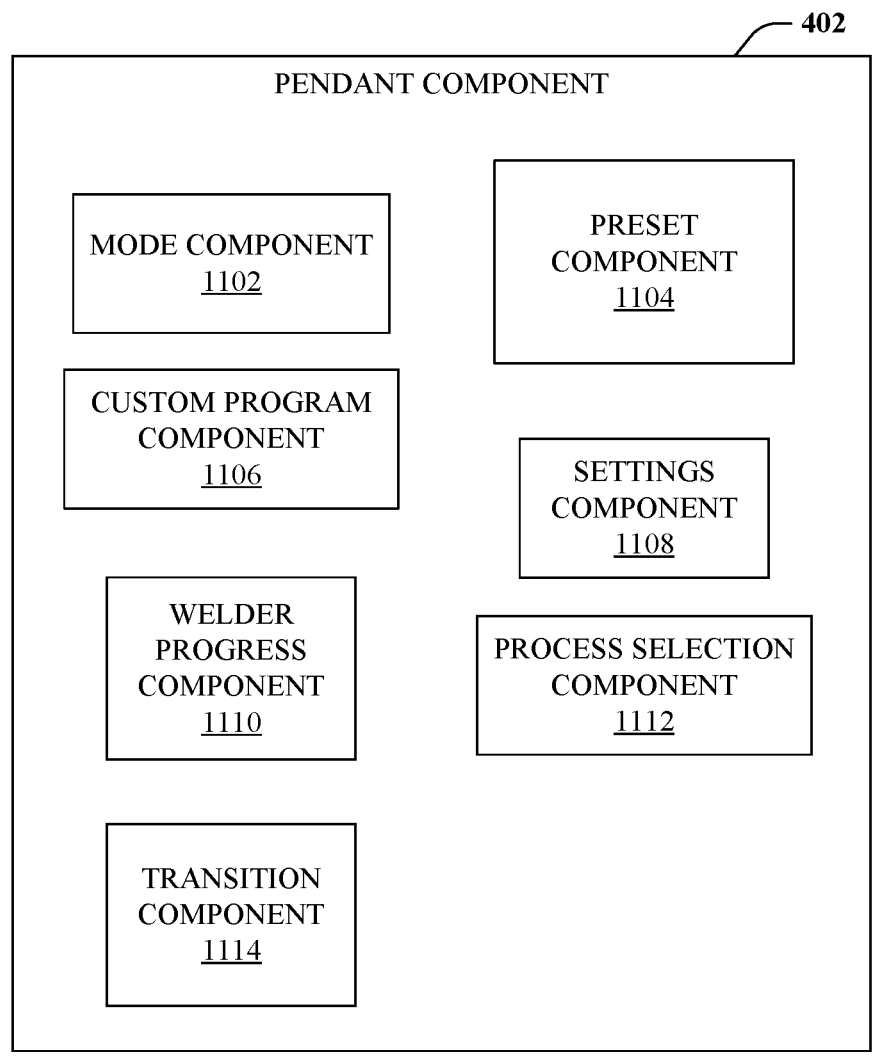
FIG. 11 is a diagram of an embodiment of a device to interact with a welding system.

Turning to FIG. 11, pendant component 402 is illustrated with additional features, modules, and/or components that enhance interaction with welding system 404. Pendant component 402 can include mode component 1102 that allows a user to select a mode, wherein the mode can be a testing mode, a welding mode, teaching mode, virtual reality mode, simulation mode, jog mode, setup mode, among others. Testing mode can be used to illustrate a movement or control of welding system 404 without welding. Welding mode can be actual performance of welding with welding system 404. Teaching mode can be used to weld with materials that are scrap or not used for a finished workpiece or product. For instance, quality monitoring or supervising can be deactivated for teaching mode. Virtual reality mode or simulation mode can be a mode that uses device 402 with a computer or other components to simulate a welding operation with welding system 404. Jog mode can allow movement of tractor welder (e.g., torch movement toward and/or away from track, travel speed of tractor welder on track, torch height, etc.) without performing a welding operation by using pendant component 402. Setup mode can allow configuration of the welding operation or a portion of a component used to perform the welding operation (e.g., settings related to the welding operation, welding parameters, operation configuration, among others).

Preset component 1104 (also referred to as sector component 1104) can include user-specific settings that are pre-determined for pendant component 402. Based on, for instance, authentication of a user, settings can be pre-determined or set by each user so pendant component 402 can be customizable. For instance, a specific travel speed for a welding operation may be desired for a first user whereas a second user may desire a slower speed for the welding operation. In such instance, preset component 1104 can allow each of the first user and second user to program such travel speeds for the welding operation respectively. It is to be appreciated that any suitable setting can include a specifically tailored preset for each user such that upon authentication such customization is loaded for the authenticated user.

In an embodiment, a sector can be used to define a preset for a welding operation. In an embodiment, device 402 can include eight (8) sectors. However, it is to be appreciated that any suitable number of sectors can be utilized. By way of example and not limitation, a sector can be associated with a particular welding parameter value. In another example, a sector can be associated with a location on workpiece. For instance, a first sector can have a first set of welding parameters and a second sector can have a second set of welding parameters. When a user activates the first sector, the first set of welding parameters are used. When the user activates the second sector, the second set of welding parameters are used. In this example, the activation between the first sector and the second sector can be an input (e.g., button, input, voice command, etc.) as described with input device 450.

In an embodiment, a pass input (illustrated in FIGS. 14, 19, 25, and 33, for example) can be utilized, wherein the pass input is activated by selection of one of the first set of inputs 922 which can correspond to a portion of a graphic displayed. The pass input can allow a selection of a group of settings for a weld pass on the workpiece. For example, there can be any suitable number of weld passes on a workpiece, wherein each pass can have one or more settings particular thereto. In a particular example, a "V" groove weld can include a first pass from a first side to a second side opposite thereof with a first group of settings, and a second pass from the second side to the first side with a second group of settings. A pass input can allow selection between each pass created. Each user can include his or her created passes. In another example, a supervisor or administrator can create one or more passes. The pass can be created for a particular workpiece or welding operation. Moreover, the pass can be created for a specific direction on the workpiece and/or a depth or distance of the electrode to the workpiece (e.g., gap-fill). Upon creation, the pass can be created with a file name which can be displayed when the pass input is selected. Moreover, more than one pass can be created for particular sector (as described above). In other words, each of number of sectors for the workpiece can include a number of passes defined or created.

Custom program component 1106 is configured to allow a user to create a welding operation with customized parameters. Welding operations can be customized by the user or authenticated user in which customization affords increased efficiency for each user. The customization can include various parameters such as, but not limited to, travel speed, arc current, arc voltage, oscillation speed, oscillation width, wire feed speed, left dwell, right dwell, among others. Moreover, the customization can be specific to a type of welding operation (e.g., MIG, TIG, etc.) or a type of material available (e.g., wire gauge, type of wire, workpiece material, etc.). Any suitable number of programs can be created for each user and each user can have his or her respective programs. Moreover, a program can be shared to other users via network, Internet, etc. For example, a supervisor can determine a user created customized program works well for a welding operation and distribute it to other users and operators. In another embodiment, custom program component 1106 can be utilized to create a welding sequence (discussed in FIG. 12).

Settings component 1108 is configured to configure pendant component 402. Settings component 1108 can provide a granular setting for each user or group of users. In an embodiment, settings component 1108 can include settings for a user level and/or operator level, wherein such levels can be further segmented into other sets or groups (e.g., first user level, second user level, first operator level, second operator level, etc.). In an embodiment, an administrator or authenticated user can set or adjust settings component 1108. In general, a user with cleared authentication can adjust settings with pendent component 402.

Settings component 1108 can adjust at least one of the following: track settings (e.g., inner diameter, outer diameter, flat track, etc.) (see FIGS. 14-17), travel settings (see FIGS. 14 and 18), process settings (see FIGS. 14. 19-20), start settings (see FIGS. 14 and 21), end settings (see FIGS. 14 and 22), increment settings (see FIGS. 14 and 23), user settings (see FIGS. 14 and 24), program settings (see FIGS. 14 and 25), user access, welding parameter value increments, welding parameter adjustment, accessible programs for each user, accessible controls for each user, accessible welding parameters for adjustment, availability of creating a customized program, availability of sector or presets, color schemes, font size, button assignment for functionality, a setting related to controlling welding system 404 or receiving/displaying data associated with welding system 404, icons, graphics, sound, settings related to display, screen layout, media capture settings, communications settings, etc.), and/or any setting related to components utilized with pendant component 402.

Welder progress component 1110 can be configured to automatically employ a configuration for welding system 404 based on a start of a welding operation, a completion of a welding operation, or a progress of a welding operation. In an embodiment, welder progress component 1110 can include initiate an automatic jog mode upon startup of pendant component 402 and/or welding system 404, wherein jog mode allows movement of tractor welder (e.g., torch movement toward and/or away from track, travel speed of tractor welder on track, torch height, etc.) without performing a welding operation. In an embodiment, jog mode can be employed automatically when a welding operation is not being performed (e.g., at startup, at termination of welding operation, etc.). In another embodiment, welder progress component 1110 can include initiate an weld state mode upon startup of pendant component 402 and/or welding system 404, wherein weld state mode a mode that is capable of performing a welding operation with welding system 404.

Figure 18:
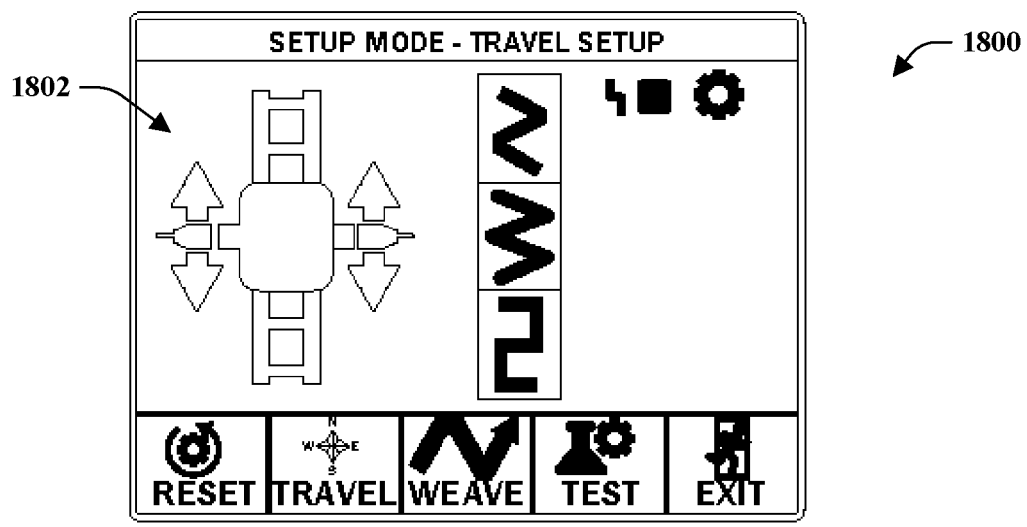
FIG. 18 illustrates a screen shot in accordance with an embodiment of the subject innovation.

In another embodiment, welding progress component 1110 can provide an auto-home feature that, upon completion of a welding operation, maneuvers the torch to a position away from welding zone Z and workpiece W to allow a user or operator to view. For instance, at the completion of a weld, the torch is moved away from the workpiece to an upper limit for torch height to allow a clear view of workpiece. In another embodiment, a user or operator can use an input to control the torch to a previous location prior to the auto-home feature was used. For instance, a weld can be performed and auto-home feature can be performed and a user can press a continue input which places the torch back to a position prior to the auto-home feature. Moreover, the location of the auto-home feature can be user-defined, pre-defined by a machine, pre-programmed, or a combination thereof. In such instance, a user can set a welding operation parameter such as torch height and travel (e.g., travel direction, travel orientation, configuration of welding device orientation on a track as depicted in FIG. 18, etc.) and upon completion of setting the welding operation, the location can be stored. This stored location is then user-defined in this example to facilitate physically accessing workpiece W or torch without the need to re-adjust settings (e.g., torch height, travel, etc.) each time the user want to move the torch or access the workpiece.

Process selection component 1112 can be configured to allow a selection of a welding operation based on user input, wherein choices are presented to the user based on material available for the welding operation. For instance, a first material can be selected and based on that material, a set of choices are made that are useable with the first material, and so on and so forth. In this manner, a user is selecting materials that are available and eventually a welding operation that can be performed based on available supplies, equipment, etc. For example, a method of selections for a welding operation can be provided. For example, the following steps can be used with a method for selecting a welding operation: a wire size can be selected; a wire material or a workpiece material can be selected; a process type can be selected; a gas type can be selected or a unique process can be selected; and a welding operation can be performed based on the selections.

Transition component 1114 is configured to transition welding system 404 and/or welding equipment related thereto from a first value to a second value received via pendant component 402 and in particular, input device 450. For example, the transition employed by transition component 1114 for changing a parameter from an established value to a second value can be a linear increase, a linear decrease, a slope, a per-parameter slope, a predefined slope, an exponential decay, an exponential growth, a stepped increased (e.g., increase by 5 units, decrease by 5 units, etc.), a time based transition (e.g., change from the established parameter to the second parameter in a period of time), a dynamically determined slope, among others. For instance, a period of time can be defined which is used to identify a slope for changing the parameter from one value to another. By way of example, a time period of 5 seconds can be defined in which a change of 1 arc voltage to 6 arc voltage would translate to a transition of 1 volt per second. It is to be appreciated that the transition can be selected with sound engineering judgment without departing from the scope of the subject innovation. Moreover, the transition can be specific to each parameter. By way of example and not limitation, a first transition can be used for arc voltage, a second transition can be used for wire feed speed, and a third transition can be used for tractor travel speed.

In an embodiment, settings component 1108 can be utilized to re-program functionality for each button to customize pendant component 402. For instance, a particular user can determine that swapping functionality for the right side inputs and the left side inputs is better suited for him or her due to being left-handed. In another embodiment, a particular user can invert toggle in which an up input would decrease a value and a down input would increase a value.

Figure 12:
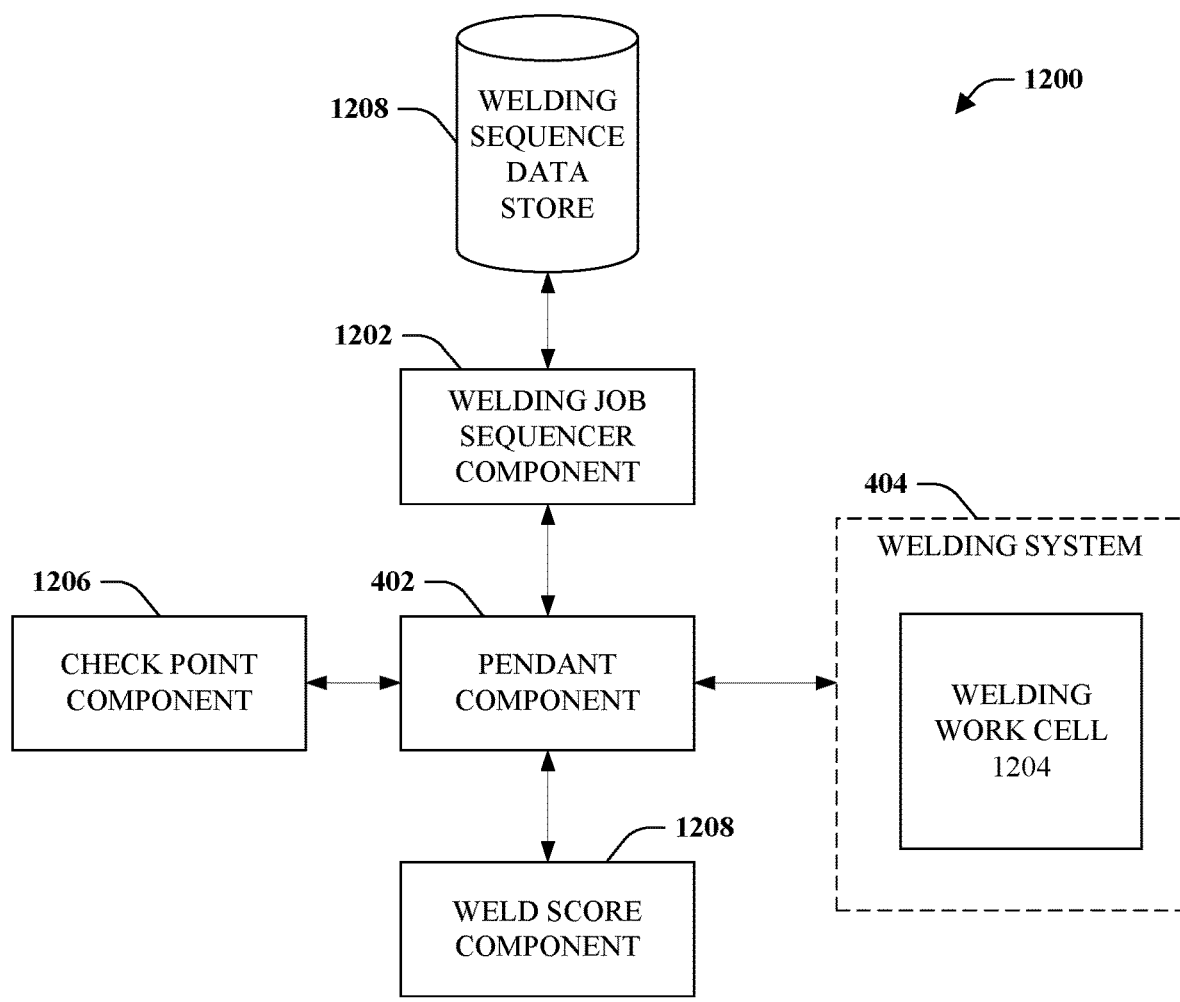
FIG. 12 is a diagram of a system that utilizes a device to interact with a welding system as well as features such as weld score, check point, and welding sequences.

FIG. 12 is a schematic block diagram of an exemplary embodiment of welding system 1200 that utilizes welding job sequencer component 1202 (also referred to as welding job sequencer) to configure welding equipment for two or more weld operations to assembly a workpiece. Welding job sequencer component 1202 that is configured to implement a welding sequence that includes settings, configurations, and/or parameters to perform two or more welding procedures on a workpiece. In particular, welding job sequencer component 1202, as discussed above as welding job sequencer, automatically configures welding equipment to create two or more welds that include two or more welding schedules. Moreover, welding job sequencer component 1202 utilizes the welding sequence to aid an operator to perform the two or more welds. As discussed above, welding job sequencer component 1202 can be utilized with welding work cell 1204 that is semi-automatic. However, it is to be appreciated and understood that welding job sequencer component 1202 can be implemented in a suitable welding environment or system that includes at least welding equipment and an operator to facilitate creating one or more welds. It is to be appreciated that welding system 404 is also referred to as the welding work cell, wherein the welding work cell and/or welding system 404 can produce welds or welded parts. There are at least two broad categories of work cells, including robotic work cells and semi-automatic work cells.

Welding job sequencer 1202 can be controlled via pendant component 402. User interaction with welding job sequencer 1202 can be handled by pendant component 402. By way of example and not limitation, pendant component 402 can be configured to provide at least one of a selection of a welding sequence for use, a modification to a welding sequence, one or more instructions based on the selection of a welding sequence, details of a welding sequence (e.g., creation date, author, settings, parameters, etc.), among others. Pendant component 402 can further interact with welding job sequencer component 1202 based on authentication via authentication component 804. It is to be appreciated that pendant component 402 can receive and/or transmit data between an operator or a user with welding job sequencer 1202 in order to manage, use, and/or edit a welding sequence for a welding operation.

Welding system 1200 further includes check point component 1206 that is configured to monitor a welding process and/or a welding operator. It is to be appreciated that check point component 1206 can be substantially similar to CHECKPOINT™, or any quality assessment component that evaluates whether a weld created meets a defined standard. In an example, check point component 1206 can monitor in real time or be a reporting component that collects data after a weld has been performed. For instance, the welding process is monitored in real time or after a weld is completed to detect at least one of a welding parameter (e.g., voltage, current, among others), a welding schedule parameter (e.g., welding process, wire type, wire size, WFS, volts, trim, wire feeder to use, feed head to use, among others), a weld on a workpiece as the weld is created, a movement of an operator, a position of a welding tool, a position or location of a welding equipment, a position or location of an operator, sensor data (e.g., video camera, image capture, thermal imaging device, heat sensing camera, temperature sensor, among others), and the like. Check point component 1206 includes an alert system (not shown) that can communicate an alert or notification to indicate a status of the monitoring. In an embodiment, check point component 1206 can utilize thresholds, ranges, limits, and the like for the real time monitoring to precisely identify a abnormality with welding system 1200. Furthermore, welding job sequencer component 1202 can communicate an alert or notification to welding work cell 1204 or the operator to at least one of stop the welding procedure, continue with the welding procedure, pause the welding procedure, terminate the welding procedure, or request approval of the welding procedure. In an embodiment, check point component 1206 can store monitoring data (e.g., video, images, results, sensor data, and the like) in at least one of a server, a data store, a cloud, a combination thereof, among others.

It is to be appreciated that pendant component 402 can receive data related to check point component 1206. Moreover, pendant component 402 can communicate user input or operator input to check point component 1206. By way of example and not limitation, pendant component 402 can display weld summary data upon completion, communicate an alert (via alert system), or communicate a status (e.g., continue weld, stop weld, pause weld, etc.). Further, pendant component 402 can allow a user or operator to view data monitored or captured via a video replay, image captured replay, or numeric or text data display.

Weld score component 1208 is included with welding system 1200 and is configured to evaluate a weld created by an operator within welding work cell 1204 upon completion of such weld. It is to be appreciated that weld score component 1208 can be substantially similar to WELD-SCORE® or any quality assessment component that evaluates whether an operator is able to perform a weld with defined standards. Weld score component 1208 provides a rating or score for the completed weld to facilitate implementing a quality control on the workpiece and/or assembly of the workpiece. For instance, weld score component 1208 can alert a quality inspection upon completion, provide data collection of a job (e.g., assembly of workpiece, weld on workpiece, among others), and the like. In an embodiment, an in-person quality inspection can be performed upon completion of a portion of the assembly (e.g., completion of a weld, completion of two or more welds, completion of assembly, among others). In another embodiment, weld score component 1208 can utilize a sensor to collect data (e.g., video camera, image capture, thermal imaging device, heat sensing camera, temperature sensor, among others) to determine approval of the job. For instance, a quality inspection can be performed remotely via video or image data collected upon completion of a job to evaluate a characteristic of a weld.

It is to be appreciated that pendant component 402 can be used to allow interaction between a user or an operator with the weld score component 1208. For instance, pedant component 402 can display weld evaluation data to a user via display component 440 associated with pendant component 402. In another instance, pendant component 402 can display an alert for a quality inspection. It is to be appreciated that pendant component 402 can communicate data from a user to weld score component 1208 and/or receive data from weld score component 1208 to display to a user, wherein the data can be associated with weld score component 1208.

It is to be appreciated that welding job sequencer component 1202 can be a stand-alone component (as depicted), incorporated into pendant component 402, incorporated into welding work cell 1204, incorporated into check point component 1206, incorporated into weld score component 1208, incorporated into a welding power source, or a suitable combination thereof. Additionally, as discussed below, welding job sequencer component 1202 can be a distributed system, software-as-a-service (SaaS), a cloud-based system, or a combination thereof. Further, it is to be appreciated and understood that check point component 1206 can be a stand-alone component (as depicted), incorporated into pendant component 402, incorporated into welding work cell 1204, incorporated into welding job sequencer component 1202, incorporated into weld score component 1208, incorporated into a welding power source, or a suitable combination thereof. Additionally, check point component 1206 can be a distributed system, software-as-a-service (SaaS), a cloud-based system, or a combination thereof. Moreover, it is to be appreciated and understood that weld score component 1208 can be a stand-alone component (as depicted), incorporated into pendant component 402, incorporated into welding work cell 1204, incorporated into welding job sequencer component 1202, incorporated into a check point component 1206, incorporated into a welding power source, or a suitable combination thereof. Additionally, weld score component 1208 can be a distributed system, software-as-a-service (SaaS), a cloud-based system, or a combination thereof.

System 1200 can identify at least one welding sequence via a welding sequence data store 1208 based on, for instance, an authentication of a user or operator. The authentication via pendant component 402 allows at least one of use of welding equipment within welding work cell 1204 and/or use of the identified welding sequence. As discussed above, data store (here, welding sequence data store 1208) can be, for example, either volatile memory or nonvolatile memory, or can include both volatile and nonvolatile memory. The data store (here, welding sequence data store 1208) of system 1200 is intended to comprise, without being limited to, these and other suitable types of memory. In addition, welding sequence data store 1208 can be a server, a database, a hard drive, a flash drive, an external hard drive, a portable hard drive, a cloud-based storage, a solid-state drive, a remote hard drive connected via a network connection, and the like. It is to be appreciated that pendant component 402 can communicate with welding sequence data store 1208 to receive a welding sequence, to upload a welding sequence, to edit a portion of a welding sequence, to receive a portion of a welding sequence, to upload a portion of a welding sequence, and the like. It is to be appreciated that welding sequence data store 1208 can be a stand-alone component (as depicted), incorporated into the pendant component 402, incorporated into welding sequence component 1202, incorporated into welding system 404, incorporated into check point component 1206, incorporated into weld score component 1208, or a combination thereof.

FIGS. 13-31 illustrate screen shots related to graphics rendered by pendant component 402 and in particular display component 440. The following screen shots are representations of graphics displayed on a display of pendant component 402 and are solely for example and are not to be limiting on the subject innovation. Moreover, each screen shot depicted includes graphical images, icons, colors, fonts, of various sizes and shapes which are also not to be limiting on the subject innovation. Additionally, any values for parameters (e.g., welding parameters, settings, etc.) are solely for example and not to be limiting on the subject innovation for a range of such values or what the value or parameter can be set.

Figure 13:
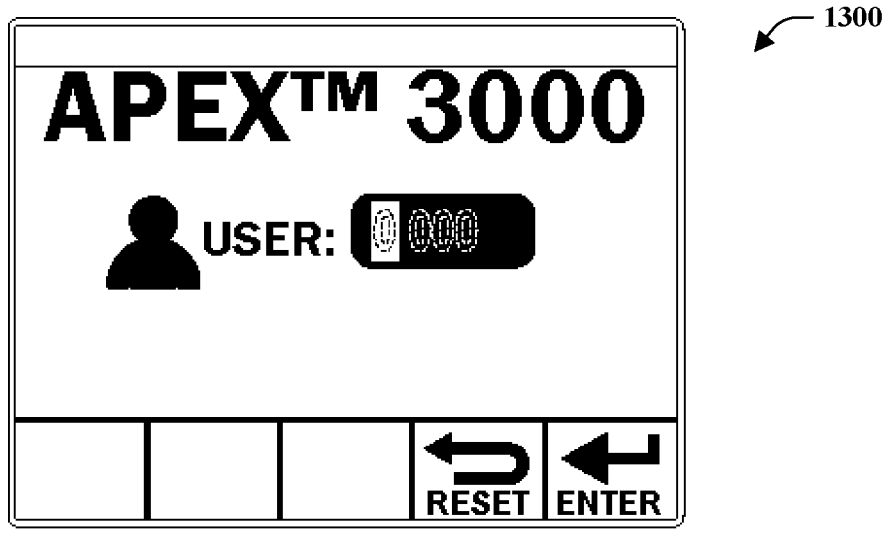
FIG. 13 illustrates a screen shot that relates to startup screen for user authentication.

FIG. 13 illustrates screen shot 1300 that relates to startup screen for user authentication. The screen shot 1300 illustrates a user and an identification. In an embodiment and as illustrated, the identification can be a number. In another example, the screen shot 1300 can be used for authentication of a user (via authentication component 804). For instance, a user can sign into pendant component 402 upon startup of the pendant component 402 with the screen shot 1300 being an initial start screen or splash screen. As discussed above, the authentication can be with at least one of a username and password, a voice recognition, a facial recognition, a touch screen input, touch screen pattern entry, security question, at least one number (e.g., employee number, badge number, PIN, etc.), at least one letter or symbol, a biometric data (e.g., thumbprint, inductance, fingerprint, handprint, a resistance, etc.), a keycard, wireless transmission of data (e.g., NFC, RFID, Bluetooth, etc.), a transmission of data between a device (e.g., smartphone, tablet, laptop, USB flash drive, USB pen drive, etc.) and authentication component 804, a suitable exchange of data from a user to authentication component that identifies said user, and the like. In another example, the screen shot 1300 can display a notification to the user that to sign on, an additional electronic communication is to occur (e.g., connect USB device, wireless communication, scanning of an image, among others).

The screen shot 1300 can include a "reset" and an "enter" that correspond each to one of the first set of inputs 922 for selection thereof. Moreover, the second toggle switch 926 can be used to enter a user identification.

Figure 14:
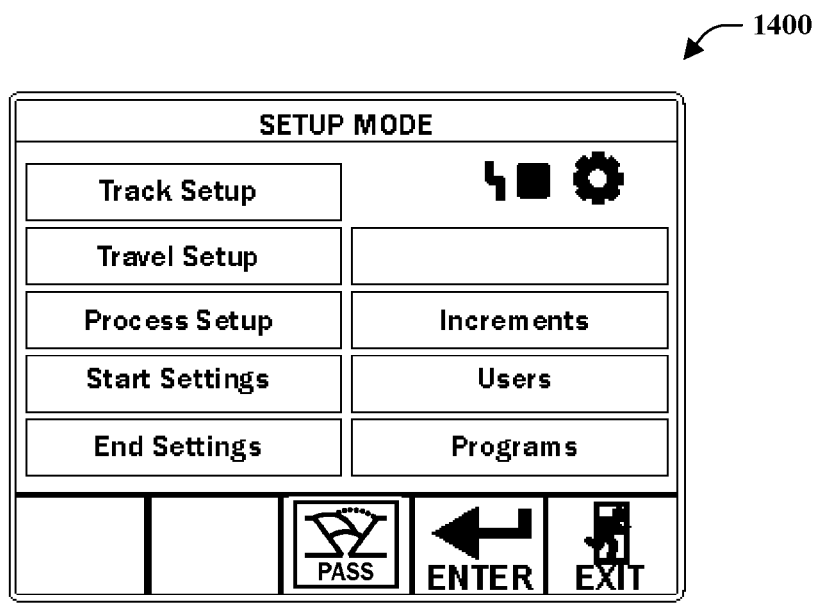
FIG. 14 illustrates a screen shot in accordance with an embodiment of the subject innovation.

FIG. 14 illustrates screen shot 1400 of a setup mode in accordance with an embodiment of the subject innovation. Screen shot 1400 can include graphical representations related to a setup mode that include at least one of track setup, travel setup, process setup, start settings, end settings, increments, users, programs, among others. The setup mode can be selected by using the first toggle switch 924, wherein selection can be indicated by a modification of the graphical representation such as, but not limited to, a highlight, a color change, a font change, among others. An "enter" and "exit" input can correspond to the screen shot 1400 and in particular the graphical representation for the setup modes, wherein each input is associated with one of a first set of inputs 922. For instance, a user can use the first toggle switch to select "Travel Setup" and use the "enter" input (from first set of inputs 922, for example) to proceed to a screen to adjust travel setup.

Figure 15:
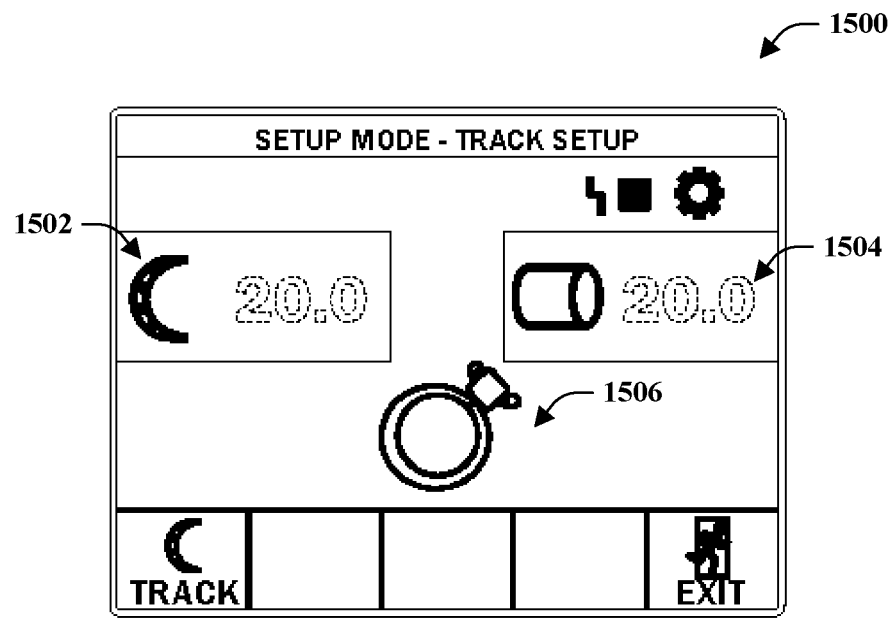
FIG. 15 illustrates a screen shot in accordance with an embodiment of the subject innovation.

FIG. 15 illustrates screen shot 1500 of a track setup mode in accordance with an embodiment of the subject innovation. Screen shot 1500 is of a setup for a track system that is on an outside diameter of a pipe or curved workpiece illustrated by icon 1506 (e.g., welding device on an exterior of a curved workpiece). A value for the track 1502 can be selected by the first toggle switch 924 and adjusted by the second toggle switch 926. A value for the pipe 1504 can be selected by the first toggle switch 924 and adjusted by the second toggle switch 926. An input of the first set of inputs can correspond to the displayed "track" which proceeds to track selection (e.g., flat, inner diameter, outer diameter, etc.) and an input of the first set of inputs 922 can correspond to "exit" which will exit the screen represented by screen shot 1500. In an embodiment, track selection can be performed by one of the first set of inputs 922 with a selection of inner diameter or outer diameter has been selected. In a particular example, upon selection of inner diameter or outer diameter, the first toggle switch 924 can be used to set a track size and the second toggle switch 926 can be used to set pipe (e.g., workpiece) size.

Figure 16:
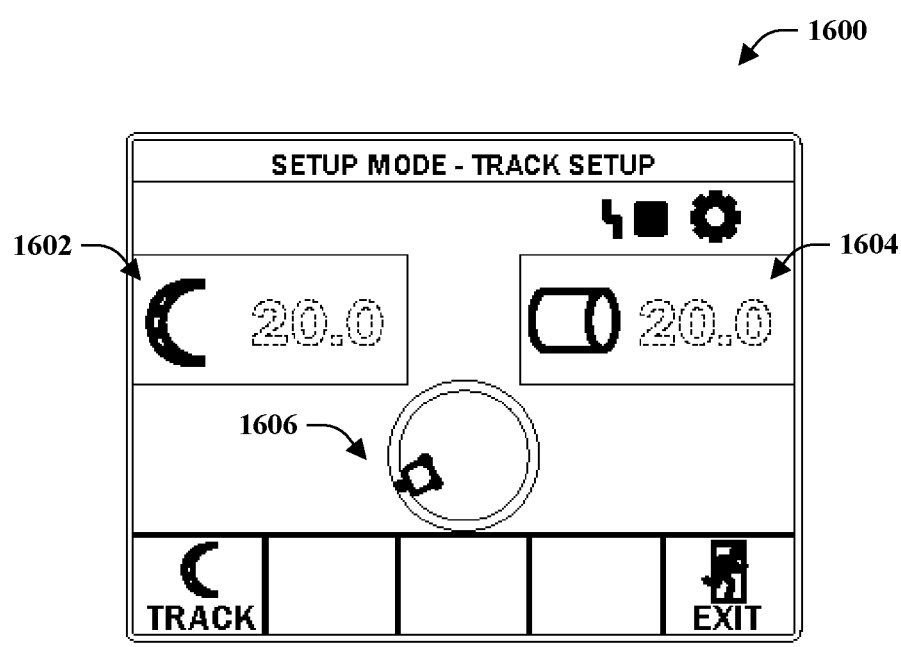
FIG. 16 illustrates a screen shot in accordance with an embodiment of the subject innovation.

FIG. 16 illustrates screen shot 1600 of a track setup mode in accordance with an embodiment of the subject innovation. Screen shot 1600 is of a setup for a track system that is on an inside diameter of a pipe or curved workpiece illustrated by icon 1606 (e.g., welding device on an interior of a curved workpiece). A value for the track 1602 can be selected by the first toggle switch 924 and adjusted by the second toggle switch 926. A value for the pipe 1604 can be selected by the first toggle switch 924 and adjusted by the second toggle switch 926. An input of the first set of inputs 922 can correspond to the displayed "track" which proceeds to track selection (e.g., flat, inner diameter, outer diameter, etc.) and an input of the first set of inputs 922 can correspond to "exit" which will exit the screen represented by screen shot 1600. In an embodiment, track selection can be performed by one of the first set of inputs 922 with a selection of inner diameter or outer diameter has been selected. In a particular example, upon selection of inner diameter or outer diameter, the first toggle switch 924 can be used to set a track size and the second toggle switch 926 can be used to set pipe (e.g., workpiece) size.

Figure 17:
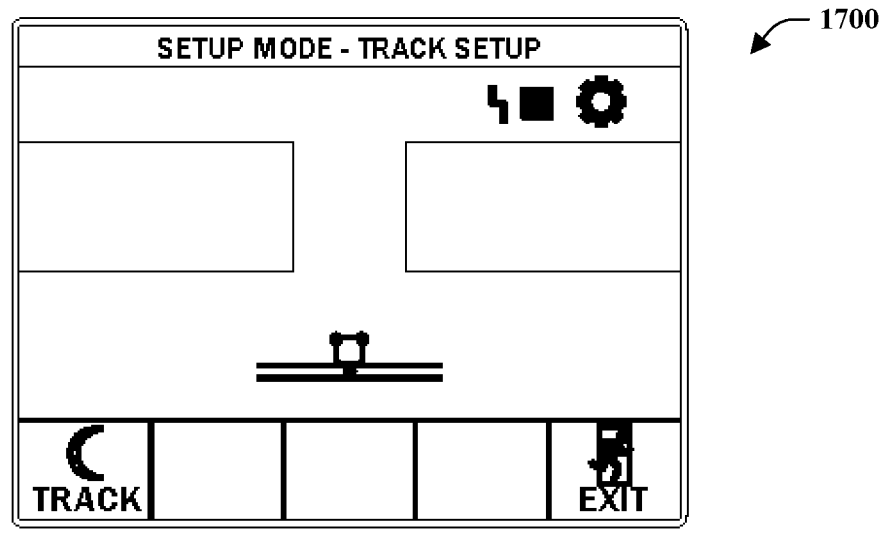
FIG. 17 illustrates a screen shot in accordance with an embodiment of the subject innovation.

FIG. 17 illustrates screen shot 1700 of a track setup mode in accordance with an embodiment of the subject innovation. Screen shot 1700 is of a setup for a track system that is flat proximate to a workpiece. An input of the first set of inputs can correspond to the displayed "track" which proceeds to track selection (e.g., flat, inner diameter, outer diameter, etc.) and an input of the first set of inputs 922 can correspond to "exit" which will exit the screen represented by screen shot 1700.

Figure 33:
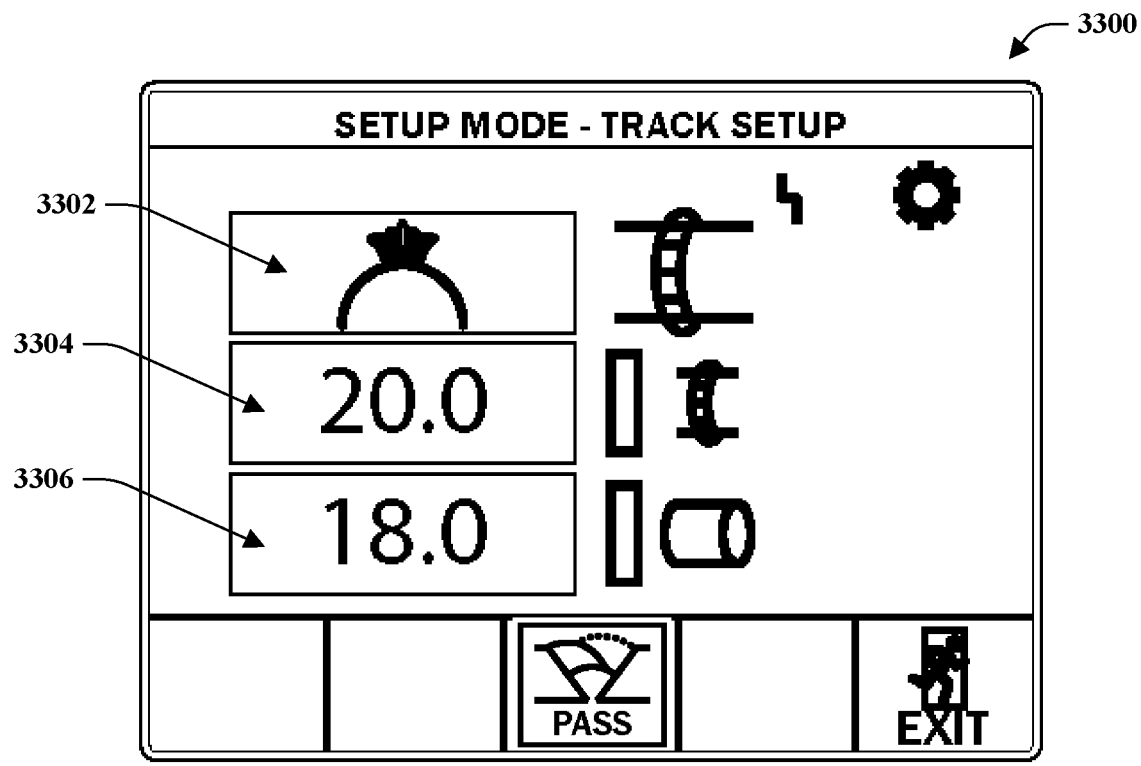
FIG. 33 illustrates a screen shot in accordance with an embodiment of the subject innovation.
Figure 34:
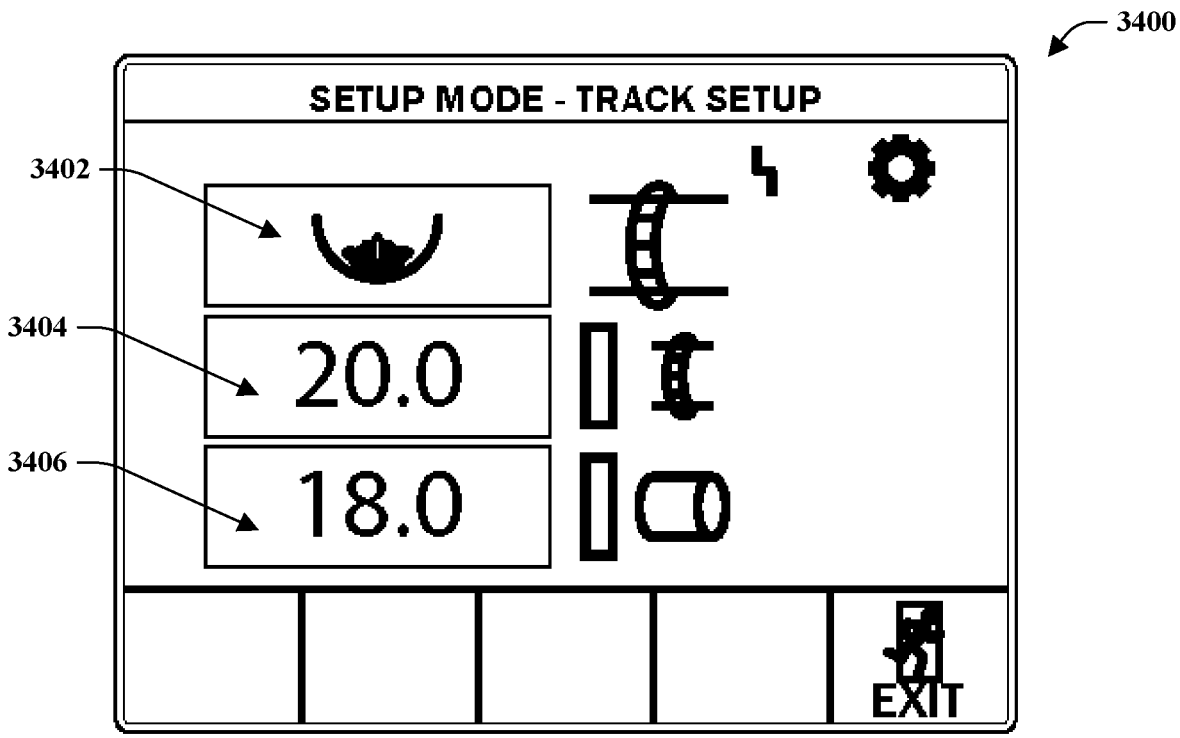
FIG. 34 illustrates a screen shot in accordance with an embodiment of the subject innovation.
Figure 35:
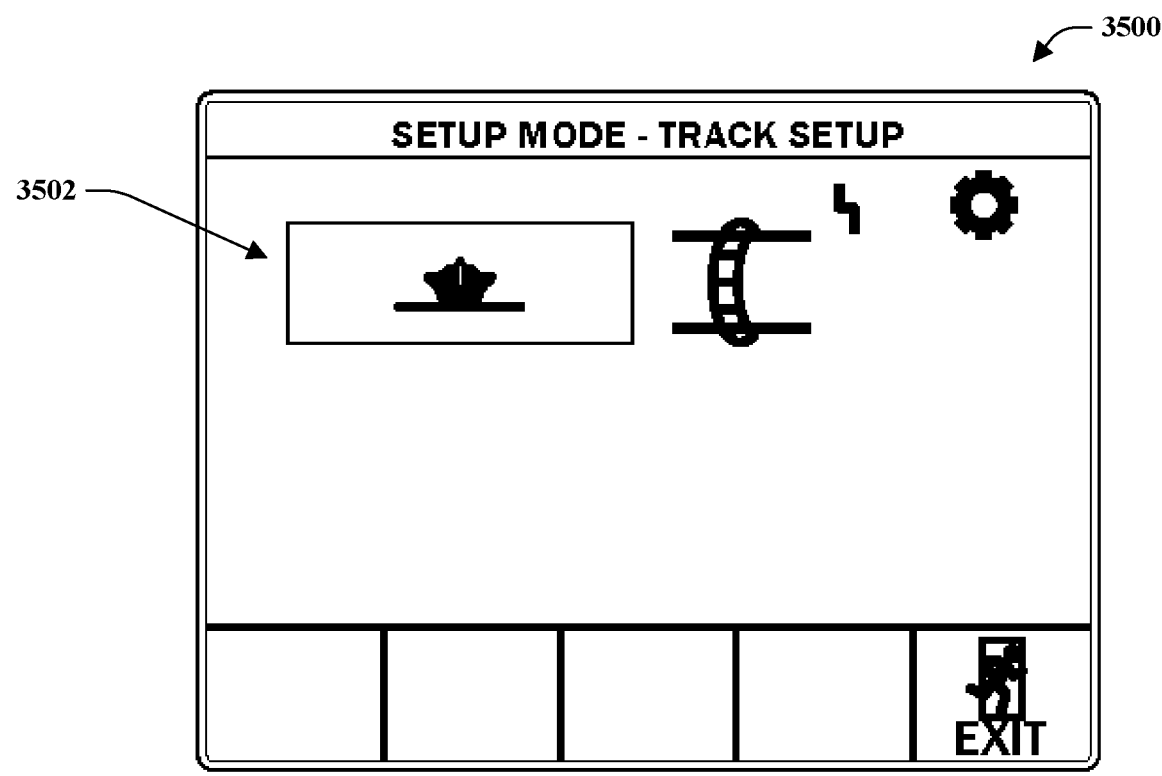
FIG. 35 illustrates a screen shot in accordance with an embodiment of the subject innovation.

FIGS. 15-17 illustrate screen shots of an embodiment of a track setup. In another embodiment, FIGS. 33-35 illustrate another embodiment of a track setup. In particular, FIG. 33 illustrates a screen shot 3300 of a setup for a track system that has selected an outside diameter of a pipe or curved workpiece illustrated by icon at 3302 (e.g., welding device on an exterior of a curved workpiece). Navigation between fields such as a track selection (e.g., track style such as flat, outer diameter, or inner diameter) at 3302, a track ring size (e.g., a value for the track) 3304, or a pipe diameter (e.g., a value for the pipe) 3306 can be implemented with the first toggle switch 924. Adjustment of the values for the track selection (e.g., track style such as flat, outer diameter, or inner diameter) at 3302, a track ring size (e.g., a value for the track) 3304, or a pipe diameter (e.g., a value for the pipe) 3306 can be implemented with the second toggle switch 926.

FIG. 34 illustrates a screen shot 3400 of a setup for a track system that has selected an inside diameter of a pipe or curved workpiece illustrated by icon at 3402 (e.g., welding device on an interior of a curved workpiece). Navigation between fields such as a track selection (e.g., track style such as flat, outer diameter, or inner diameter) at 3402, a track ring size (e.g., a value for the track) 3404, or a pipe diameter (e.g., a value for the pipe) 3406 can be implemented with the first toggle switch 924. Adjustment of the values for the track selection (e.g., track style such as flat, outer diameter, or inner diameter) at 3402, a track ring size (e.g., a value for the track) 3404, or a pipe diameter (e.g., a value for the pipe) 3406 can be implemented with the second toggle switch 926.

FIG. 35 illustrates a screen shot 3500 of a setup for a track system that has selected track style of flat illustrated by icon at 3402 (e.g., welding device on a flat workpiece). Navigation between fields such as a track selection (e.g., track style such as flat, outer diameter, or inner diameter) at 3402, a track ring size (e.g., a value for the track) 3404, or a pipe diameter (e.g., a value for the pipe) 3406 can be implemented with the first toggle switch 924. In an embodiment, an adjustment of the values for the track selection (e.g., track style such as flat, outer diameter, or inner diameter) at 3402 can be implemented by the second toggle switch 926 in which selection to a different track style (e.g., inner diameter or outer diameter) can initiate graphical representations for a track ring size (e.g., a value for the track) 3404 or a pipe diameter (e.g., a value for the pipe) 3406 to be displayed to allow adjustment.

FIG. 18 illustrates screen shot 1800 of a travel setup in accordance with an embodiment of the subject innovation. The first set of inputs 922 can include one input that each corresponds to "reset," "travel," "weave," "test," and "exit." Based on the selection of the first set of inputs 922, the screen can allow the user to select the setting. For instance, a weave pattern can be selected, a travel direction can be selected, a direction on the track can be selected, a side on which the torch resides can be selected, among others via the screen shot 1800. For example, a setting for "travel" can set orientation of at least one of left dwell, right dwell, encoder knob steering, among others. Icon 1802 illustrates a welding device on a track in which an arrow indicates travel. A user can select the arrow for travel (e.g., based on his or her perspective looking at the welding system) via navigating on the first toggle switch 924 or the second toggle switch 926 and selection of the direction of travel with at least one of the first set of inputs 922. Upon selection of travel, welding system in communication with pendant component 402 can automatically set orientation based on a perspective of the user (e.g., indicated by selection of which arrow is representative of the travel). For example, the set orientation can determine which direction is left, right, steering via an input (e.g., encoder knob), among others. Settings component 1108 can automatically configure one or more controls for pendant component 402 based on the user input related to defining travel from his or her perspective, wherein the one or more controls can be, but is not limited to, directional control (e.g., which way is left, which way is right, which way is forward, which way is backward, etc.), left dwell, right dwell, encoder knob steering (e.g., turning the encoder knob right matches the torch moving to the right, turning the encoder knob left matches the torch moving to the left, etc.), and the like.

Figure 36:
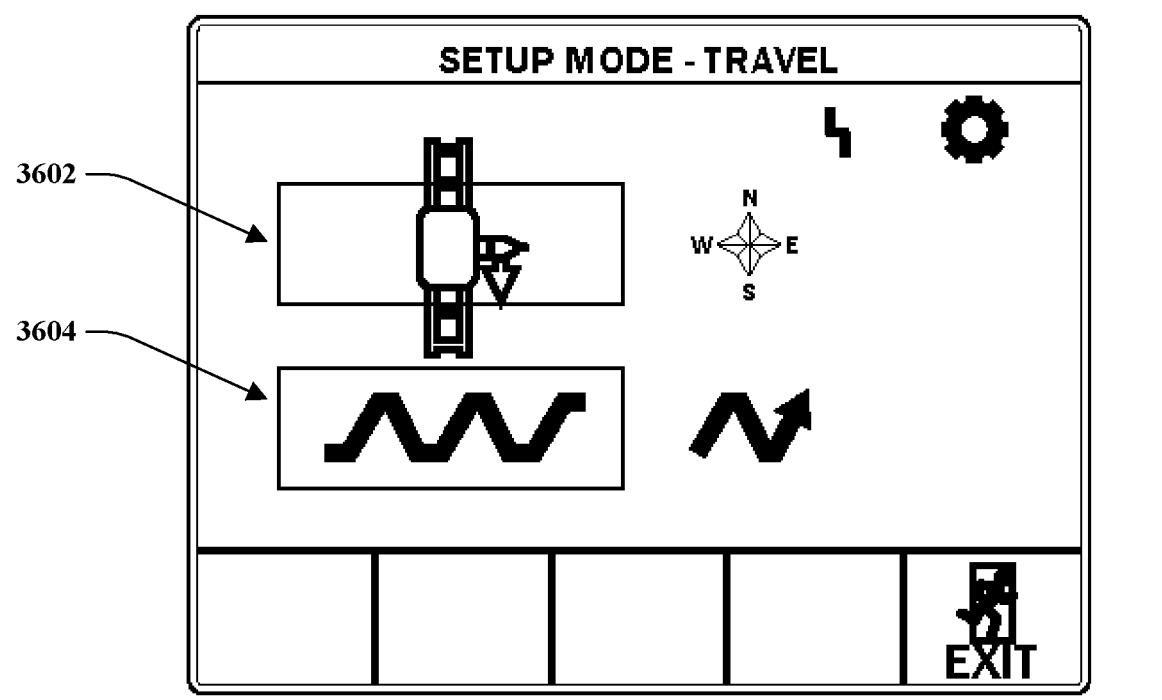
FIG. 36 illustrates a screen shot in accordance with an embodiment of the subject innovation.
Figure 37:
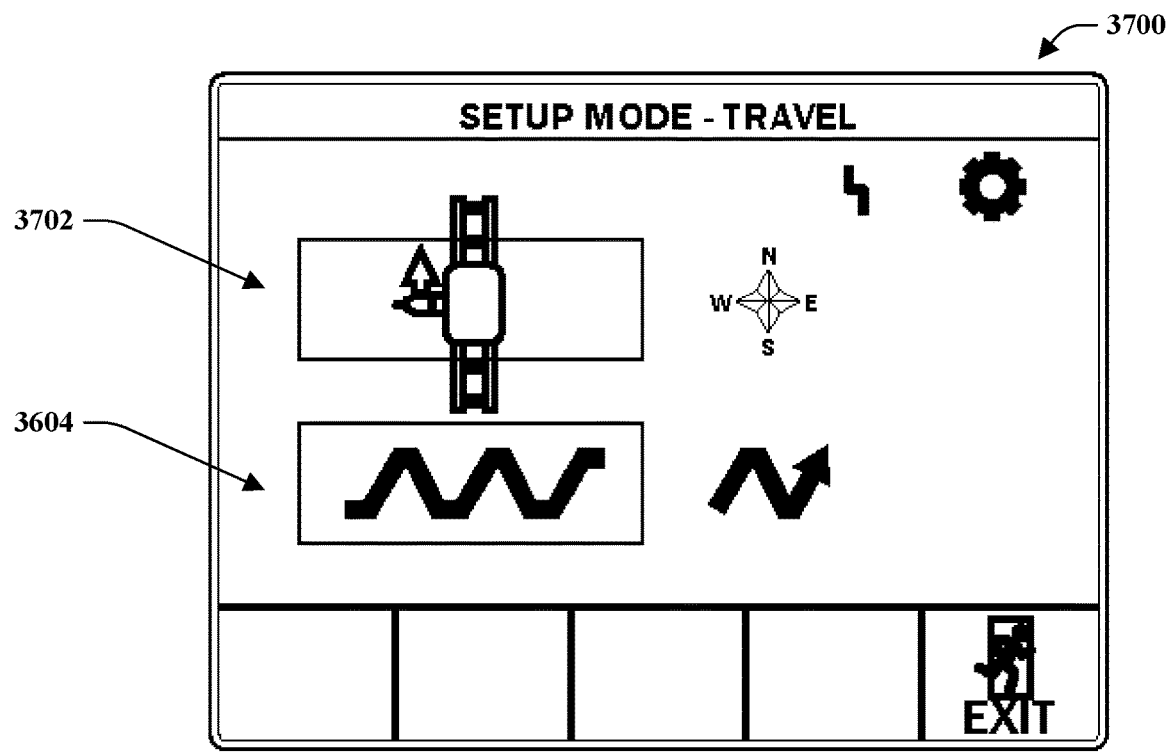
FIG. 37 illustrates a screen shot in accordance with an embodiment of the subject innovation.
Figure 38:
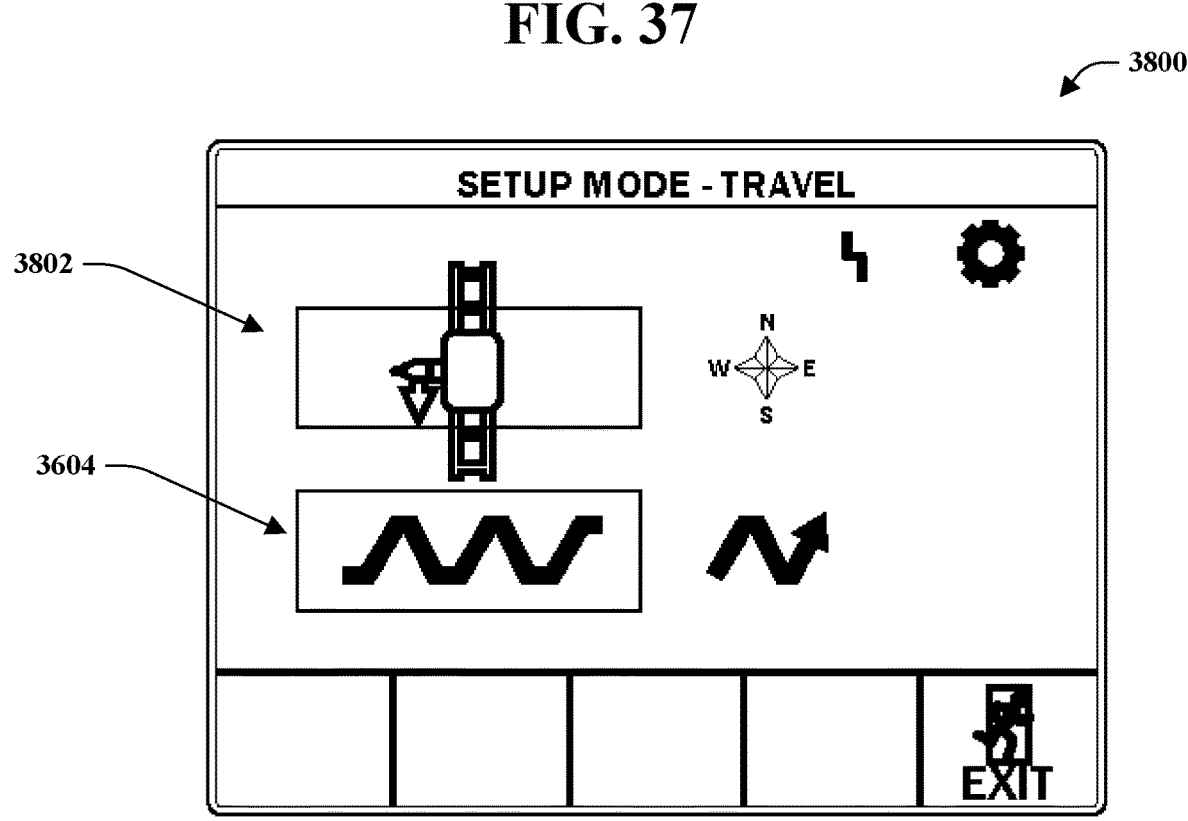
FIG. 38 illustrates a screen shot in accordance with an embodiment of the subject innovation.
Figure 39:
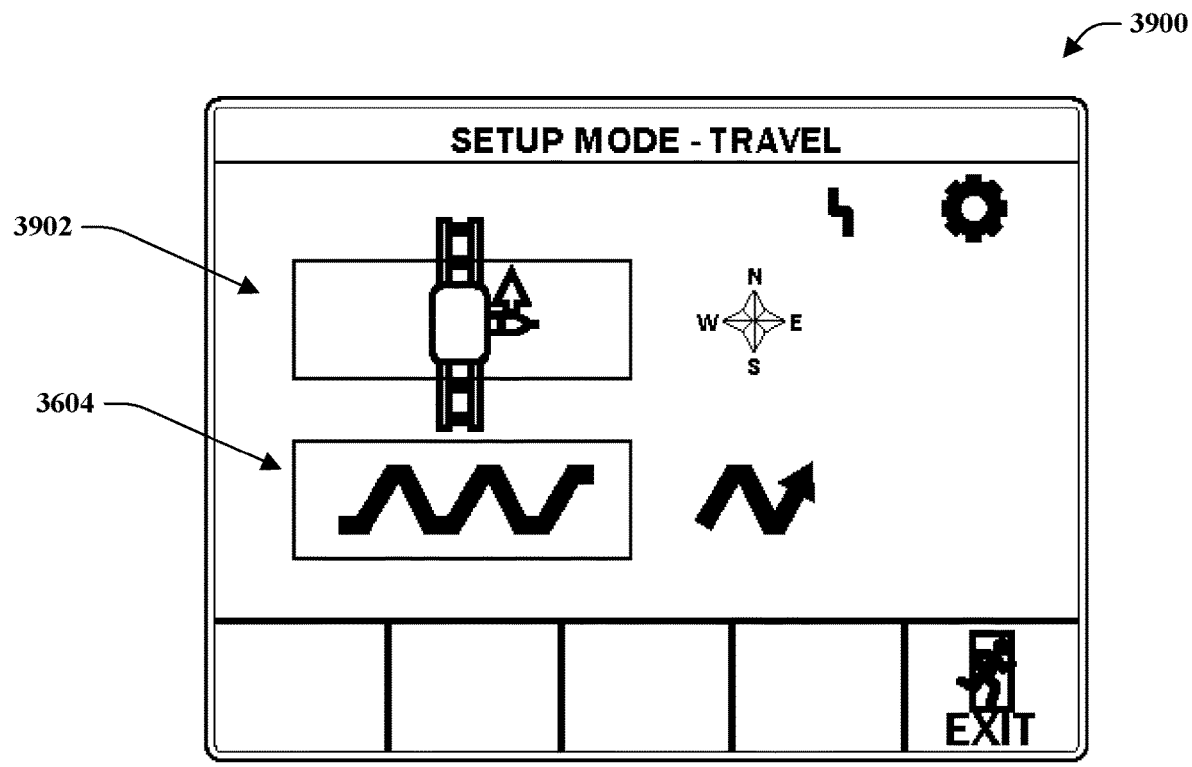
FIG. 39 illustrates a screen shot in accordance with an embodiment of the subject innovation.
Figure 40:
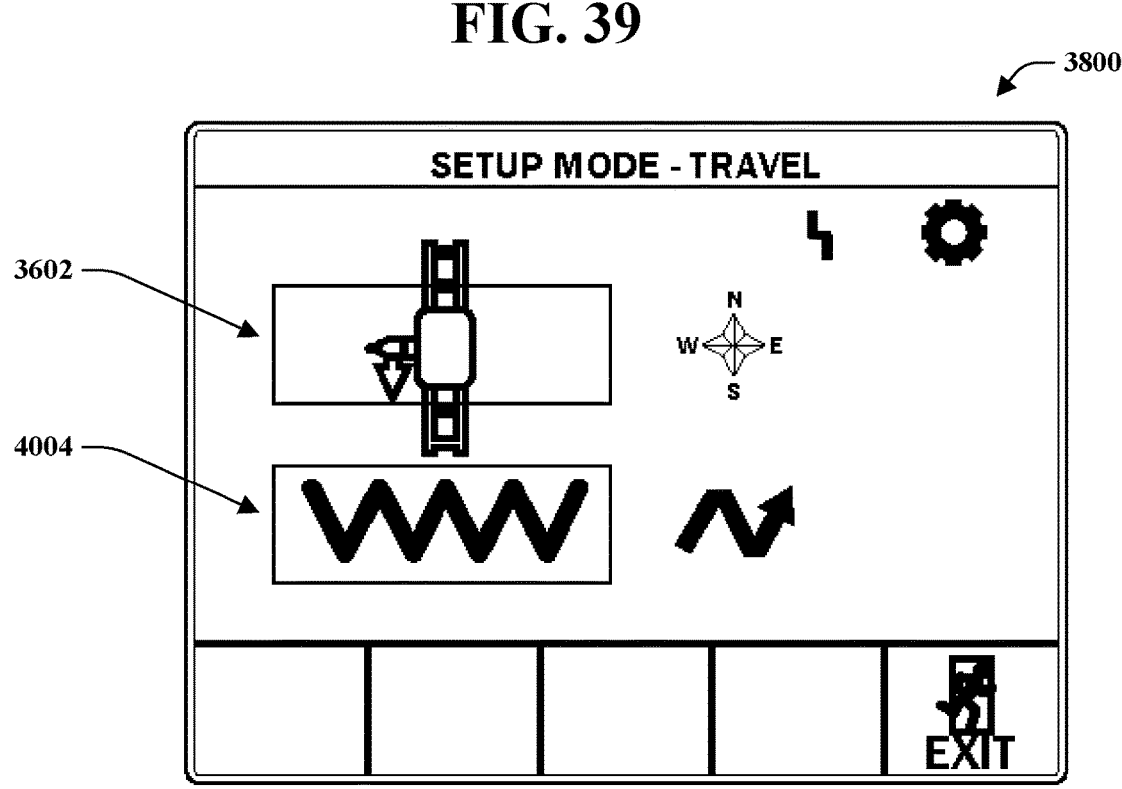
FIG. 40 illustrates a screen shot in accordance with an embodiment of the subject innovation.
Figure 41:
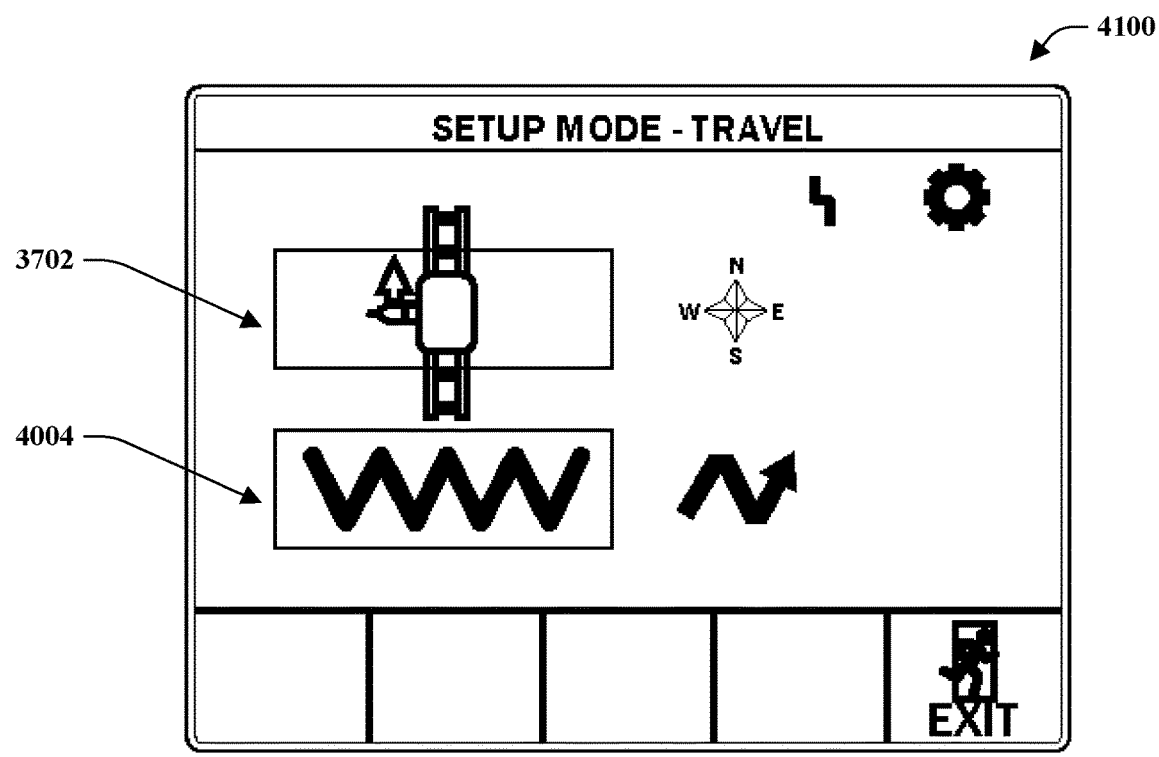
FIG. 41 illustrates a screen shot in accordance with an embodiment of the subject innovation.
Figure 42:
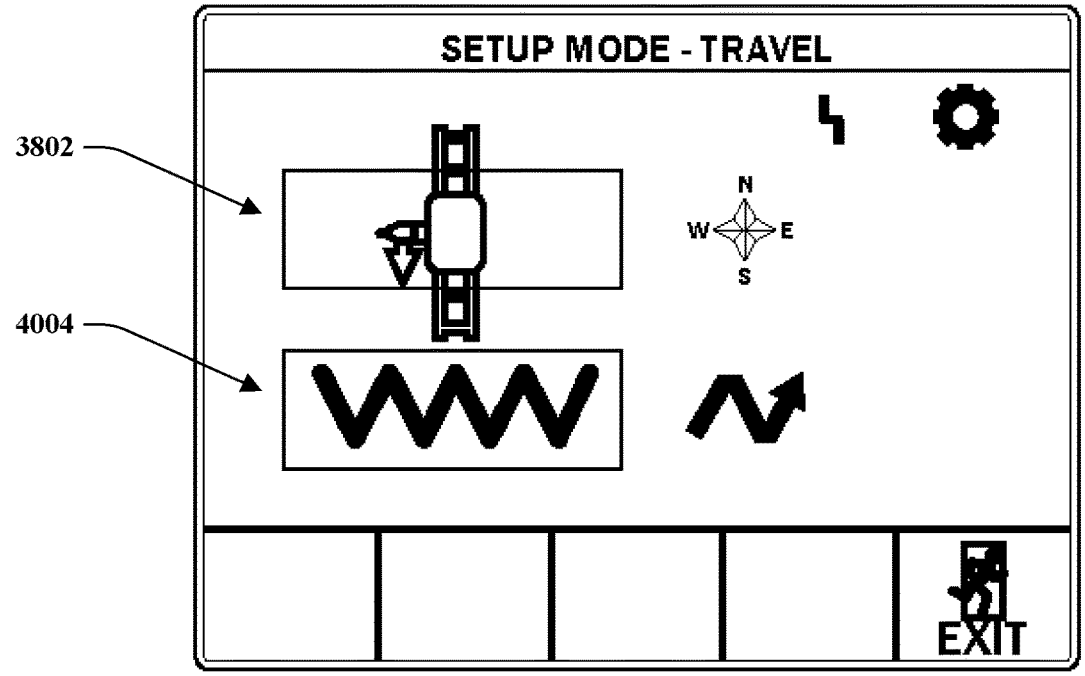
FIG. 42 illustrates a screen shot in accordance with an embodiment of the subject innovation.
Figure 43:
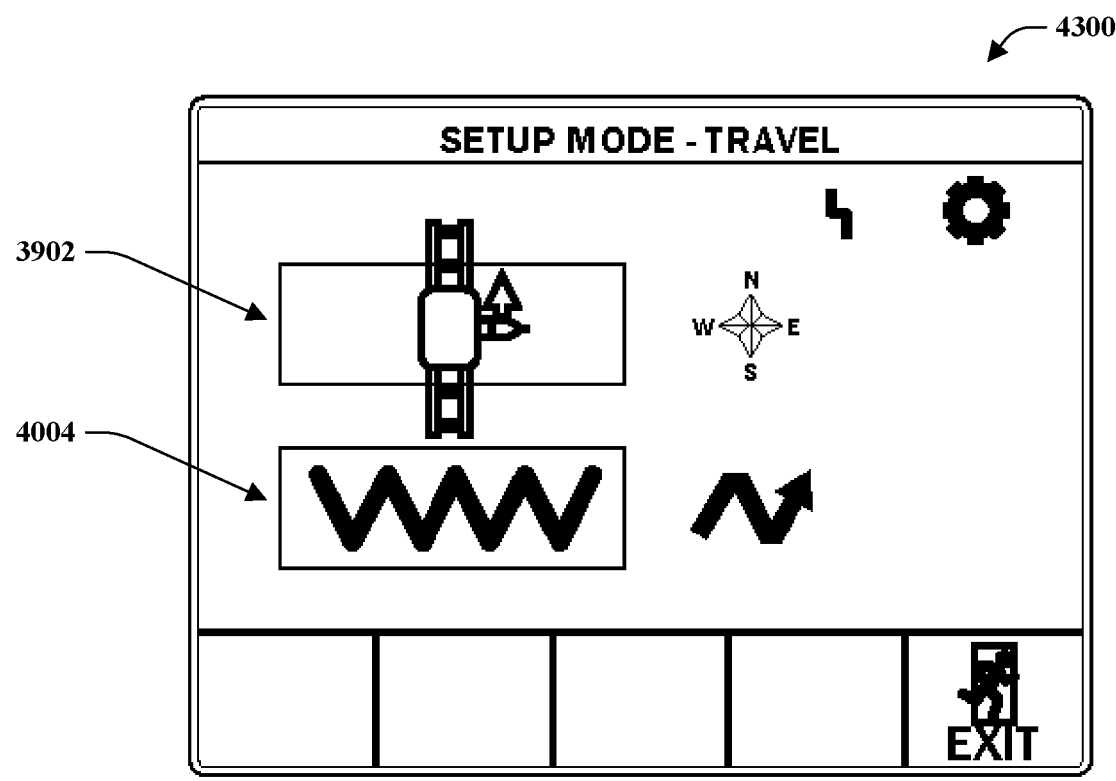
FIG. 43 illustrates a screen shot in accordance with an embodiment of the subject innovation.
Figure 44:
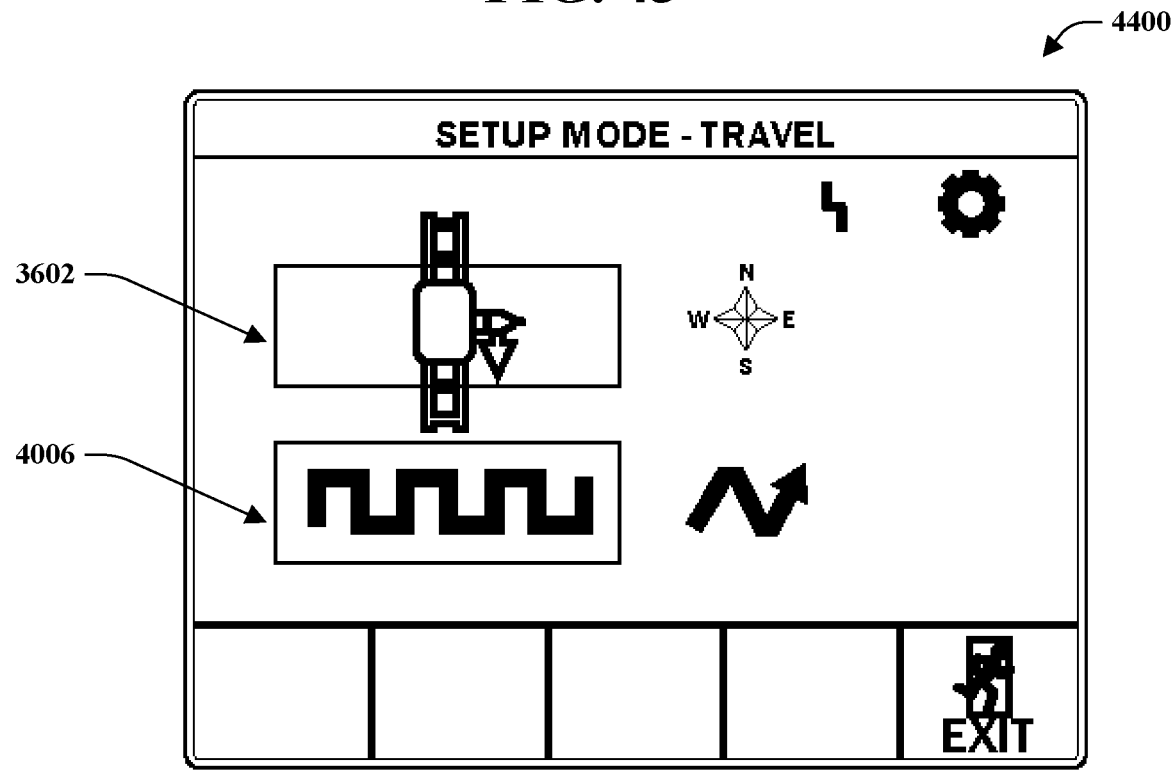
FIG. 44 illustrates a screen shot in accordance with an embodiment of the subject innovation.
Figure 45:
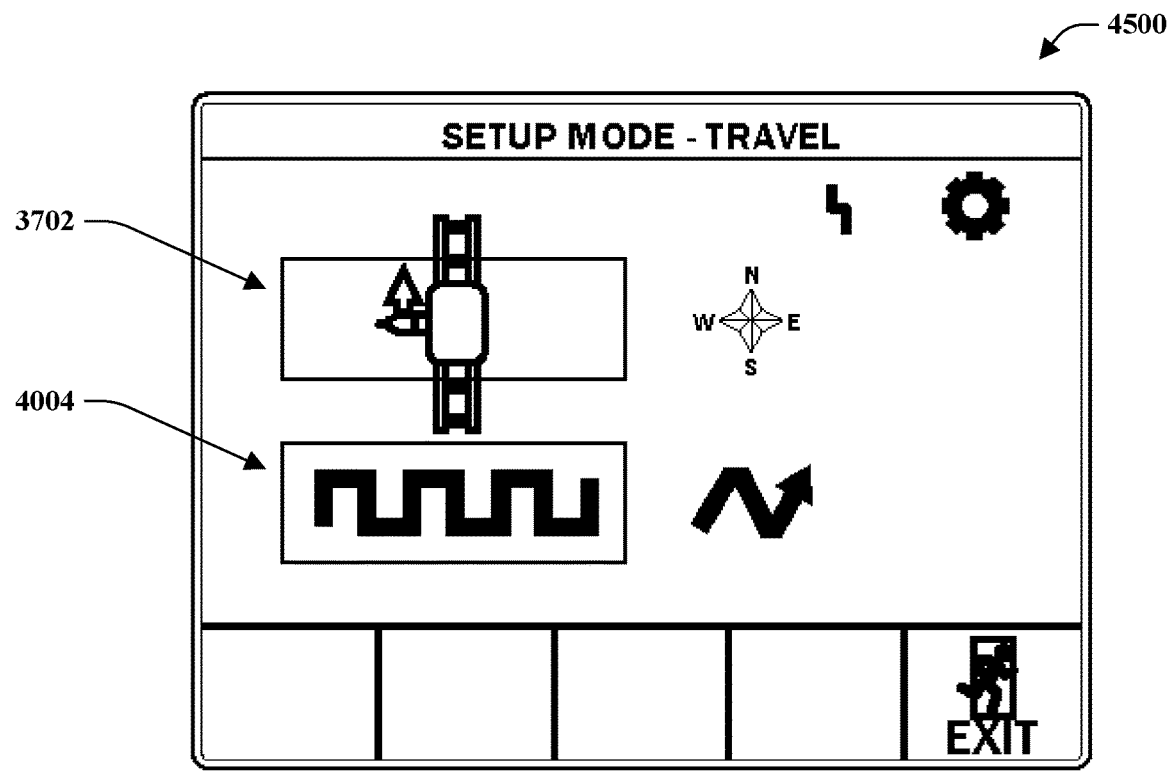
FIG. 45 illustrates a screen shot in accordance with an embodiment of the subject innovation.
Figure 46:
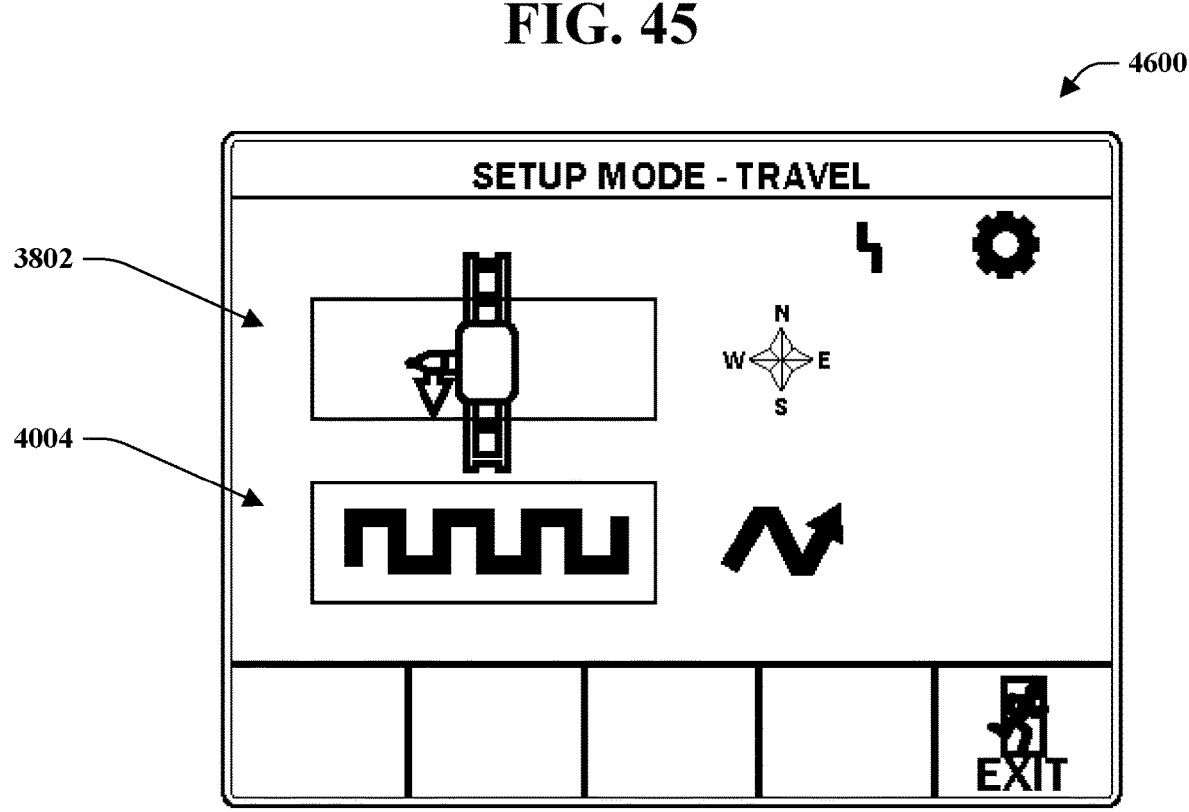
FIG. 46 illustrates a screen shot in accordance with an embodiment of the subject innovation.
Figure 47:
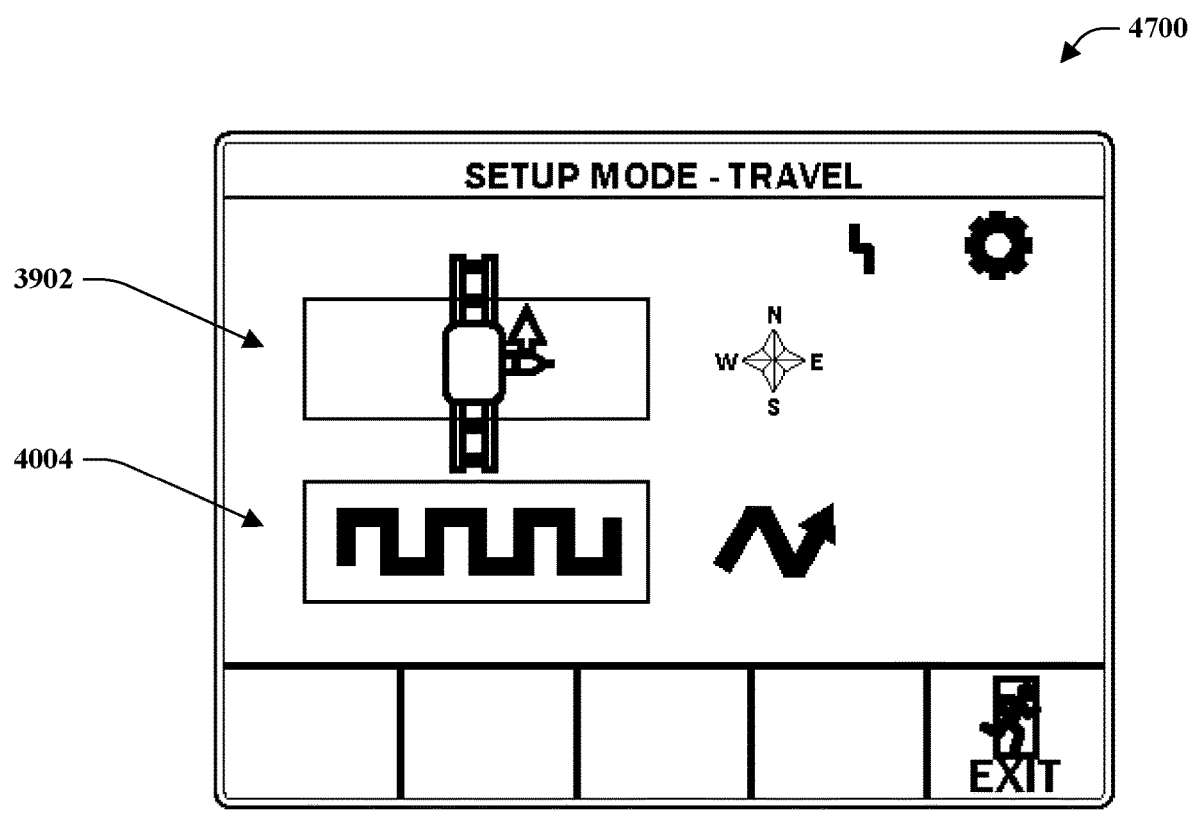
FIG. 47 illustrates a screen shot in accordance with an embodiment of the subject innovation.

FIG. 18 illustrates a screen shots of an embodiment of a travel setup. In another embodiment, FIGS. 36-47 illustrate another embodiment of a travel setup. In FIGS. 36-47, travel setup can be performed such that an input from the first toggle switch 924 can navigate between fields (e.g., a set orientation or a weave pattern). Moreover, adjustment of such fields can be provided with the second toggle switch 926, wherein the adjustment can be a selection of the set orientation or a type of weave pattern. FIG. 36 illustrates a first set orientation 3602 with a first weave pattern 3604 in screen shot 3600. FIG. 37 illustrates a second set orientation 3702 with a first weave pattern 3604 in screen shot 3700. FIG. 38 illustrates a third set orientation 3802 with a first weave pattern 3604 in screen shot 3800. FIG. 39 illustrates a fourth set orientation 3902 with a first weave pattern 3604 in screen shot 3900. FIG. 40 illustrates the first set orientation 3602 with the second weave pattern 4004 in screen shot 4000. FIG. 41 illustrates the second set orientation 3702 with the second weave pattern 4004 in screen shot 4100. FIG. 42 illustrates the third set orientation 3802 with the second weave pattern 4004 in screen shot 4200. FIG. 43 illustrates the fourth set orientation 3902 with the second weave pattern 4004 in screen shot 4300. FIG. 44 illustrates the first set orientation 3602 with the third weave pattern 4006 in screen shot 4400. FIG. 45 illustrates the second set orientation 3702 with the third weave pattern 4006 in screen shot 4500. FIG. 46 illustrates the third set orientation 3802 with the third weave pattern 4006 in screen shot 4600. FIG. 47 illustrates the fourth set orientation 3902 with the third weave pattern 4006 in screen shot 4700. It is to be appreciated that there can be any number of weave patterns and the subject innovation includes the weave patterns described as well as those known in the art. It is to be further appreciated that the subject innovation includes user-created weave patterns in addition to those weave patterns that are used and/or known in the art by one of ordinary skill.

Figure 19:
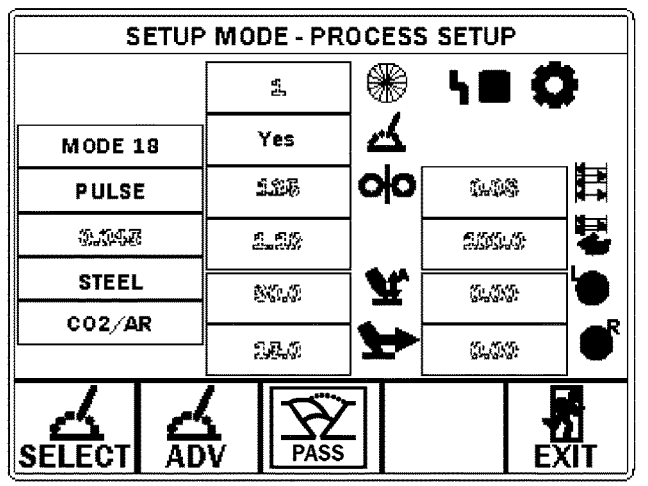
FIG. 19 illustrates a screen shot in accordance with an embodiment of the subject innovation.

FIG. 19 illustrates screen shot 1900 of a process setup in accordance with an embodiment of the subject innovation. The process setup represented in screen shot 1900 can include settings for a particular sector in the welding operation. For instance, screen shot 1900 is representative of the settings for sector one (1). In such example, the sector one (1) provides the parameters for the welding operation when sector one (1) is selected. The parameters can include at least one of the following: sector selection, pulse, wire gauge or wire size (e.g., 0.045), type of workpiece (e.g., steel), type of weld and/or gas used (e.g., $CO_2/AR$), wire feed speed, arc current parameters, left dwell and right dwell parameters, oscillation speed and oscillation width parameters, travel speed and arc voltage parameters, among others.

Figure 20A:
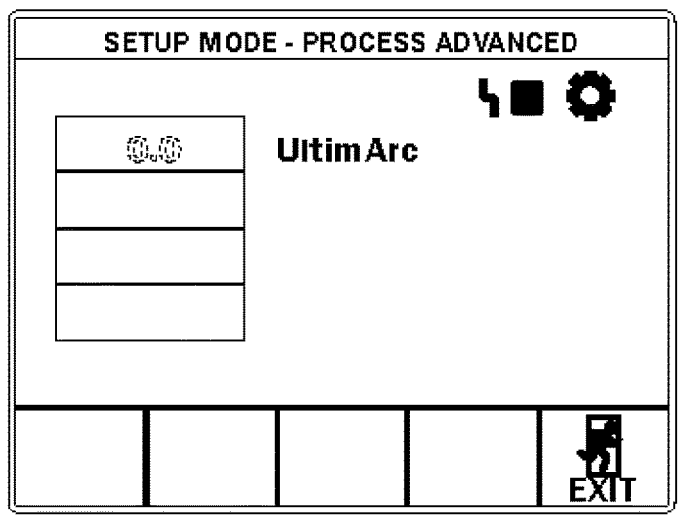
FIG. 20A illustrates a screen shot in accordance with an embodiment of the subject innovation.

FIG. 20A illustrates screen shot 2000 in accordance with an embodiment of the subject innovation. Screen shot 2000 relates to an advanced process setup. Screen shot 2000 is representative of a screen that provides access and/or configuration of advanced process controls. In particular, a weld system or environment can define an advanced process control and the screen shot 2000 can allow access and/or configuration thereof. Screen shot 2000 can allow selection or configuration of waveform control for a welding operation. For instance, waveform control can be predefined options based on a welding operation or a need for a particular welding operation. Waveform control can be configured or selected in which waveform output used for the welding operation can be customized, pre-defined (e.g., from a set of programs) to manipulate one or more welding parameters. In particular, a waveform control can be a "mode" tailored for a particular welding operation, wherein the "mode" can define one or more welding parameters or a range for one or more welding parameters. For instance on a pulsing wave form, the welding parameters can be, but not limited to, at least one of frequency, peak to background balance, peak to background level, ramp rates, among others. It is to be appreciated that the welding parameters for a "mode" tailored for a welding operation can be selected with sound engineering judgment and/or by one of ordinary skill in the welding art and such selections are included within the scope of the subject innovation.

Figure 20B:
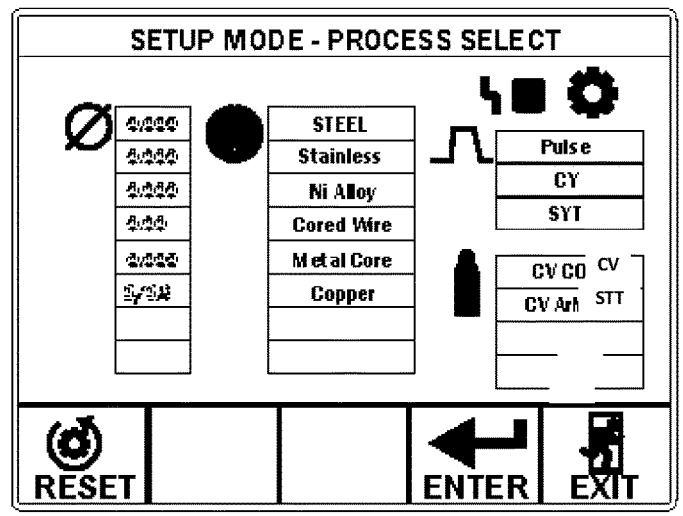
FIG. 20B illustrates a screen shot in accordance with an embodiment of the subject innovation.

FIG. 20B illustrates screen shot 2002 in accordance with an embodiment of the subject innovation. Screen shot 2002 relates to a process select setup. Screen shot 2002 is representative of a process selection based on parameters and variables related to the welding operation to be performed. For instance, a welding operation that is to be performed with a process selected can be created based on a type of material, a wire size, a waveform (e.g., pulse, constant voltage (CV), surface tension transfer (STT), among others), type of shield gas (e.g., CO2, argon mix, among others). An input of the first set of inputs 922 can correspond to the displayed "reset" which clears the user selections, an input of the first set of inputs 922 can correspond to the displayed "enter" which activates a user selection (via the first toggle switch 924), and an input of the first set of inputs 922 can correspond to "exit" which will exit the screen represented by screen shot 2002. For instance, a method of selections for a welding operation can be provided. For example, the following steps can be used with a method for selecting a welding operation: a wire size can be selected; a wire material or a workpiece material can be selected; a process type can be selected; a gas type can be selected or a unique process can be selected; and a welding operation can be performed based on the selections.

Figure 21:
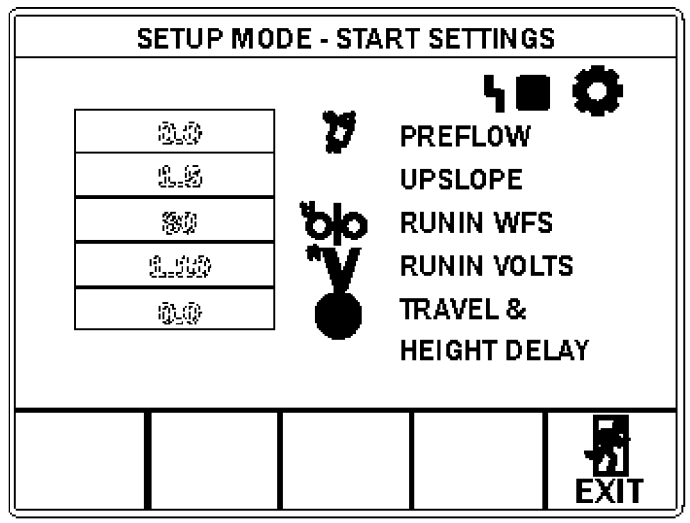
FIG. 21 illustrates a screen shot in accordance with an embodiment of the subject innovation.

FIG. 21 illustrates screen shot 2100 of start settings setup in accordance with an embodiment of the subject innovation. The screen shot 2100 is representative of a screen that allows for a user to establish start settings for a welding operation. The start settings can include, but are not limited to including, preflow, upslope, run-in wire feed speed (e.g., starting wire feed speed), run-in volts (e.g., starting volts), travel delay, height delay, among others. One of the first set of inputs 922 can correspond to "exit" to allow the user to leave the screen shot 2100. For instance, first toggle switch 924 can be for navigation and second toggle switch 926 can be for value change.

Figure 22:
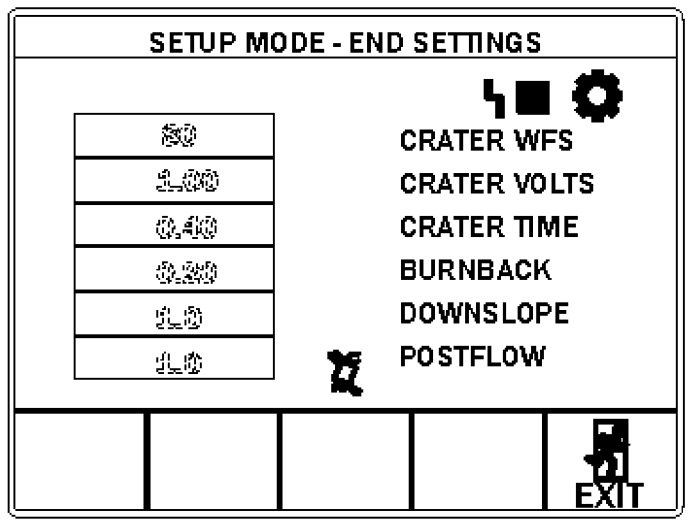
FIG. 22 illustrates a screen shot in accordance with an embodiment of the subject innovation.

FIG. 22 illustrates screen shot 2200 of end settings setup in accordance with an embodiment of the subject innovation. The screen shot 2200 is representative of a screen that allows for a user to establish end settings for a welding operation. The end settings can include, but are not limited to including, crater wire feed speed, crater volts, crater time, burn back time, down slope time, post flow time, among others. One of the first set of inputs 922 can correspond to "exit" to allow the user to leave the screen shot 2200. For instance, first toggle switch 924 can be for navigation and second toggle switch 926 can be for value change.

Figure 23:
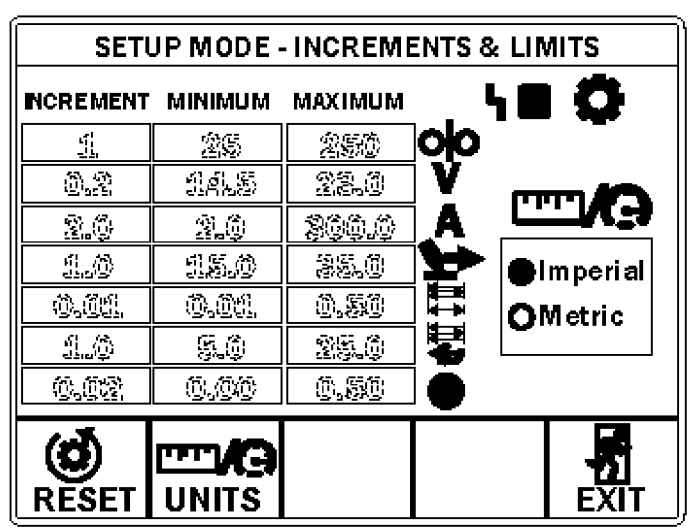
FIG. 23 illustrates a screen shot in accordance with an embodiment of the subject innovation.

FIG. 23 illustrates screen shot 2300 of increments and limits setup in accordance with an embodiment of the subject innovation. The screen shot 2300 is representative of a screen that allows for a user to establish increments and/or limits for a welding operation. The increments and/or limits can be established by an administrator in an example. The limits and/or increments can be for the following: wire feed speed, volts, current, travel speed, oscillation speed, oscillation width, left dwell, right dwell, among others. One of the first set of inputs 922 can correspond to "reset" displayed on the screen to clear user inputs for the screen represented by screen shot 2300. One of the first set of inputs 922 can correspond to "units" displayed on the screen to change the unit of measure. For example, the unit of measure can be changed from imperial units to metric units (or vice versa). One of the first set of inputs 922 can correspond to "exit" to allow the user to leave the screen shot 2300.

Figure 24:
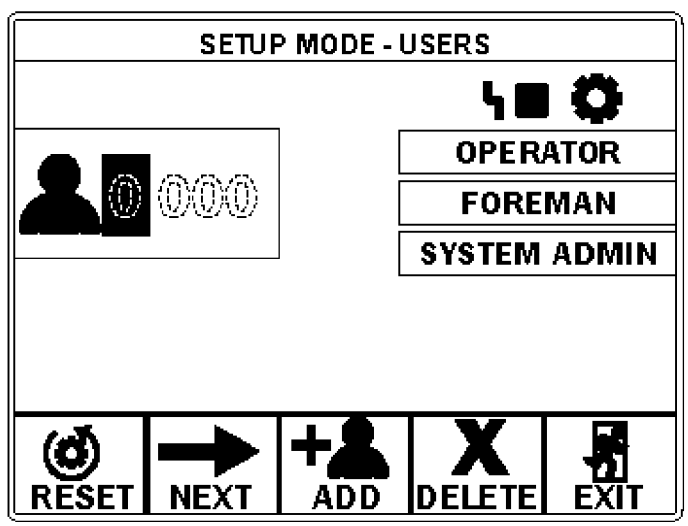
FIG. 24 illustrates a screen shot in accordance with an embodiment of the subject innovation.

FIG. 24 illustrates screen shot 2400 of user setup in accordance with an embodiment of the subject innovation. Screen shot 2400 is representative of a screen that allows setup of users for the pendant component 402. The setup screen (represented by screen shot 2400) can allow an identification to be set for each user and a corresponding category which represents a level of authorization of access while using the pendant component 402. For instance, a level of authorization can be a system administrator (e.g., system admin) which has full access, a foreman which as a first level of access, and an operator which has a second level of access, wherein the first level of access is less than full access, and the second level of access is less than the first level of access. As discussed above, the pendant component 402 can include any number of users, any number of categories, any number of levels of access, so as to allow flexibility to tailor the pendant component 402 to each user. For example, a low-level experienced user may have an identification and category that does not afford much access so as to limit the possibility of error from user input. In another example, a high-level experience user can be set to an identification and category that affords a high level of access to give a range of freedom for the user to change settings, values, parameter, etc. as the high-level experience user sees fit during the use of the pendant component 402. One of the first set of inputs 922 can correspond to the displayed icon "reset" on the screen shot 2400 that allows the user input to be cleared. One of the first set of inputs 922 can correspond to the displayed icon "next" on the screen shot 2400 that allows the user input to proceed to the next step in setting up a user. One of the first set of inputs 922 can correspond to the displayed icon "add" on the screen shot 2400 that allows the user to add a user to the setup mode. One of the first set of inputs 922 can correspond to the displayed icon "delete" on the screen shot 2400 that allows the user to remove a user that has been setup. One of the first set of inputs 922 can correspond to the displayed icon "exit" on the screen shot 2400 that allows the user to exit the setup mode for users.

Figure 25:
FIG. 25 illustrates a screen shot in accordance with an embodiment of the subject innovation.

FIG. 25 illustrates screen shot 2500 of program setup in accordance with an embodiment of the subject innovation. The screen shot 2500 is representative of a screen that allows a user to edit programs, wherein the edit can be create, load, delete, modify, among others. For instance, a user-created program can be loaded via local storage, remote storage (e.g., server, network drive, removable storage, portable storage, pen drive, USB drive, among others), and the like. Details related to the program can be displayed such as, but not limited to, name of the program, number of the program, the location of where the program is used and/or stored, among others. For instance, a user can include a personal USB drive that includes identification information for authenticating with the pendant component 402 as well as programs that he or she uses which can be uploaded and used via screen represented by screen shot 2500. One of the first set of inputs 922 can correspond to the icon/graphic displayed as "load" to allow the user to load a program. One of the first set of inputs 922 can correspond to the icon/graphic displayed as "save" to allow the user to save a program. One of the first set of inputs 922 can correspond to the icon/graphic displayed as "delete" to allow the user to delete a program. One of the first set of inputs 922 can correspond to the icon/graphic displayed as "exit" to allow the user to exit the setup mode for programs.

Figure 26:
FIG. 26 illustrates a screen shot in accordance with an embodiment of the subject innovation.

FIG. 26 illustrates screen shot 2600 of wire feed speed and arc current parameters in accordance with an embodiment of the subject innovation. The screen shot 2600 is representative of a screen that allows a user to adjust wire feed speed and/or current. The screen represented by screen shot 2600 can be presented to the user by selecting one of the second set of inputs 944. For example, one of the second set of inputs 944 can include an icon or graphic that corresponds to at least one of wire feed speed or current to indicate that activation of one of the second set of inputs 944 allows the user to adjust such parameters. The first toggle switch 924 (physically located on a left side of the pendant component 402) can be linked to the wire feed speed which is also on the left side of the pendant component 402. The second toggle switch 926 (physically located on a right side of the pendant component 402) can be linked to the current which is also on the right side of the pendant component 402. The screen can also include a graphic representing which sector the welding operation is set. It is to be appreciated that the screen shot 2600 is representative of a screen that is displayed while the welding operation is being performed and/or during a jog mode. One of the first set of inputs 922 can correspond to a graphic or icon for "setup" which allows the user to proceed to a setup screen. One of the first set of inputs 922 can correspond to a graphic or icon for "weld" which allows the user to at least one of toggle weld, use a test mode, perform a weld operation, or continue back to a weld operation.

Figure 27:
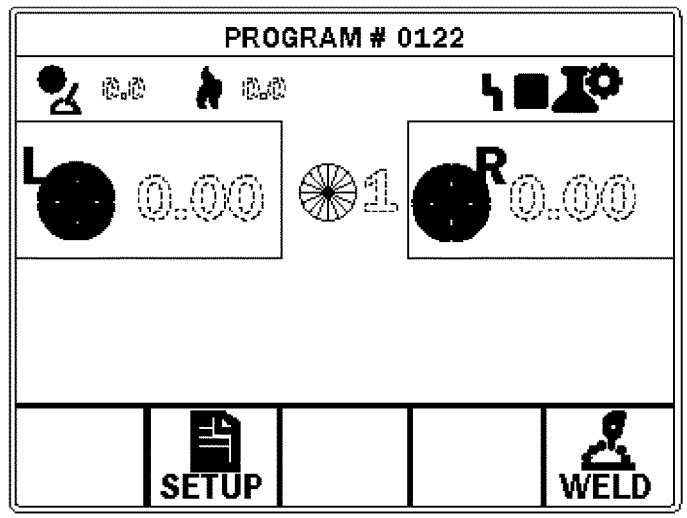
FIG. 27 illustrates a screen shot in accordance with an embodiment of the subject innovation.

FIG. 27 illustrates screen shot 2700 of left dwell and right dwell parameters in accordance with an embodiment of the subject innovation. The screen shot 2700 is representative of a screen that allows a user to adjust left dwell and/or right dwell. The screen represented by screen shot 2700 can be presented to the user by selecting one of the second set of inputs 944. For example, one of the second set of inputs 944 can include an icon or graphic that corresponds to at least one of left dwell or the right dwell to indicate that activation of one of the second set of inputs 944 allows the user to adjust such parameters. The first toggle switch 924 (physically located on a left side of the pendant component 402) can be linked to the left dwell which is also on the left side of the pendant component 402. The second toggle switch 926 (physically located on a right side of the pendant component 402) can be linked to the right dwell which is also on the right side of the pendant component 402. The screen can also include a graphic representing which sector the welding operation is set. It is to be appreciated that the screen shot 2700 is representative of a screen that is displayed while the welding operation is being performed and/or during a jog mode. One of the first set of inputs 922 can correspond to a graphic or icon for "setup" which allows the user to proceed to a setup screen. One of the first set of inputs 922 can correspond to a graphic or icon for "weld" which allows the user to at least one of toggle weld, use a test mode, perform a weld operation, or continue back to a weld operation.

Figure 28:
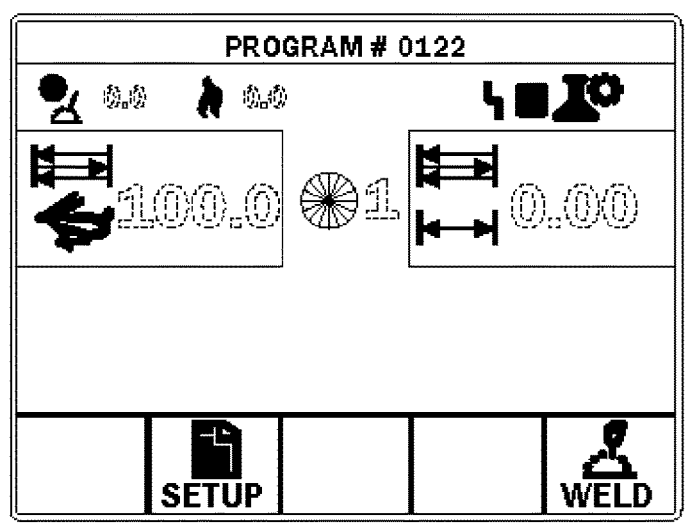
FIG. 28 illustrates a screen shot in accordance with an embodiment of the subject innovation.

FIG. 28 illustrates screen shot 2800 of oscillation speed and oscillation width parameters in accordance with an embodiment of the subject innovation. The screen shot 2800 is representative of a screen that allows a user to adjust oscillation width of a torch and/or oscillation speed of a torch. The screen represented by screen shot 2800 can be presented to the user by selecting one of the second set of inputs 944. For example, one of the second set of inputs 944 can include an icon or graphic that corresponds to at least one of oscillation width or oscillation speed to indicate that activation of one of the second set of inputs 944 allows the user to adjust such parameters. The first toggle switch 924 (physically located on a left side of the pendant component 402) can be linked to the oscillation speed which is also on the left side of the pendant component 402. The second toggle switch 926 (physically located on a right side of the pendant component 402) can be linked to the oscillation width which is also on the right side of the pendant component 402. The screen can also include a graphic representing which sector the welding operation is set. It is to be appreciated that the screen shot 2800 is representative of a screen that is displayed while the welding operation is being performed and/or during a jog mode. One of the first set of inputs 922 can correspond to a graphic or icon for "setup" which allows the user to proceed to a setup screen. One of the first set of inputs 922 can correspond to a graphic or icon for "weld" which allows the user to at least one of toggle weld, use a test mode, perform a weld operation, or continue back to a weld operation.

Figure 29:
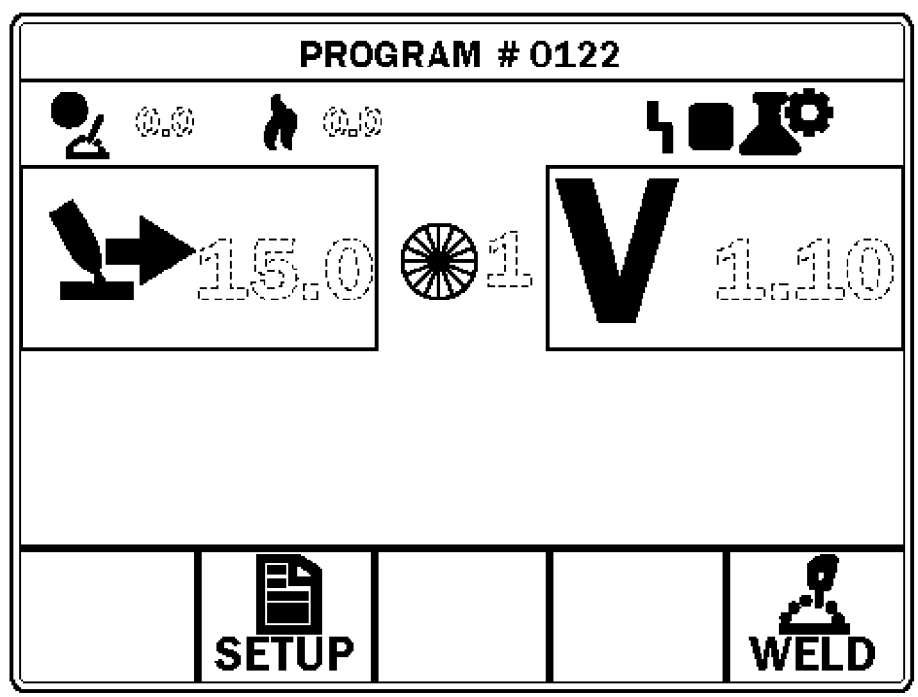
FIG. 29 illustrates a screen shot in accordance with an embodiment of the subject innovation.

FIG. 29 illustrates screen shot 2900 of travel speed and arc voltage parameters in accordance with an embodiment of the subject innovation. The screen shot 2900 is representative of a screen that allows a user to adjust travel speed or a voltage. The screen represented by screen shot 2800 can be presented to the user by selecting one of the second set of inputs 944. For example, one of the second set of inputs 944 can include an icon or graphic that corresponds to at least one of travel speed or voltage to indicate that activation of one of the second set of inputs 944 allows the user to adjust such parameters. The first toggle switch 924 (physically located on a left side of the pendant component 402) can be linked to the travel speed which is also on the left side of the pendant component 402. The second toggle switch 926 (physically located on a right side of the pendant component 402) can be linked to the voltage which is also on the right side of the pendant component 402. The screen can also include a graphic representing which sector the welding operation is set. It is to be appreciated that the screen shot 2900 is representative of a screen that is displayed while the welding operation is being performed and/or during a jog mode. One of the first set of inputs 922 can correspond to a graphic or icon for "setup" which allows the user to proceed to a setup screen. One of the first set of inputs 922 can correspond to a graphic or icon for "weld" which allows the user to at least one of toggle weld, use a test mode, perform a weld operation, or continue back to a weld operation.

Figure 30:
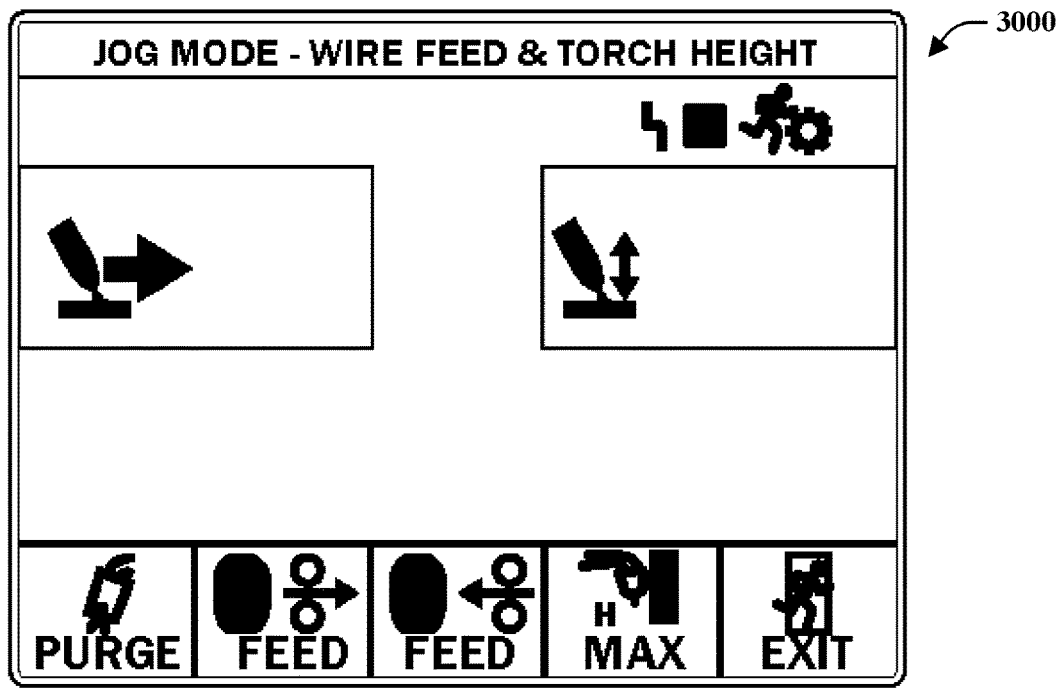
FIG. 30 illustrates a screen shot in accordance with an embodiment of the subject innovation.

FIG. 30 illustrates screen shot 3000 of a jog screen for movement of the torch in accordance with an embodiment of the subject innovation. As discussed, a jog mode can allow movement of tractor welder (e.g., torch movement toward and/or away from track, travel speed of tractor welder on track, torch height, etc.) without performing a welding operation. Screen shot 3000 is representative of a screen that allows a jog mode to be used and/or to control the welding system in real time without performing a weld operation. For instance, the screen shot 3000 illustrates travel speed and/or torch height that can be adjusted when a welding operation is not being performed. One of the first set of inputs 922 can correspond to a graphic or icon for "purge" which allows a user to dispense a portion of shield gas. One of the first set of inputs 922 can correspond to a graphic or icon for "feed" which allows a user to feed wire out of the wire feeder, whereas another one of the first set of inputs 922 can correspond to a graphic or icon for "feed" which allows a user to retract wire back to the wire feeder. One of the first set of inputs 922 can correspond to a graphic or icon for "H Max" that allows a user to adjust the torch at a maximum height (e.g., based on a predefined limit, discussed above, or a mechanical-based limitation that is from the torch not mechanically being able to move any higher). In another embodiment, one of the first set of inputs 922 can correspond to a graphic or icon for "home" which returns travel to initial weld start location (e.g., also referred to auto-home as discussed above). It is to be appreciated that any suitable graphic or icon can be used to represent a user-defined location for the return request (e.g., request upon activating the one of the first set of inputs 922). One of the first set of inputs 922 can correspond to the icon/graphic displayed as "exit" to allow the user to exit the setup mode for programs.

Figure 31:
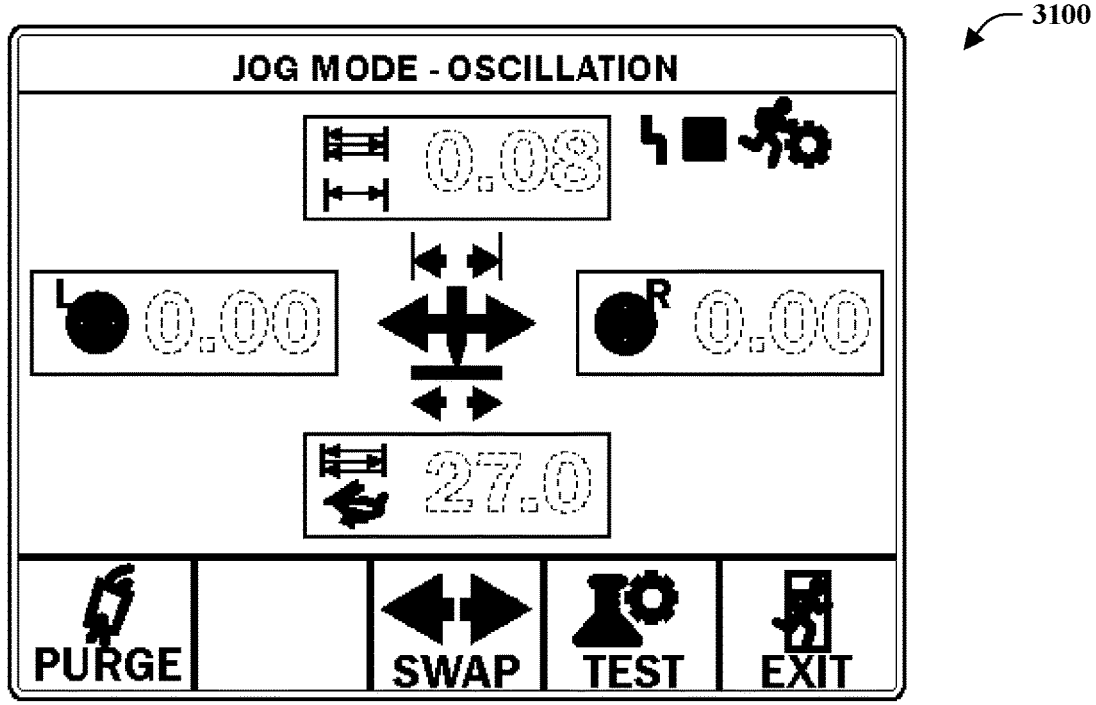
FIG. 31 illustrates a screen shot in accordance with an embodiment of the subject innovation.

FIG. 31 illustrates screen shot 3100 of a jog screen for oscillation of the torch in accordance with an embodiment of the subject innovation. Screen shot 3100 is representative of a screen that allows a jog mode to be used and/or to control the welding system in real time without performing a weld operation. The screen can include icons/graphics representative of at least one of left dwell, right dwell, oscillation width, oscillation speed, among others. In an embodiment, the first toggle switch 924 can be used to select one of left dwell, right dwell, oscillation width, oscillation speed, and the second toggle switch 926 can be used to adjust such parameter selected. In another embodiment, a pair of the parameters can be active (indicated by a change of color on the display for instance) and the first toggle switch 924 can be associated with one of the pair and the second toggle switch 926 can be associated with the other of the pair. One of the first set of inputs 922 can correspond to a graphic or icon for "purge" which allows a user to dispense a portion of shield gas. One of the first set of inputs 922 can correspond to a graphic or icon for "swap" that allows a user to change the location on a display for icons/graphics representing the parameters that can be adjusted and thus the toggle switches that correspond. For instance, in FIG. 31, selecting one of the first set of inputs 922 associated with the "swap" can change travel and oscillation and travel perspective setting. It could also take you to FIGS. 36 to 47. In another embodiment, one of the first set of inputs 922 can correspond to a graphic or icon for "swap" that allows a user to change the activated pair of parameters that can be adjusted by the first toggle switch 924 and the second toggle switch 926. For example, selecting one of the first set of inputs 922 associated with the "swap" can change the first toggle switch 924 to controlling oscillation width to the second toggle switch 926 and the second toggle switch 926 from controlling oscillation speed to the first toggle switch 924. In still another embodiment, a selection of "swap" can progress to screen shot 1800 illustrated in FIG. 18 to set, adjust, or change travel (as discussed above). One of the first set of inputs 922 can correspond to the icon/graphic displayed as "test" to allow the user to view the changes while the welding system performs with the established settings. One of the first set of inputs 922 can correspond to the icon/graphic displayed as "exit" to allow the user to exit the setup mode for programs.

It is to be appreciated that the "device" can also be referred to as the "pendant component." In an embodiment, the welding system includes a power source for a tractor welder, the torch, a motor that moves the tractor welder on the track, a motor that moves the torch to and from the track, a wire feeder, a motor that moves the torch to and from the workpiece, a motor that oscillates the torch, or a power source for a wire that is supplied by the wire feeder.

In an embodiment, the output component is configured to receive a second electronic signal from the welding system. In an embodiment, the second electronic signal is representative of a detected value of the welding system. In an embodiment, the first electronic signal is representative of a setting from a user for one or more parameters. In an embodiment, the first electronic signal is representative of an arc current, an arc voltage, a wire feed speed, a movement for the torch, a left dwell, a right dwell, a travel speed of a tractor welder for the welding system, an oscillation speed, or an oscillation width.

It is to be appreciated that the "device" can also be referred to as the "pendant component 402." In an embodiment of a device, the device is hosted on a first network and communicates with the orbital welding system that is hosted on a second network, wherein the communication is via the Internet. In the embodiment, the device can include a controller that performs the welding operation with the orbital welding system based on the electrical signal. In the embodiment, the electrical communication is a wireless communication. In an embodiment, the electrical communication is a physical coupling via a wired communication.

In an embodiment, the welding system includes at least one of a motor that moves the tractor welder on the track; a motor that moves the torch to and from the track; a wire feeder; a motor that moves the torch to and from the workpiece; a motor that oscillates the torch; or a power source for a wire that is supplied by the wire feeder.

In an embodiment, the device includes a casing having a front opposite of a back, a first side opposite a second side, a top side, a bottom side, and a thickness that separates the front and the back, wherein the casing houses at least one of the processor, the memory, the display component, the input component, or the output component. The device can further include a connector component on at least one of the first side or the second side, an indentation region at least one of the first side or the second side of which the connector component resides, a strap member that connects to at least one of the first side or the second side of which the connector component resides, and the connector component counterbalances a weight of a wired connection to the connector component to facilitate carrying the device.

In an embodiment, the output component is configured to receive an additional electronic signal from the orbital welding system. In an embodiment, the additional electronic signal is representative of a measured value of the orbital welding system. In an embodiment, the electronic signal is representative of a setting from a user for one or more parameters used in for the welding operation.

In an embodiment, the electronic signal is representative of at least one of an arc current, an arc voltage, a wire feed speed, an amount of movement for the torch, a left dwell, a right dwell, a travel speed of a tractor welder for the welding system, an oscillation speed, or an oscillation width. In an embodiment, the device is in an electrical communication with an additional orbital welding system and the device communicates an electronic signal to control a welding operation performed by one of the orbital welding system or the additional welding system.

In view of the exemplary devices and elements described supra, methodologies that may be implemented in accordance with the disclosed subject matter will be better appreciated with reference to the flow charts and/or methodologies. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

A method can be provided that allows a user to navigate data associated with welding system 404 with device 402. The method can include at least one of the following: displaying a graphic related to welding system 404; using a first input to select a pairing of a first welding parameter and a second welding parameter; using a first toggle switch to adjust the first welding parameter; using a second toggle switch to adjust the second welding parameter; using a second input to select a displayed option associated with the graphic; using an input to access a sector or a program; using an input to start or stop a welding cycle; using an input to terminate the welding operation; using an encoder knob to adjust a torch position toward or away from a track of the tractor welder; and using a depression of the encoder knob to automatically center the torch. The method can further include color-coding an input to a color of the graphic rendered, wherein the color coding is indicative of the input controlling such graphic and the welding parameter represented by the graphic.

In an embodiment, a method can be provided that allows a user to create a welding program based a preference of the user. The method can include at least one of the following: authenticating a user with the pendant component via a portion of data; selecting a material for a wire (e.g., steel, stainless, nickel alloy, cored wire, metal core, copper, among others) or selecting a no wire welding operation; selecting a type of welding process (e.g., pulse, constant voltage, surface tension transfer, among others); selecting a shield gas (e.g., $CO_2$, argon, argon mix, among others); or selecting at least one of a start or stop of the welding operation. In another embodiment, the method can include selecting at least one start setting or end setting for the welding operation. In another embodiment, the method can include selecting at least one of a left dwell, a right dwell, a wire feed speed, a voltage, a current, a travel speed, an oscillation speed, an oscillation width, a torch height, among others.

In another embodiment, the method can include at least one of the following: authenticating a user with the pendant component via a portion of data; receiving data related to a selection of a material for a wire (e.g., steel, stainless, nickel alloy, cored wire, metal core, copper, among others) or receiving data related to a selection of a no wire welding operation; receiving data related to a selection of a type of welding process (e.g., pulse, constant voltage, surface tension transfer, among others); receiving data related to a selection of a shield gas (e.g., CO2, argon, argon mix, among others); or receiving data related to a selection of at least one of a start or stop of the welding operation. In another embodiment, the method can include receiving data related to a selection of at least one start setting or end setting for the welding operation. In another embodiment, the method can include receiving data related to a selection of at least one of a left dwell, a right dwell, a wire feed speed, a voltage, a current, a travel speed, an oscillation speed, an oscillation width, a torch height, among others. It is to be appreciated that the receiving of data can be at a component, server, system, network, such as, but not limited to, a welding system, an orbital welding system, a controller for a welding system, a controller for an orbital welding system, a combination thereof, and the like.

In another embodiment, the method can include at least one of the following: authenticating a user with the pendant component via a portion of data; transmitting data related to a selection of a material for a wire (e.g., steel, stainless, nickel alloy, cored wire, metal core, copper, among others) or transmitting data related to a selection of a no wire welding operation; transmitting data related to a selection of a type of welding process (e.g., pulse, constant voltage, surface tension transfer, among others); transmitting data related to a selection of a shield gas (e.g., CO2, argon, argon mix, among others); or transmitting data related to a selection of at least one of a start or stop of the welding operation. In another embodiment, the method can include transmitting data related to a selection of at least one start setting or end setting for the welding operation. In another embodiment, the method can include transmitting data related to a selection of at least one of a left dwell, a right dwell, a wire feed speed, a voltage, a current, a travel speed, an oscillation speed, an oscillation width, a torch height, among others. It is to be appreciated that the transmitting of data can be from at least one of the device, the pendant component, the output component, and the like. In another embodiment, the method can include communicating a portion of data related to a measurement of a welding parameter. For instance, the method can include transmitting data representative of a measurement of a welding parameter to at least one of the device, the pendant component, among others. In another embodiment, the method can include receiving data representative of a measurement of a welding parameter. For instance, at least one of the device, the pendant component, the output component, a welding system, a controller for a welding system, among others, can receive data representative of a measurement of a welding parameter.

In an embodiment, a method of can include at least one of the following: displaying a portion of a graphic that is representative of at least one of a left dwell, a right dwell, a wire feed speed, a voltage, a current, a travel speed, an oscillation speed, an oscillation width, a torch height; receiving an input from a user, wherein the input corresponds to an interaction with the portion of the graphic; and controlling a portion of a welding operation with the input. The method further includes displaying a pair of welding parameters based on a selection of an input associated to one of the pair of welding parameters. The method can further include linking a first toggle switch to adjust a first welding parameter of the pair of welding parameters that are displayed and linking a second toggle switch to adjust a second welding parameter of the pair of welding parameters that are displayed. For example, the pair of welding parameters can be as follows: wire feed speed and current; left dwell and right dwell; oscillation speed and oscillation width; travel speed and voltage; travel speed and torch height; among others. It is to be appreciated that any suitable combination of welding parameters can be paired and such examples are not to be limiting. For instance, the welding parameter can be, but is not limited to, an arc voltage, a travel speed of a tractor welder that performs the welding operation, a wire feed speed, an arc current level, a height of torch, a distance between workpiece W and torch, an oscillation width of electrode, a temperature of welding wire, a temperature of electrode, a type of material of workpiece W, a frequency of oscillation of electrode, a polarity of the arc current, a polarity of the current for welding wire, a parameter that affects an arc current of the welding operation, a type of electrode, a gauge of wire, a material of wire. The method can further include controlling the welding operation with the pair of welding parameters based on a user input (via the pendant component 402).

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A device, comprising:
    a display configured to render screens for a graphical user interface;
    a communication interface configured to communicatively couple the device to a welding system and to transmit information to and receive information from the welding system; and
    a set of input devices configured for interaction by a user to supply input corresponding to the screens on the display, the set of input devices comprising:
        a first toggle switch;
        a second toggle switch;
        an encoder knob;
        a first set of buttons respectively configured for selection of a respective function respectively depicted the display in association with each button of the first set of buttons; and
        a second set of buttons respectively configured for selection of a screen of the screens, that enables configuration of at least one welding parameter; and
    the device further comprising:
    a processor;
    a memory coupled to the processor and storing computer-executable instructions that, when executed by the processor, configured the processor to:
        control the display to render a screen of the screens for the graphical user interface;
        interpret interactions by the user with set of input devices based on the screen displayed on the display; and
        direct communications with the welding system via the communication interface in accordance with input received from the user via the set of input devices.

2. The device of claim 1, wherein interaction with the first toggle switch by the user causes navigation on the graphical user interface.

3. The device of claim 1, wherein interaction with the second toggle switch by the user causes a change in value of a parameter selected on the graphical user interface.

4. The device of claim 1, wherein a screen, of the one or more screens, for the graphical user interface depicts a pair of parameters on the display such that user interaction with the first toggle switch causes a change in value of a first parameter of the pair and user interaction with second toggle switch causes a change in value of a second parameter of the pair.

5. The device of claim 1, wherein the device is configured to receive a value for a welding parameter from the welding system via the communication interface and display the value for the welding parameter on the display; and
    the device is configured to transmit, to the welding system via the communication interface, an updated value for the welding parameter changed according to input received from the user via the set of input devices.

6. The device of claim 1, wherein the encoder knob is configured for rotation by the user to control a movement of a torch of the welding system.

7. The device of claim 6, wherein the encoder knob is further configured to be depressible by the user to cause a centering of the torch of the welding system.

8. The device of claim 1, wherein the welding system includes a power source for a tractor welder, the torch, a motor for moving the tractor welder along a track, one or more motors for moving the torch, a wire feeder, and a weld power supply for energizing a wire supplied by the wire feeder.

9. The device of claim 1, further comprising a casing for housing the display, the set of input devices, and the communication interface,
    wherein the casing include an indented region to facilitate hand-held operation of the device by the user.

10. A hand-held device for controlling a welding system, comprising:
    a display for displaying a graphical user interface;
    a communication interface configured to communicatively couple the device to the welding system to enable transmission and reception of information to and from the welding system;
    a set of input devices configured for manipulation by a user to interact with at least one of the graphical user interface or the welding system, the set of input devices includes:
        a first toggle switch,
        a second toggle switch,
        an encoder knob,
        a first set of buttons respectively configured for selection of functions respectively associated each button of the first set of buttons via the graphical user interface, and
        a second set of buttons respectively configured for quick selection of a screen of the graphical user interface that enables configuration of at least one welding parameter; and
    a processor coupled to a memory storing computer-executable instructions that, when executed, configure the processor to:
        control the display to render one or more screens of the graphical user interface;
        interpret input obtained from the user via the set of input devices in accordance with a state of the graphical user interface on the display; and
        direct communications with the welding system via the communication interface to receive and transmit information.

11. The device of claim 10, wherein interaction with the first toggle switch by the user causes navigation on the graphical user interface.

12. The device of claim 10, wherein interaction with the second toggle switch by the user causes a change in value of a parameter selected on the graphical user interface.

13. The device of claim 10, wherein the graphical user interface is configured to depict a pair of parameters on the display simultaneously such that user interaction with the first toggle switch causes a change in value of a first parameter of the pair and user interaction with second toggle switch causes a change in value of a second parameter of the pair.

14. The device of claim 10, wherein the processor is further configured to:
   receive a value for a welding parameter from the welding system via the communication interface and display the value for the welding parameter on the display; and
   transmit, to the welding system via the communication interface, an updated value for the welding parameter changed according to input received from the user via the set of input devices.

15. The device of claim 10, wherein the encoder knob is configured for rotation by the user to control a movement of a torch of the welding system.

16. The device of claim 15, wherein the encoder knob is further configured to be depressible by the user to cause a centering of the torch of the welding system.

17. The device of claim 10, wherein the communication interface is a wired interface and the device further comprises a connector to couple the device to the welding system.

18. The device of claim 10, wherein the set of input device further comprises a third set of button configured to enable selection of a welding program by the user, starting of a selected welding program, and halting of an executing welding program.

19. A welding system, comprising:
   a tractor welder configured to move along a track mounted adjacent to a pipe;
   a welding torch mounted to the tractor welder and having an electrode configured to perform a welding operation on the pipe;
   a wire feeder configured to deliver a welding wire to a weld puddle; and
   a welding power supply configured to supply power to generate an arc between the electrode and the pipe; and
   a pendant device configured to be hand-held operation by a user, the pendant device comprising:
      a display for displaying a graphical user interface;
      a communication interface configured to communicatively couple the device to the welding system to enable transmission and reception of information to and from the welding system;
      a set of input devices configured for manipulation by a user to interact with at least one of the graphical user interface or the welding system, the set of input devices includes:
      a first toggle switch,
      a second toggle switch,
      an encoder knob,
      a first set of buttons respectively configured for selection of functions respectively associated each button of the first set of buttons via the graphical user interface, and
      a second set of buttons respectively configured for quick selection of a screen of the graphical user interface that enables configuration of at least one welding parameter; and
   a processor coupled to a memory storing computer-executable instructions that, when executed, configure the processor to:
      control the display to render one or more screens of the graphical user interface;
      interpret input obtained from the user via the set of input devices in accordance with a state of the graphical user interface on the display; and
      direct communications with the welding system via the communication interface to receive and transmit information.

* * * * *